(12) United States Patent
Scully et al.

(10) Patent No.: US 9,729,185 B2
(45) Date of Patent: Aug. 8, 2017

(54) SELF-CENTERING AND ADJUSTABLE MOUNT

(71) Applicant: Wood Brothers Steel Stamping Company, Wheeling, IL (US)

(72) Inventors: Gerald G. Scully, Winnetka, IL (US); Chad G. Scully, Winnetka, IL (US); Conrad M. Scully, Winnetka, IL (US)

(73) Assignee: Wood Brothers Steel Stamping Company, Wheeling, IL (US)

( * ) Notice: Subject to any disclaimer, the term of this patent is extended or adjusted under 35 U.S.C. 154(b) by 0 days.

(21) Appl. No.: 15/168,089

(22) Filed: May 29, 2016

(65) Prior Publication Data
US 2016/0277552 A1 Sep. 22, 2016

Related U.S. Application Data

(63) Continuation-in-part of application No. 14/641,280, filed on Mar. 6, 2015, now Pat. No. 9,357,044.

(51) Int. Cl.
*H04M 1/00* (2006.01)
*H04B 1/3888* (2015.01)
(Continued)

(52) U.S. Cl.
CPC ........... *H04B 1/3888* (2013.01); *F16M 13/02* (2013.01); *H04B 1/3877* (2013.01); *H04M 1/04* (2013.01);
(Continued)

(58) Field of Classification Search
CPC ... B60B 1/003; B60B 2900/212; B62K 19/16; B62K 19/22; B62K 21/02; B62K 21/04;
(Continued)

(56) References Cited

U.S. PATENT DOCUMENTS

| 5,730,409 A | 3/1998 | Baron |
| 2011/0298227 A1 | 12/2011 | Fiedler |

(Continued)

FOREIGN PATENT DOCUMENTS

| JP | 2013-087862 | 5/2013 |
| KR | 10-1042534 | 6/2011 |

OTHER PUBLICATIONS

International Search Report dated May 26, 2016 for PCT application No. PCT/US2016/021091.
(Continued)

*Primary Examiner* — Tu X Nguyen
(74) *Attorney, Agent, or Firm* — Chicago IP Law; Steven M. Evans

(57) ABSTRACT

A circular housing having a top surface and a bottom surface, and an inner chamber, where a ring on the top surface of the circular housing has a teethed upper surface, and a housing magnet is located within the inner chamber of the housing. A lid is to be located on the top surface of the housing, and a lid magnet located within the lid is magnetically attracted to the housing magnet when the lid is positioned on top surface of the housing. The outer perimeter of the top surface of the lid is teethed, and the teethed outer perimeter of the top surface of the lid and the teethed upper surface of the ring interlock when the lid is positioned on top surface of the housing.

20 Claims, 54 Drawing Sheets

(51) Int. Cl.
- *F16M 13/02* (2006.01)
- *H04B 1/3877* (2015.01)
- *H04M 1/04* (2006.01)
- *F16B 1/00* (2006.01)
- *F16B 11/00* (2006.01)

(52) U.S. Cl.
CPC ..... *F16B 11/006* (2013.01); *F16B 2001/0035* (2013.01)

(58) Field of Classification Search
CPC ...... B62K 2206/00; B62K 25/02; B62K 3/02; H04M 1/0202; H04M 1/185
USPC ........................ 455/575.1, 575.8, 575.9, 90.3
See application file for complete search history.

(56) References Cited

U.S. PATENT DOCUMENTS

| | | |
|---|---|---|
| 2012/0019994 A1 | 1/2012 | Kuan |
| 2012/0252543 A1* | 10/2012 | Cho .................... F16M 11/041 455/575.8 |
| 2014/0355200 A1 | 12/2014 | Thiers |
| 2015/0201723 A1 | 7/2015 | Rayner |

OTHER PUBLICATIONS

GPS Windshield Suction Cup Mount and Bracket Bundle sold by Garmin International, located in Olathe, Kansas.
Annex Products, located in Prahran, Australia, manufactures the Quad Lock® bike mount for an IPhone® 6, which is a type of smartphone.
iMagnet Cradle-less Universal Car Phone Mount Holder.
Rokform universal bike mount.
BikeConsole Lite MountCase iPhone 6 Waterproof Bike Mount and Case Kit with RainGuard.
Satechi RideMate Bike Mount for iPhone.

* cited by examiner

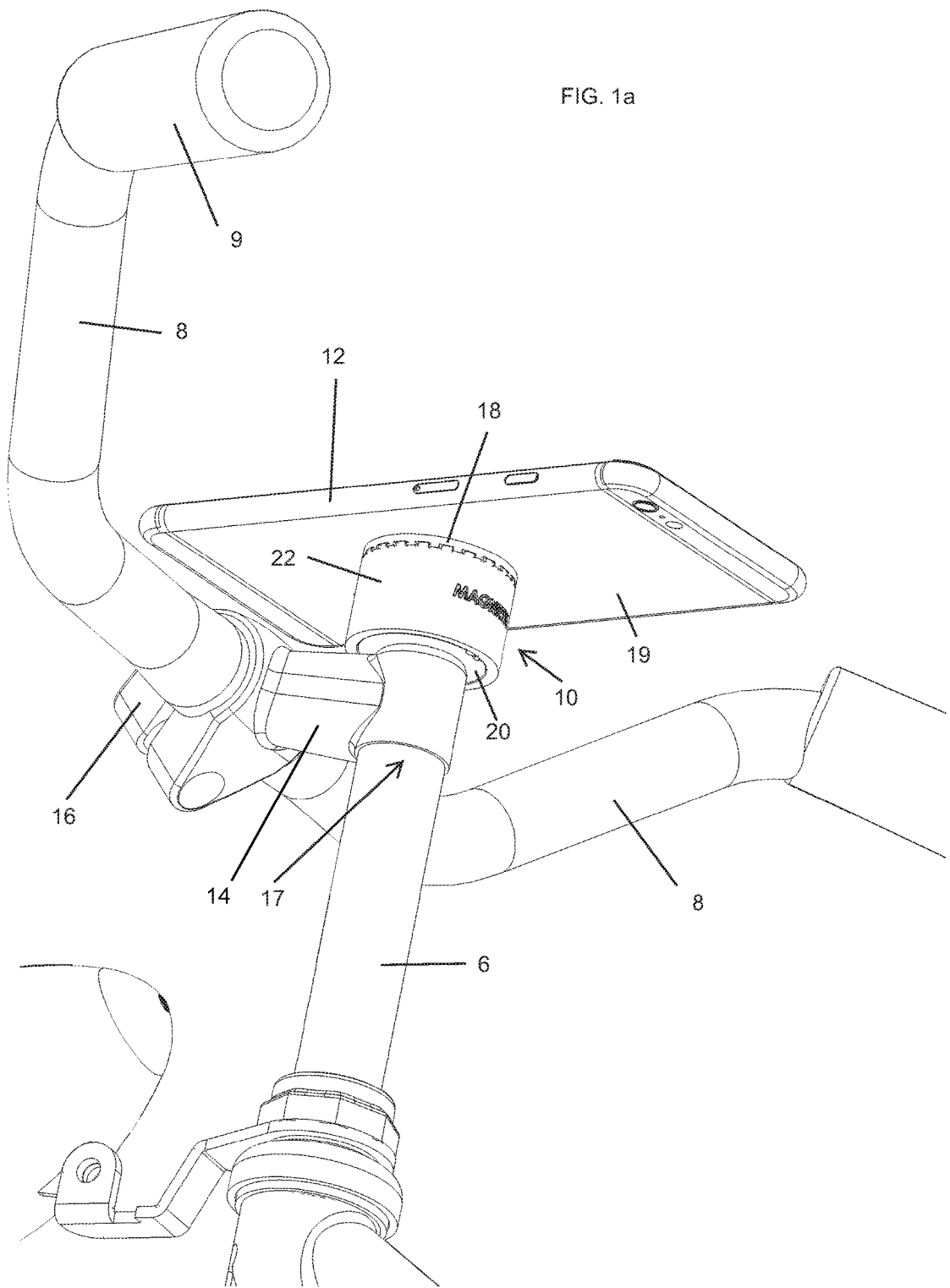

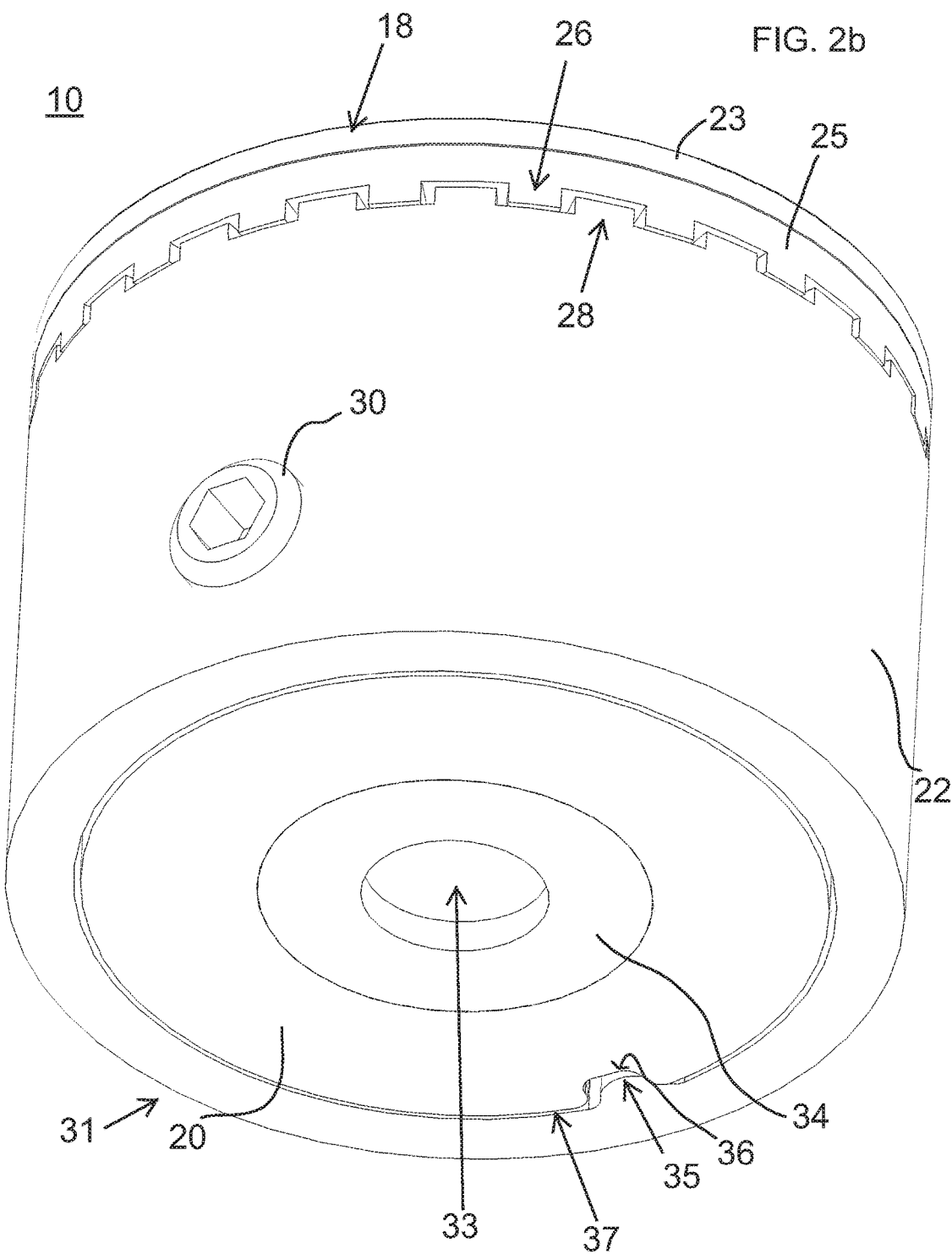

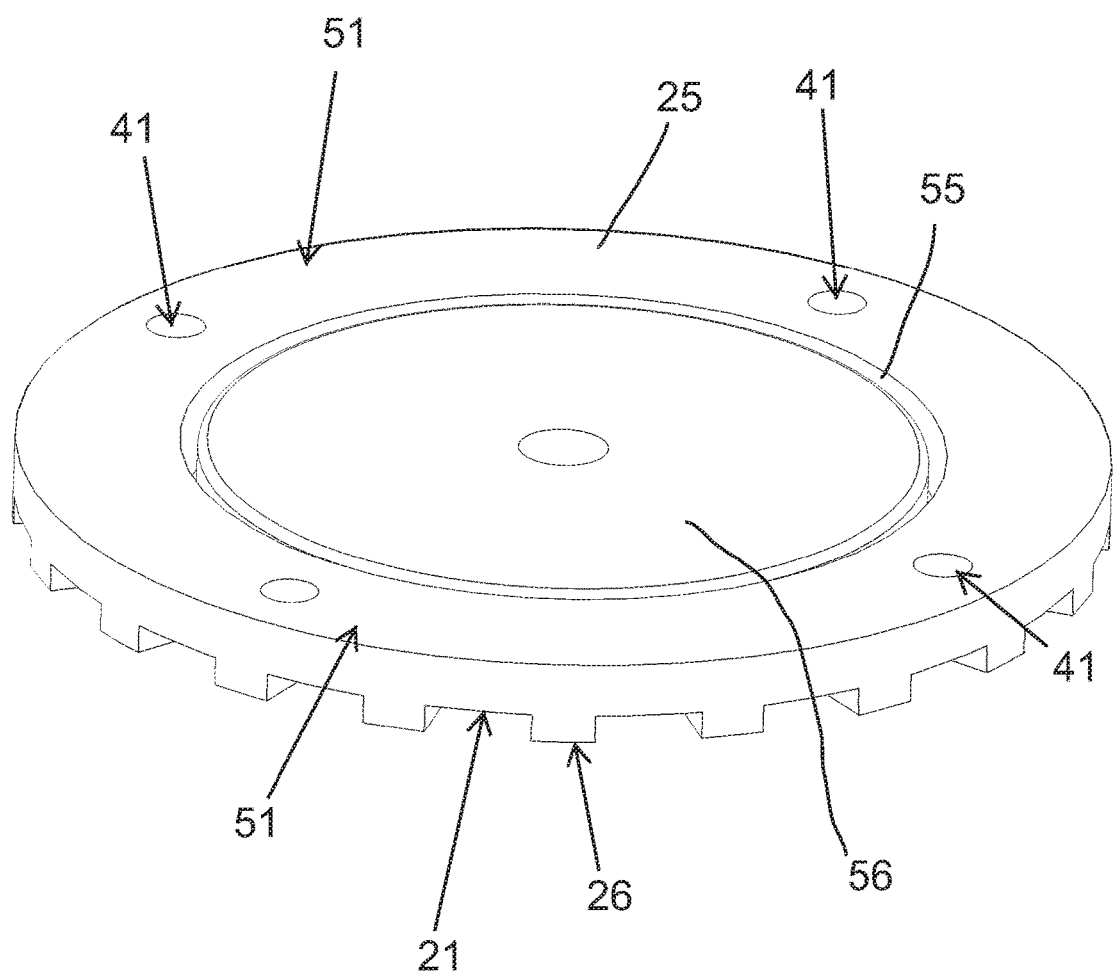

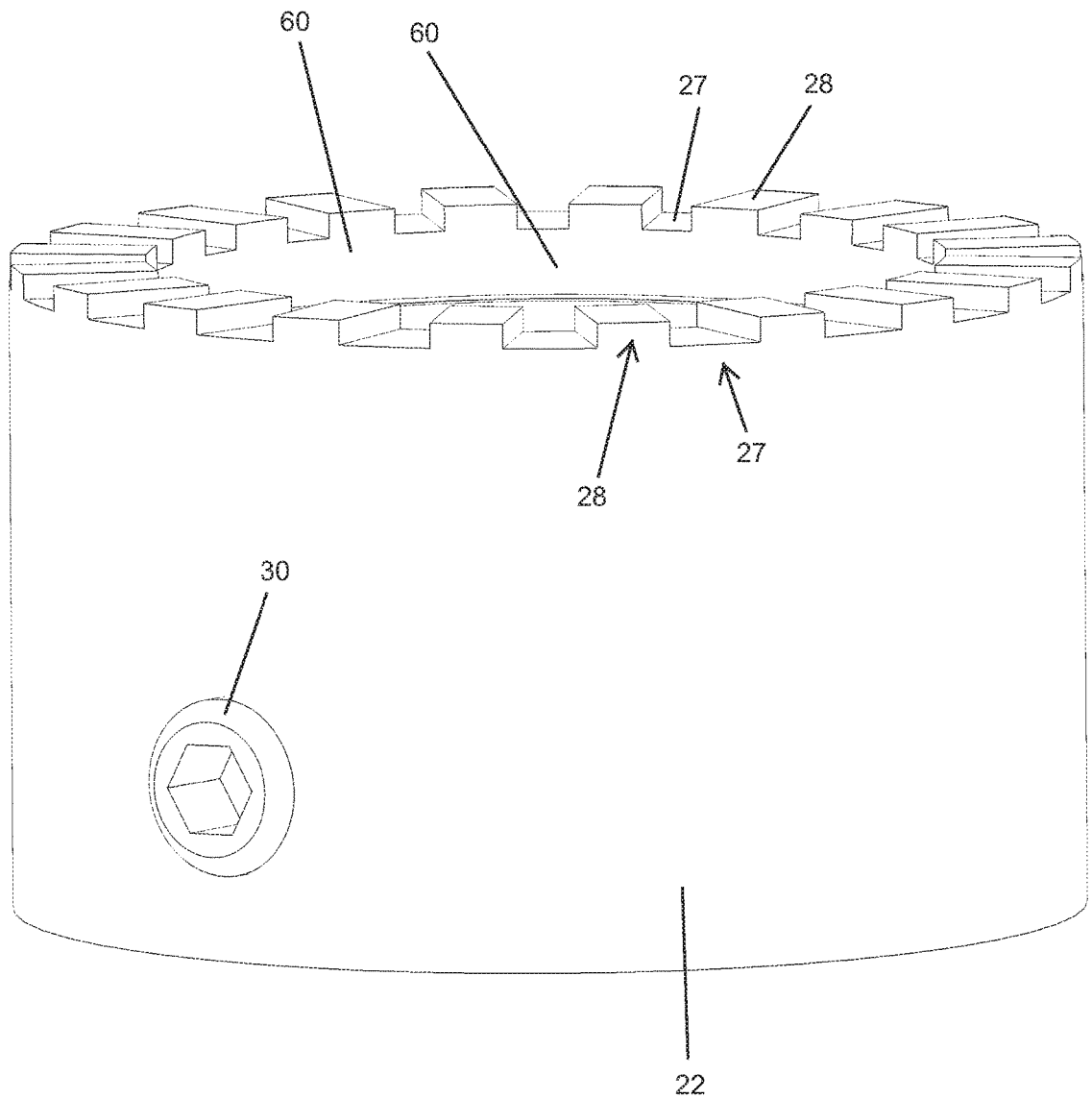

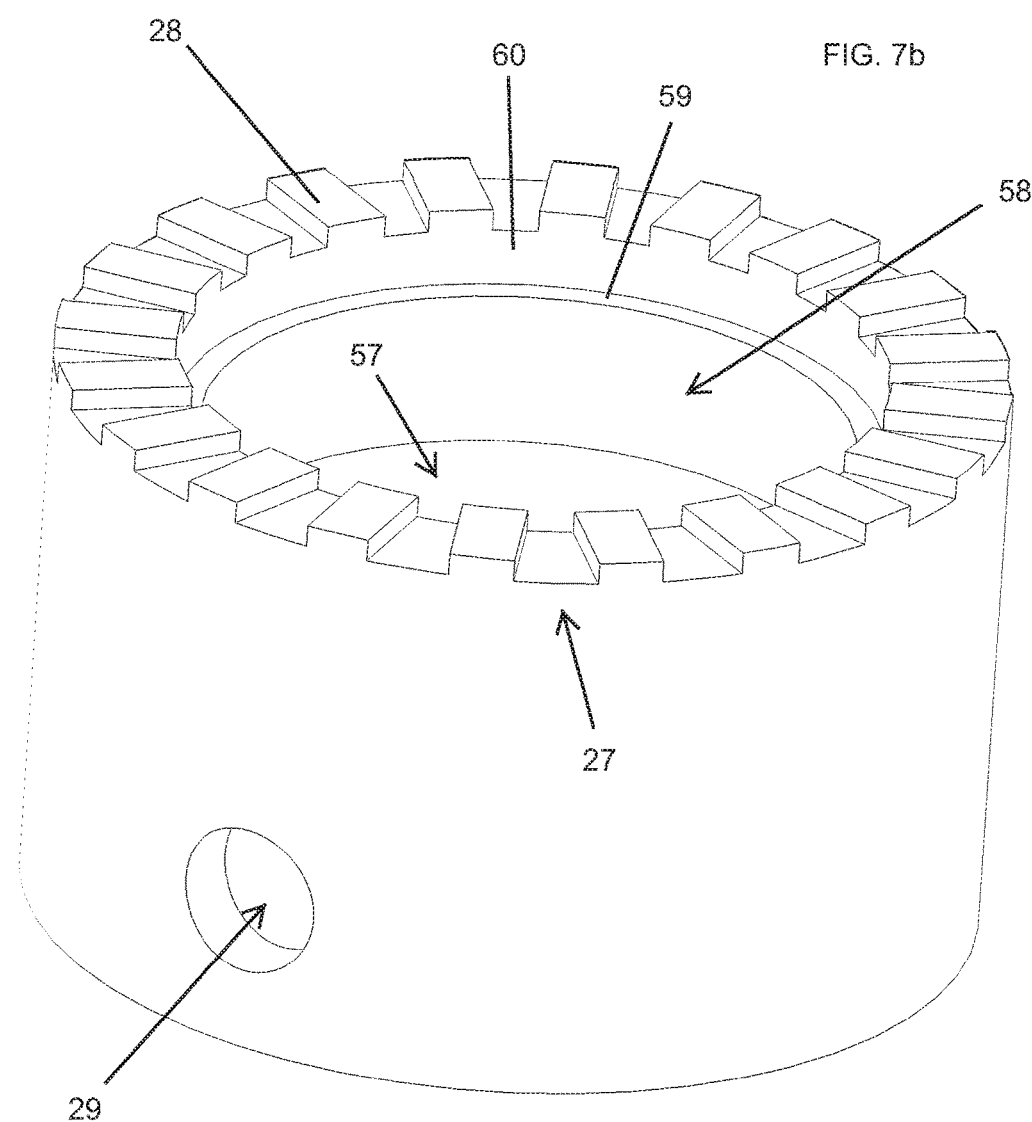

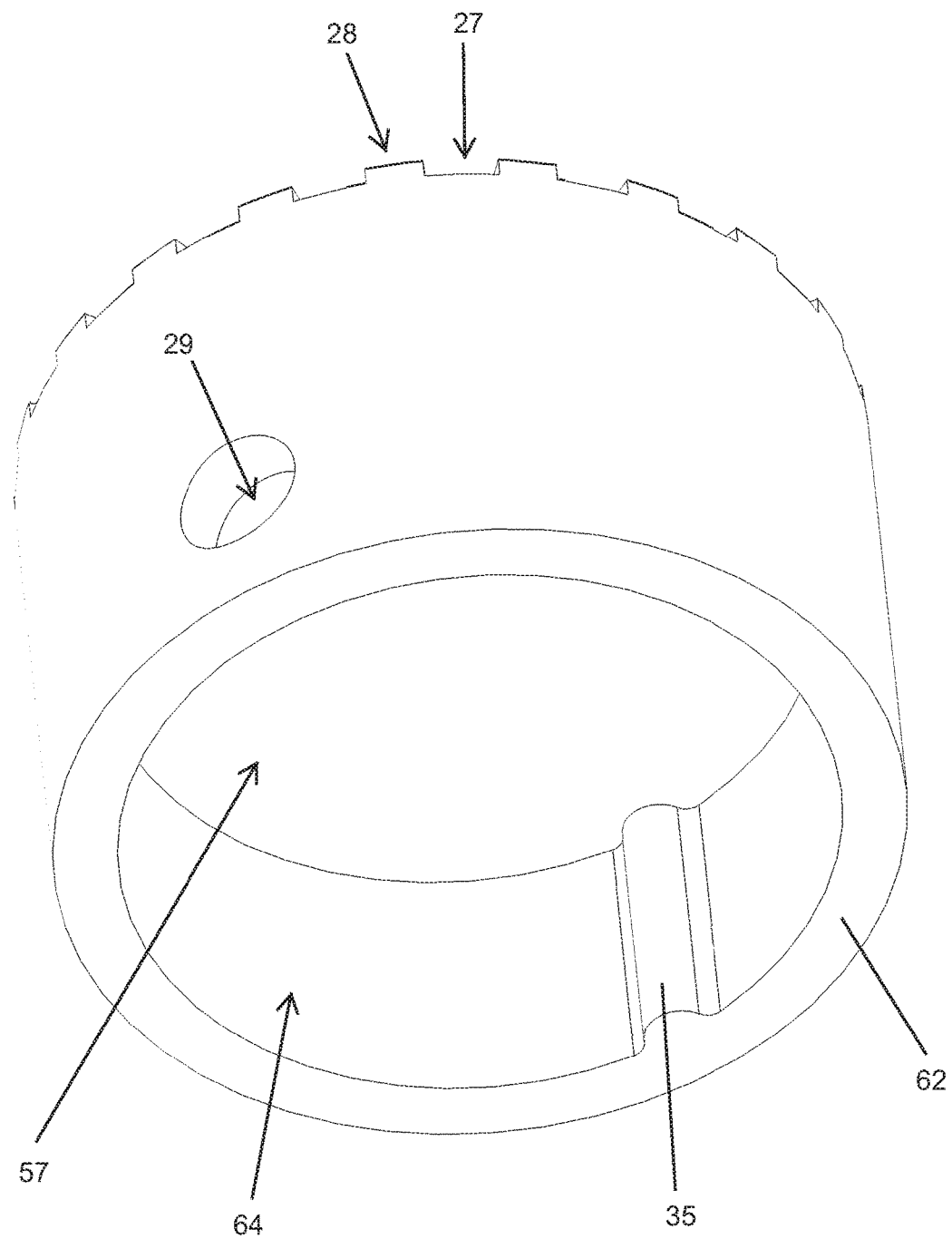

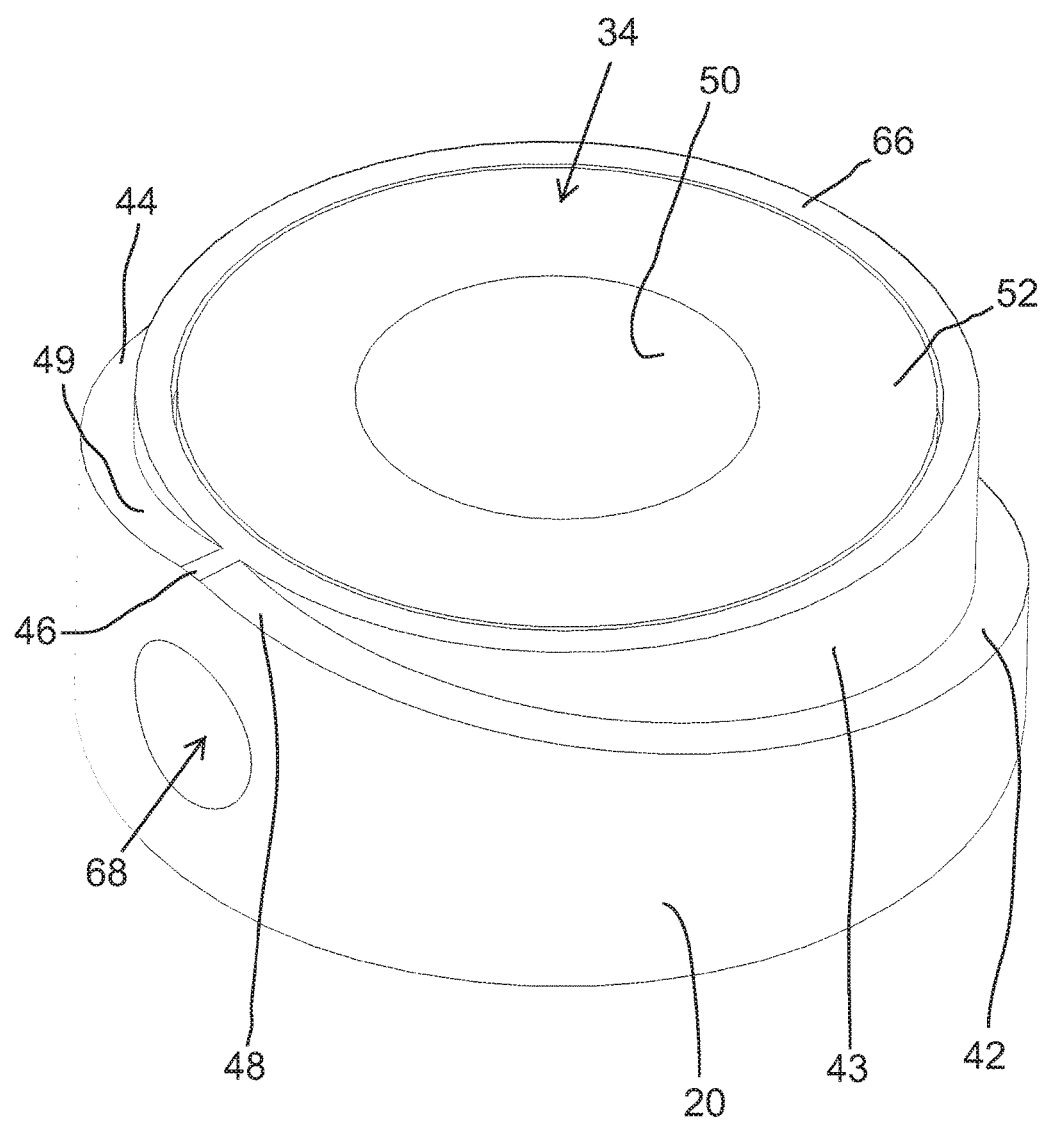

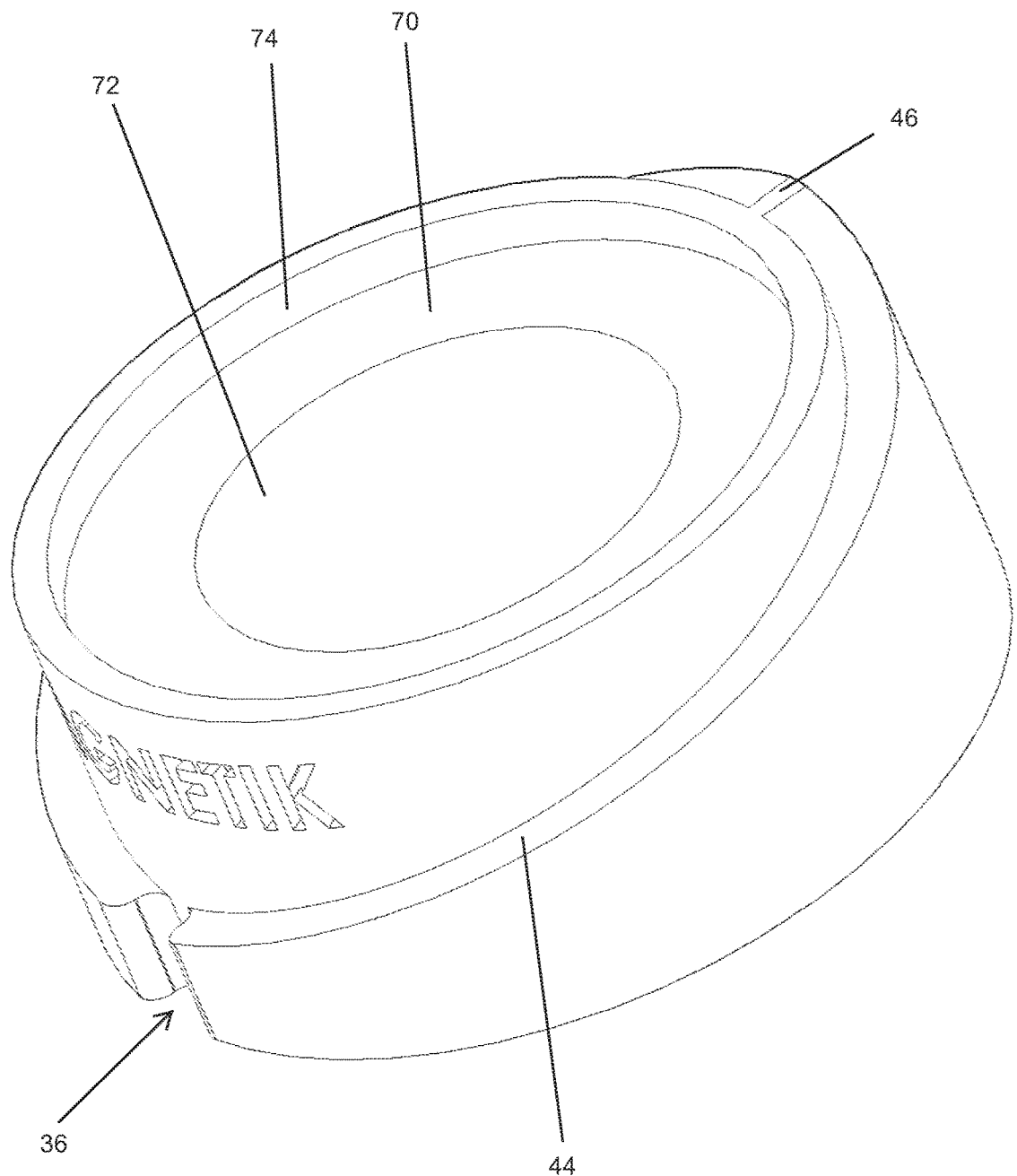

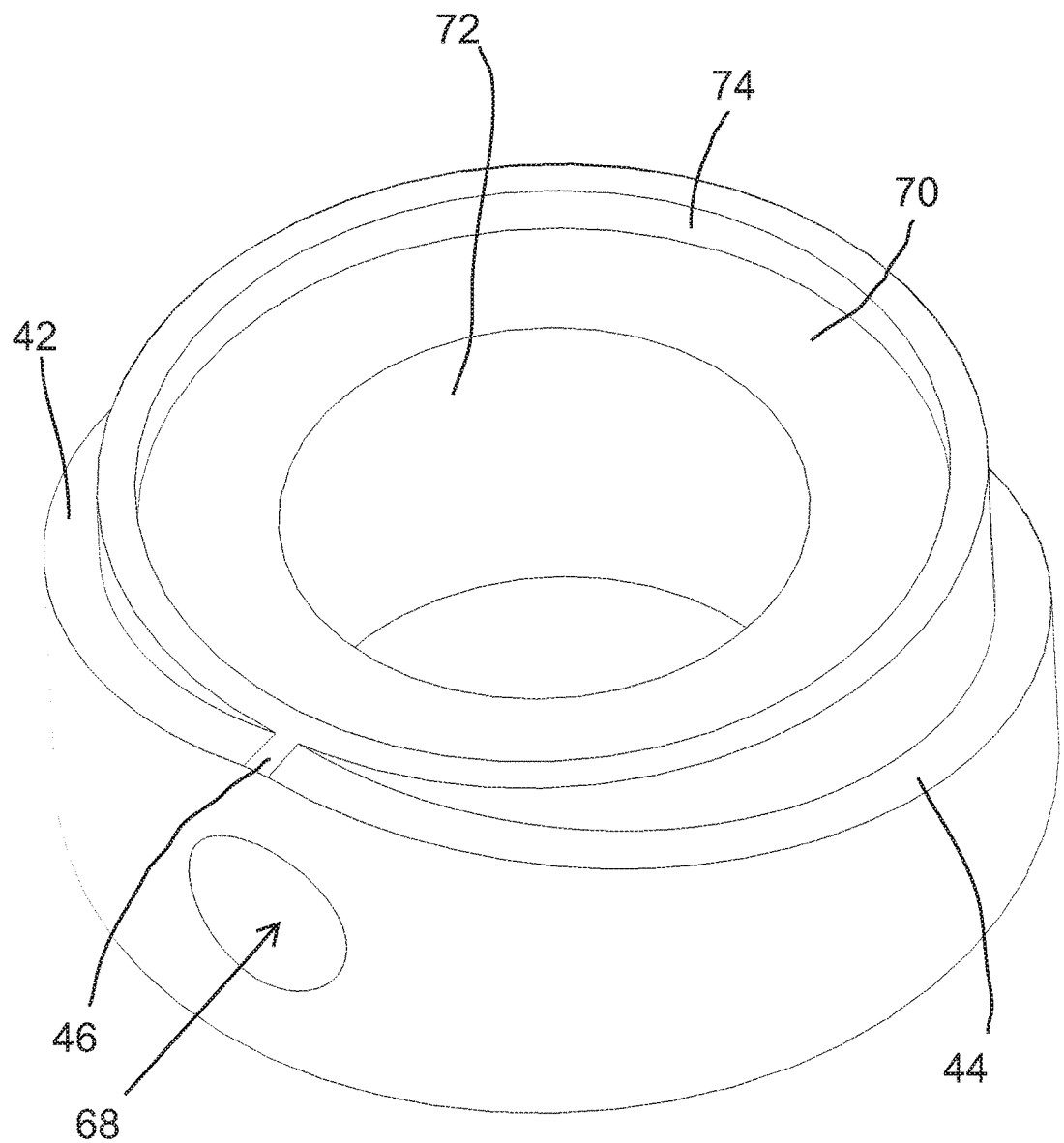

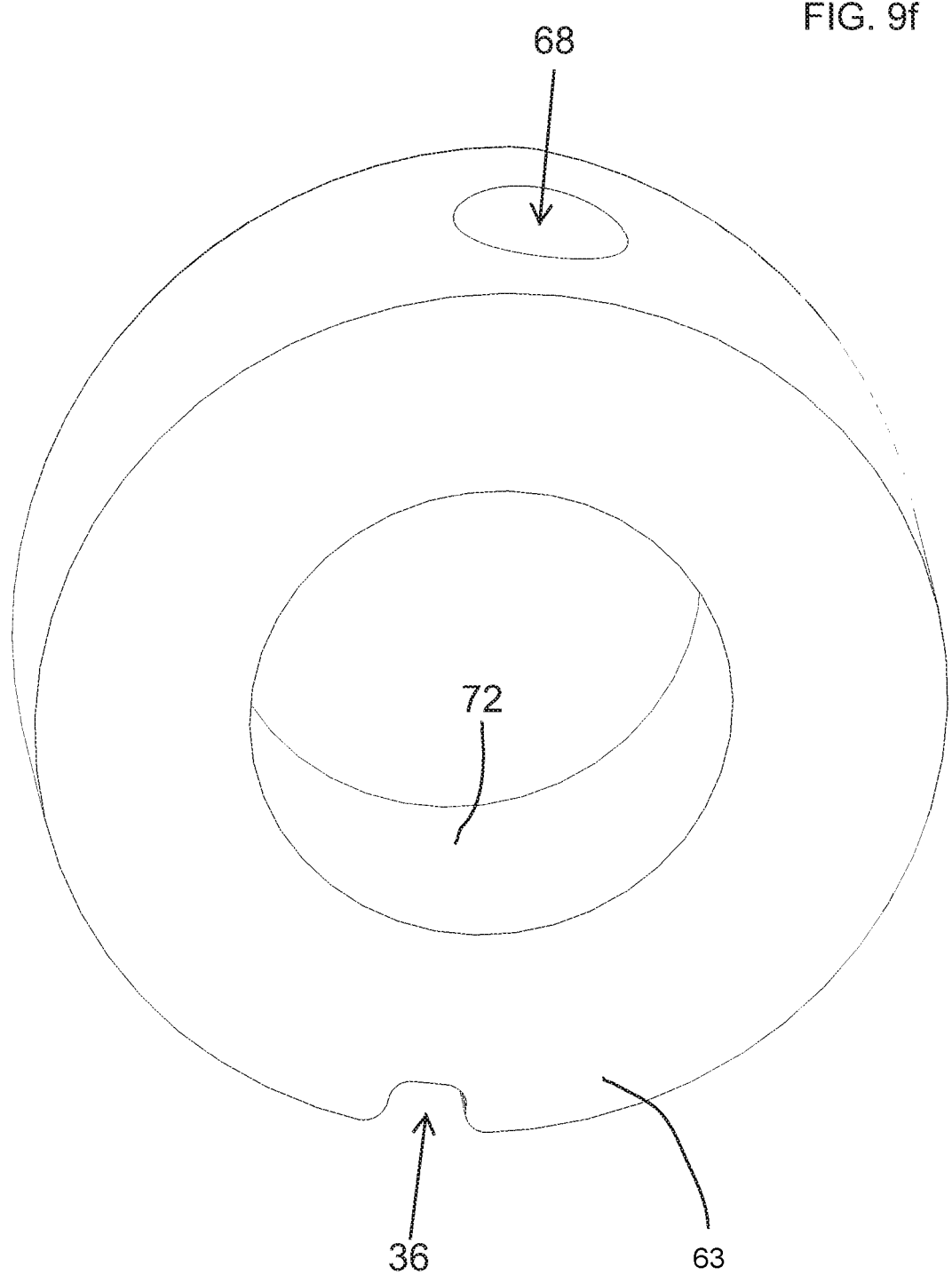

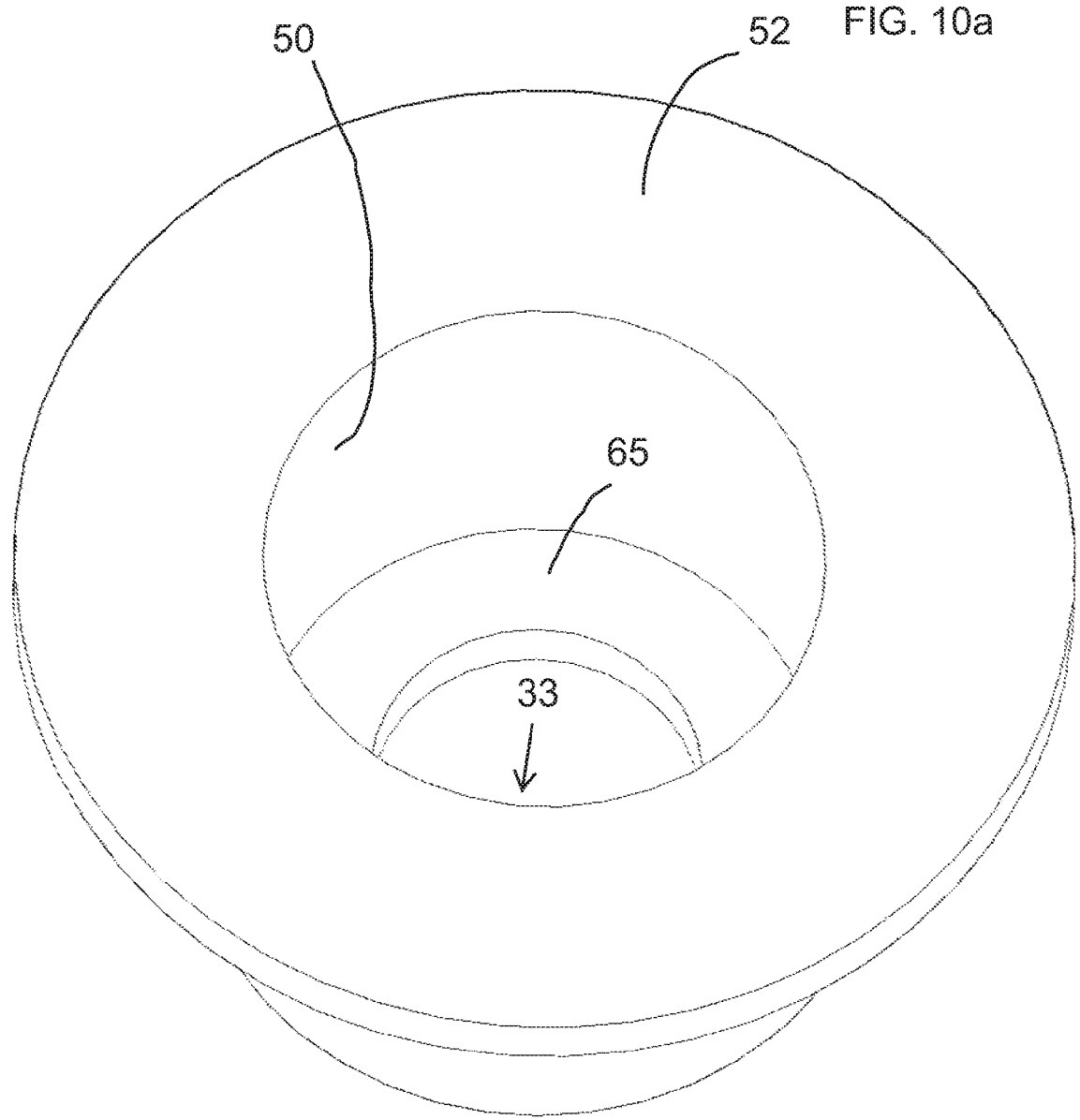

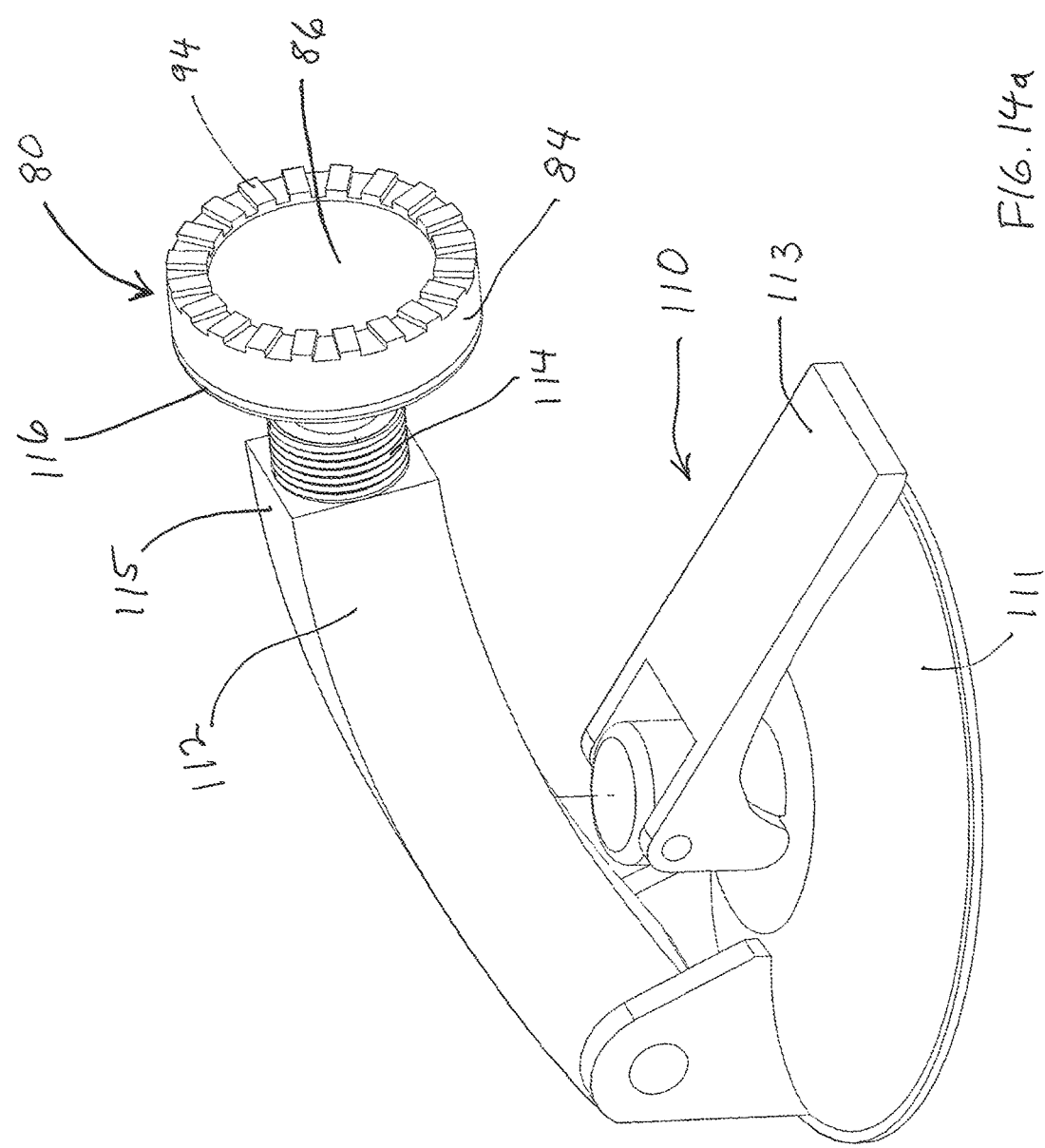

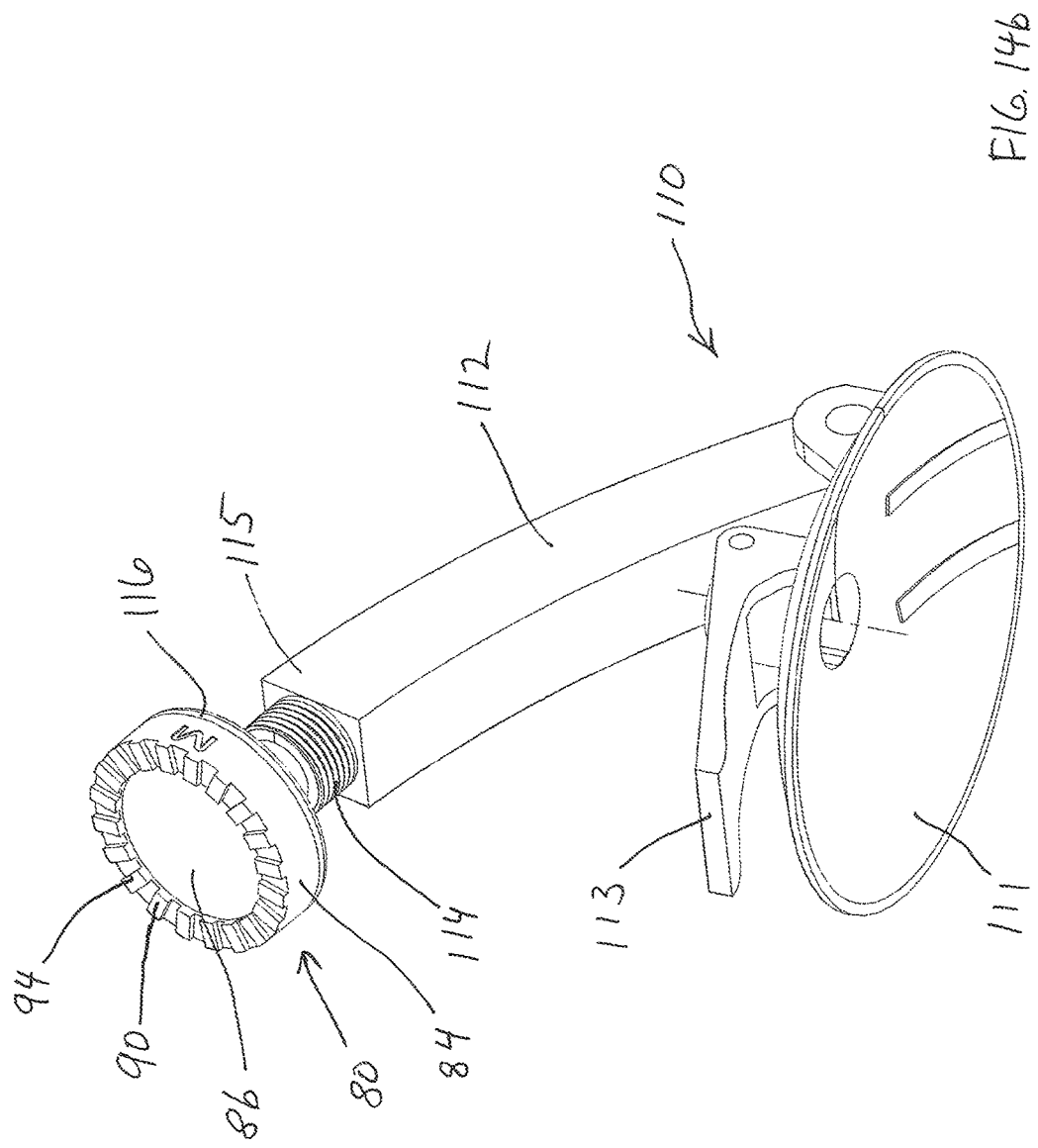

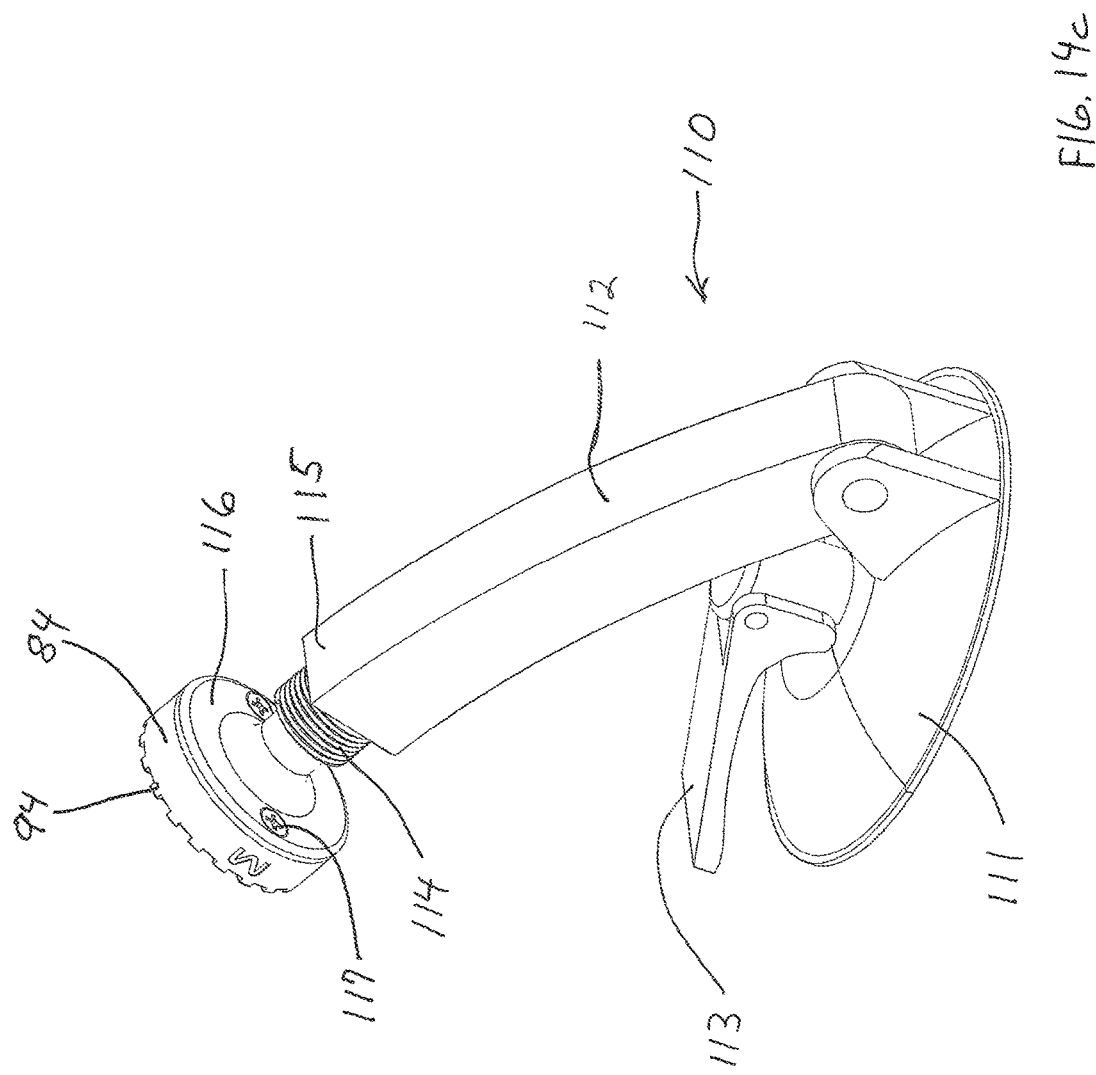

SELF-CENTERING AND ADJUSTABLE MOUNT

REFERENCE TO RELATED APPLICATION

This application is a Continuation-in-Part (CIP) of application Ser. No. 14/641,280, filed on Mar. 6, 2015, which is hereby incorporated by reference.

BACKGROUND OF THE INVENTION

Field of the Invention

The present invention relates generally to devices for removably mounting various articles, and more particularly, to quickly and securely removably mounting devices in predetermined locations.

Description of Related Art

Numerous types of mounting apparatuses exist for removably securing articles or devices to desired locations. For example, Garmin International, located in Olathe, Kans., manufactures the Nuvi GPS Windshield Suction Cup Mount and Bracket Bundle for removably securing portable GPS devices to the inside windshield of a vehicle. This suction cup mount requires a bracket that surrounds the entire GPS device and a relatively large suction cup to secure a GPS to a vehicle windshield. Annex Products, located in Prahran, Australia, manufactures the Quad Lock® bike mount for an IPhone® 6, which is a type of smartphone. The Quad Lock® bike mount requires a case that surrounds a smartphone, and the case is mechanically secured to a bracket that is attached to a bicycle with zip straps or zip ties. The mounting bracket of the Quad Lock® bike also requires significant space on the handlebars of a bicycle. Rokform, located in Santa Ana, Calif., manufactures a universal bike mount for securing a smartphone using a mounting bracket attached to the back of a smartphone. The mounting bracket can be attached to various mounting attachments, such as a suction cup, a magnet, and a bracket that is secured to handlebars of a bicycle.

While each of these known apparatuses for removably mounting a device to various locations, such as a bicycle, can be effective, each of these known apparatuses require significant space or real estate on the device and multiple physical movements to be secured, such as the Quad Lock®, with the need to push and twist, or the space needed on the location to which a device is to be removably secured, such as the handlebars on a bicycle. Accordingly, there is a need for a removable mounting apparatus that minimizes movement and the amount of space required on a device to be mounted and on a location for the device to be removably mounted.

ASPECTS AND SUMMARY OF THE PRESENT INVENTION

One aspect of the present invention is to provide a removable mount that minimizes the amount of space or real estate required on a device to attach the device to a desired location.

Another aspect of the present invention is to provide a removable mount that minimizes the amount of space or real estate required on a desired location to attach a device to that location.

A further aspect of the present invention is to provide a removable mount that automatically centers a device when it is attached to a predetermined mounting location.

An additional aspect of the present invention is to provide a removable mount that enables the orientation of a mounted device to be manually adjusted if desired.

In order to achieve these aspects and others, the Magnetik™ Mount of the present invention provides a self-centering and adjustable removable mount, such as for a bicycle, having a circular base with an outer periphery, an upper inner wall with a first diameter, and a lower inner wall with a second diameter, wherein the first diameter is greater than the second diameter. An inner platform is located between a bottom of the upper inner wall and a top of the lower inner wall. Opposing outer sloping edges are on the outer periphery of the circular base, and a notch is formed between bottoms of the opposing outer sloping edges. A cylindrical shell surrounds the outer sloping edges of the circular base, and the cylindrical shell includes a tab on a lower inner wall of the cylindrical shell sized to fit into the notch of the circular base, wherein the outer sloping edges of the circular base guide the tab to slip into the notch when the cylindrical shell is placed around the circular base, thereby positioning the cylindrical shell in a predetermined orientation. A base magnet is located within the circular base and above the inner platform, and a lid is to be located on a top of the cylindrical shell. An outer perimeter on the bottom cover of the lid is teethed and the top of the cylindrical shell is teethed, and the lid and the cylindrical shell interlock when the lid is positioned on top of the cylindrical shell. A lid magnet is located within the lid, wherein the lid magnet is magnetically attracted to the base magnet when the lid is positioned on top of the cylindrical shell. The lid is to be secured to the back of a device to be removably mounted, such as a smartphone. An anti-snag guide surrounding the perimeter of the lid can be included, wherein an inner wall of the anti-snag guide extends at least to a top of the teeth of the lid, and an outer perimeter of the anti-snag guide slopes outward toward the back of the phone.

A circular housing having a top surface and a bottom surface, and an inner chamber, where a ring on the top surface of the circular housing has a teethed upper surface, and a housing magnet is located within the inner chamber of the housing. A lid is to be located on the top surface of the housing, and a lid magnet located within the lid is magnetically attracted to the housing magnet when the lid is positioned on top surface of the housing. The outer perimeter of the top surface of the lid is teethed, and the teethed outer perimeter of the top surface of the lid and the teethed upper surface of the ring interlock when the lid is positioned on top surface of the housing.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIG. 1a is an enlarged view of the smartphone secured to the bicycle using the mount of the present invention of FIG. 1 shown from a different angle;

FIG. 2a is a perspective view of the top of the mount shown in FIG. 1a;

FIG. 2b is a perspective view of the bottom of the mount shown in FIGS. 1a and 2a;

FIG. 5c is a perspective view of the top of the lid shown in FIGS. 5a and 5b;

FIG. 6b is a perspective view of the shell shown in FIG. 6a from a different angle;

FIG. 7b is a perspective view of the cylindrical shell shown in FIG. 6a from a different angle;

FIG. 7c is a perspective view of the bottom of the cylindrical shell shown in FIGS. 6a and 6b shown from a different angle;

FIG. 8a is a perspective view of the top of the circular base and the cylindrical insert of the mount shown in FIG. 3a;

FIG. 9b is a perspective view of the top of the circular base shown in FIG. 9a;

FIG. 9c is a perspective view of the top of the circular base shown in FIGS. 9a and 9b from a different angle;

FIG. 9f is a perspective view of the bottom of the circular base shown in FIGS. 9a-9e from a different angle;

FIG. 10a is a perspective view of the top of the cylindrical insert shown in FIGS. 8a-8f;

FIG. 11b is a top view of the surface mount shown in FIG. 11a;

FIG. 13b is another perspective view of the surface mount and iPad® shown in FIG. 13a;

FIG. 14a is a perspective view of the surface mount secured to a suction cup mount;

FIG. 14b is another perspective view of the surface mount on a suction cup mount shown in FIG. 14a;

FIG. 14c is another perspective view of the surface mount secured to a suction cup mount as shown in FIGS. 14a and 14b;

FIG. 16b is a rear view of the two surface mounts on a crossbar shown in FIG. 16a;

FIG. 16e is an exploded view of the front view shown in FIG. 16a

DETAILED DESCRIPTION OF THE PREFERRED EMBODIMENTS

Figure 1:
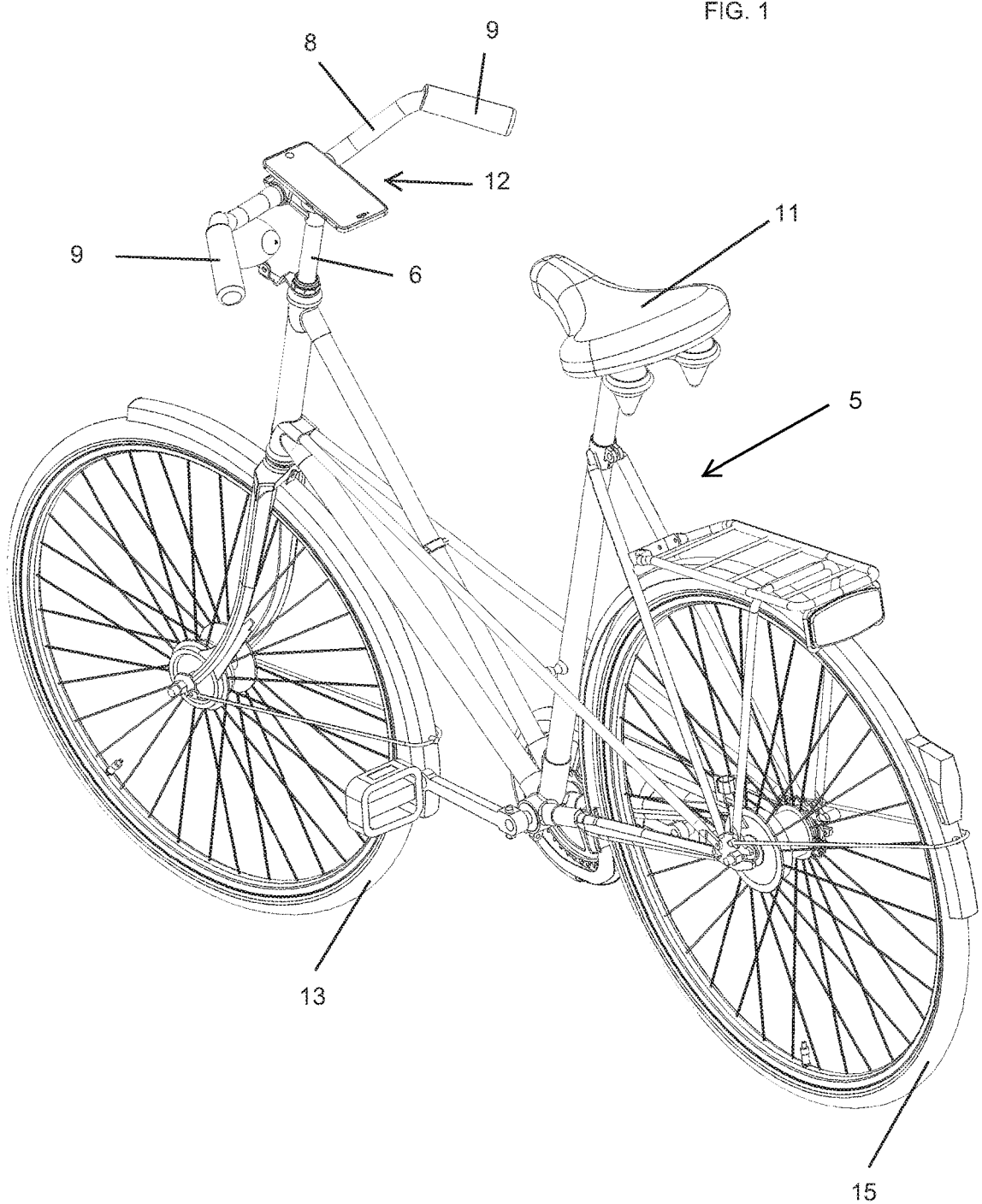
FIG. 1 is a perspective view of a bicycle including a mount configured in accordance with the present invention to secure a smartphone to a steering column of the bicycle.

Referring now to the drawings, FIG. 1 is a perspective view of a bicycle 5 including a steering column 6, handlebars 8, handgrips 9, and a seat 11. The bicycle 5 includes a front wheel 13 and a rear wheel 15. In accordance with the present invention, a smartphone 12 is removably secured to the top of the steering column 6 of the bicycle 5 using a magnetic mount.

FIG. 1a is enlarged view of the steering column 6, handlebars 8, and smartphone 12 shown in FIG. 1 from a different angle looking upward. Further shown is a stem 14 for connecting the handlebars 8 to the steering column 6. The handlebars 8 are secured to the stem 14 using a clamping bracket 16.

In accordance with the present invention, a mount 10 is provided for securing the smartphone 12 to the top 17 of the steering column 6. The mount 10 includes a lid 18 connected to the back 19 of the smartphone 12. A circular base 20 of the mount 10 is connected to the top 17 of the steering column 6, and a cylindrical shell 22 of the mount 10 connects the lid 18 to the circular base 20. The lid 18 is connected to the cylindrical shell 22.

Figure 1B:
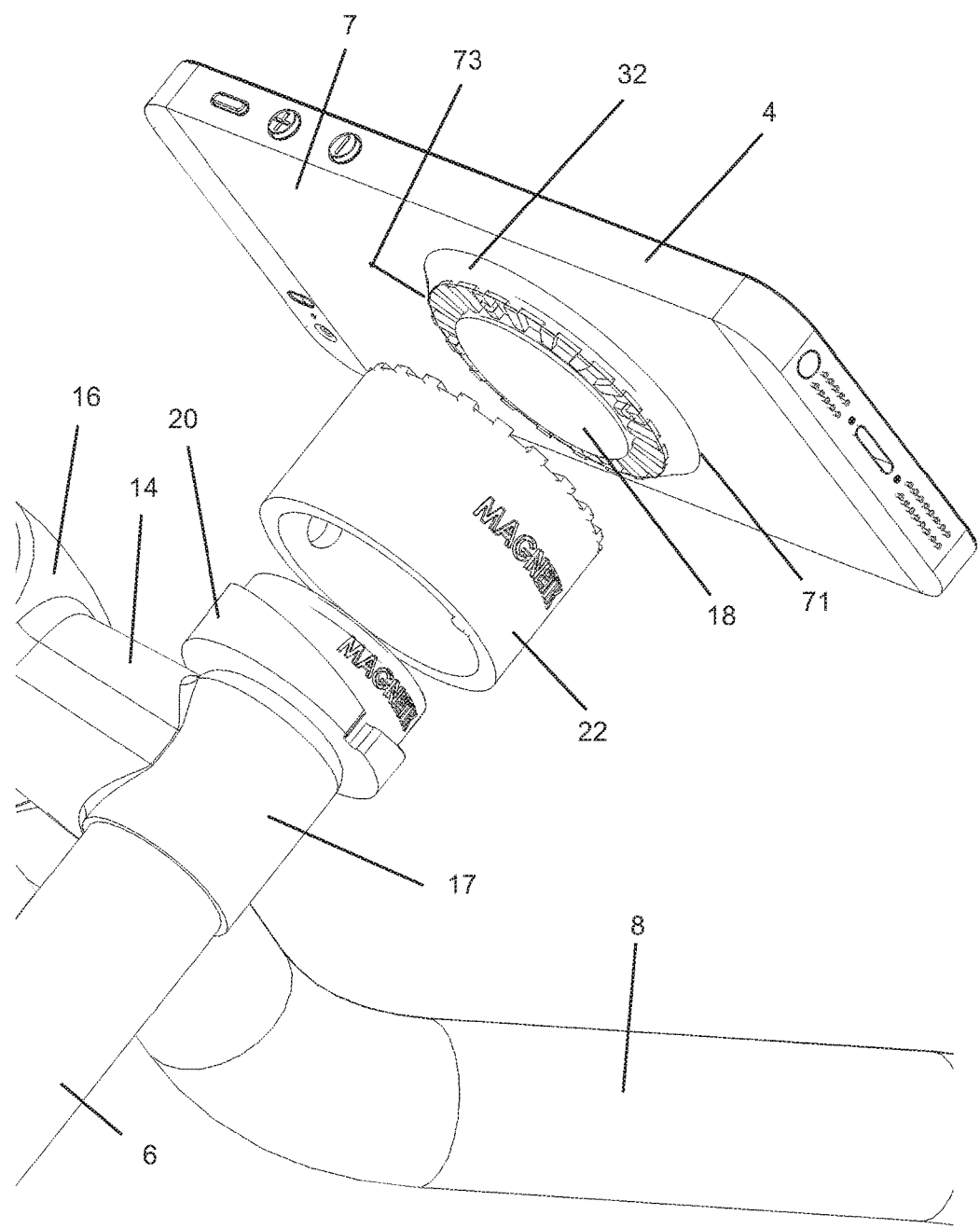
FIG. 1b is an exploded view of a smartphone on the bicycle using the mount of present invention shown in FIG. 1, wherein a smartphone includes an anti-snag guard on a lid of the mount.

FIG. 1b is an enlarged exploded view of the mount 10 shown in FIG. 1a, except the lid 18 includes an anti-snag guide 32 which surrounds the periphery of the lid 18. The anti-snag guide 32 slopes outward towards a back 7 of the smartphone 4. The bottom 71 of the anti-snag guide 32 is secured to the back 7 of the smartphone 4, and the top 73 of the anti-snag guide 32 extends to at least the top of the teeth 26 of the lid 18. The anti-snag guide 32 preferably is constructed of rubber or other elastic material and is stretched around the lid 18 to be secured to the lid 18 and smartphone 4.

Figure 2A:
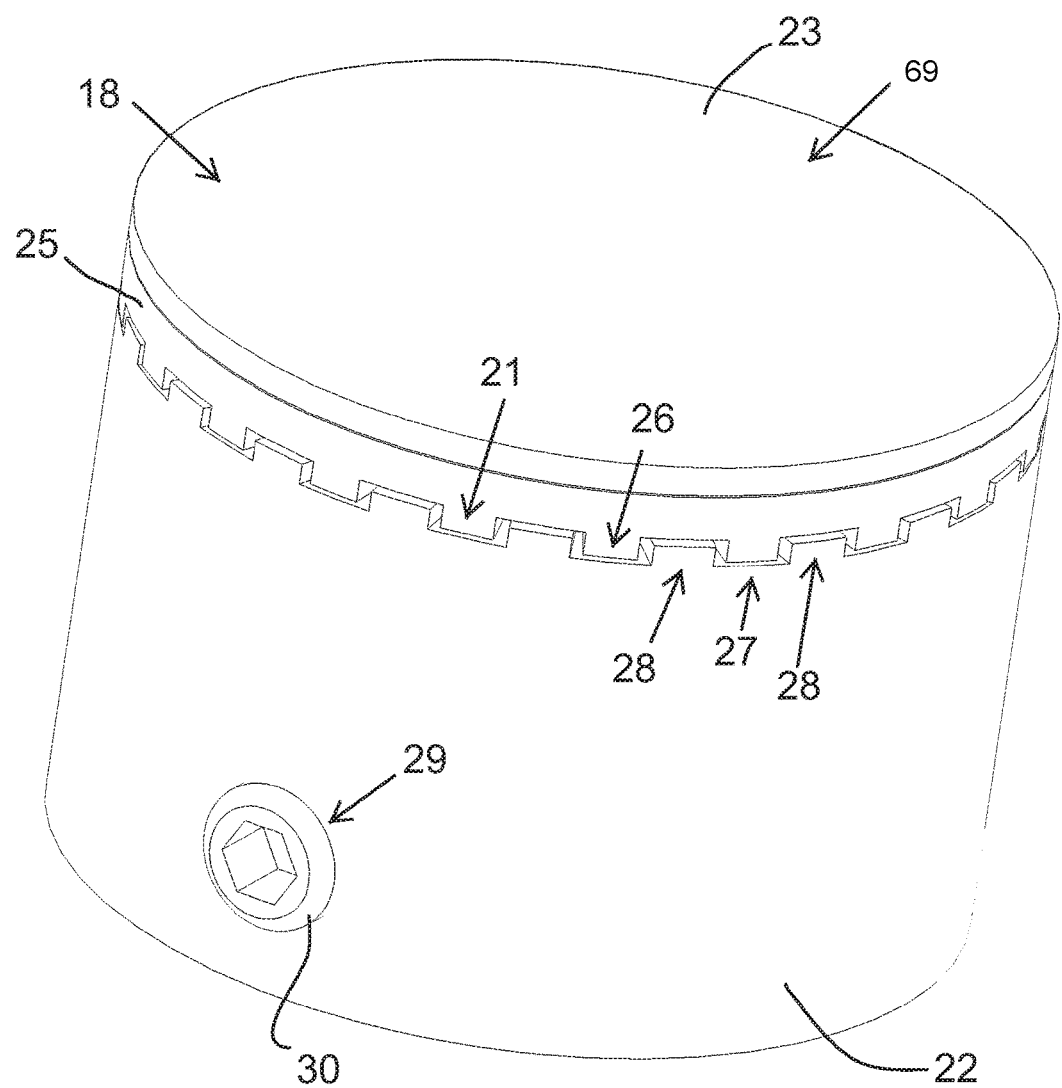

FIG. 2a is an enlarged perspective view of the mount 10 shown in FIG. 1a and configured in accordance with the present invention, wherein the complete mount 10 has been removed from both the bicycle 5 and the smartphone 12. The mount 10 includes the lid 18 and the cylindrical shell 22. The lid 18 includes a top cover 23 and a bottom cover 25. The bottom 21 of the bottom cover 25 is teethed 26 around the periphery. The top cover 23 and the bottom cover 25 of the lid 18 are preferably molded from a polymer, such as plastic. The top 69 of the top cover 23 of the lid 18 preferably includes an adhesive, such as 3M 4646 VHB, for securing the lid 18 to a device or an article to be removably mounted, such as a smartphone or a handheld global positioning system (GPS).

A cylindrical shell 22 is located below the lid 18. The top 27 of the cylindrical shell 22 is teethed 28. The teething 28 of the cylindrical shell 22 and the teething 26 of the lid 18 are sized so as to interlock when the bottom 21 of the lid 18 is placed on the top 27 of the cylindrical shell 22. The cylindrical shell 22 includes a threaded aperture 29 on the side for receiving a bolt 30. The bolt 30 can be tightened to secure the cylindrical shell 22 to a circular base 20 (FIG. 2b).

FIG. 2b is a perspective view of the bottom 31 of the mount 10 shown in FIG. 2a. FIG. 2b illustrates a circular base 20 located within the cylindrical shell 22. A cylindrical insert 34 is located within the circular base 20. An aperture 33 is located within the cylindrical insert 34 for receiving a bolt, such as bolt 54 in FIG. 3b, to secure the mount 10 to a desired location. A tab 35 is located on an inner wall 37 of the cylindrical shell 22. A notch 36 is located within the circular base 20, and the tab 35 is sized to be received within the notch 36. The tab 35 and the notch 36 function to properly position the cylindrical shell 22 over and around the circular base 20.

Figure 3:
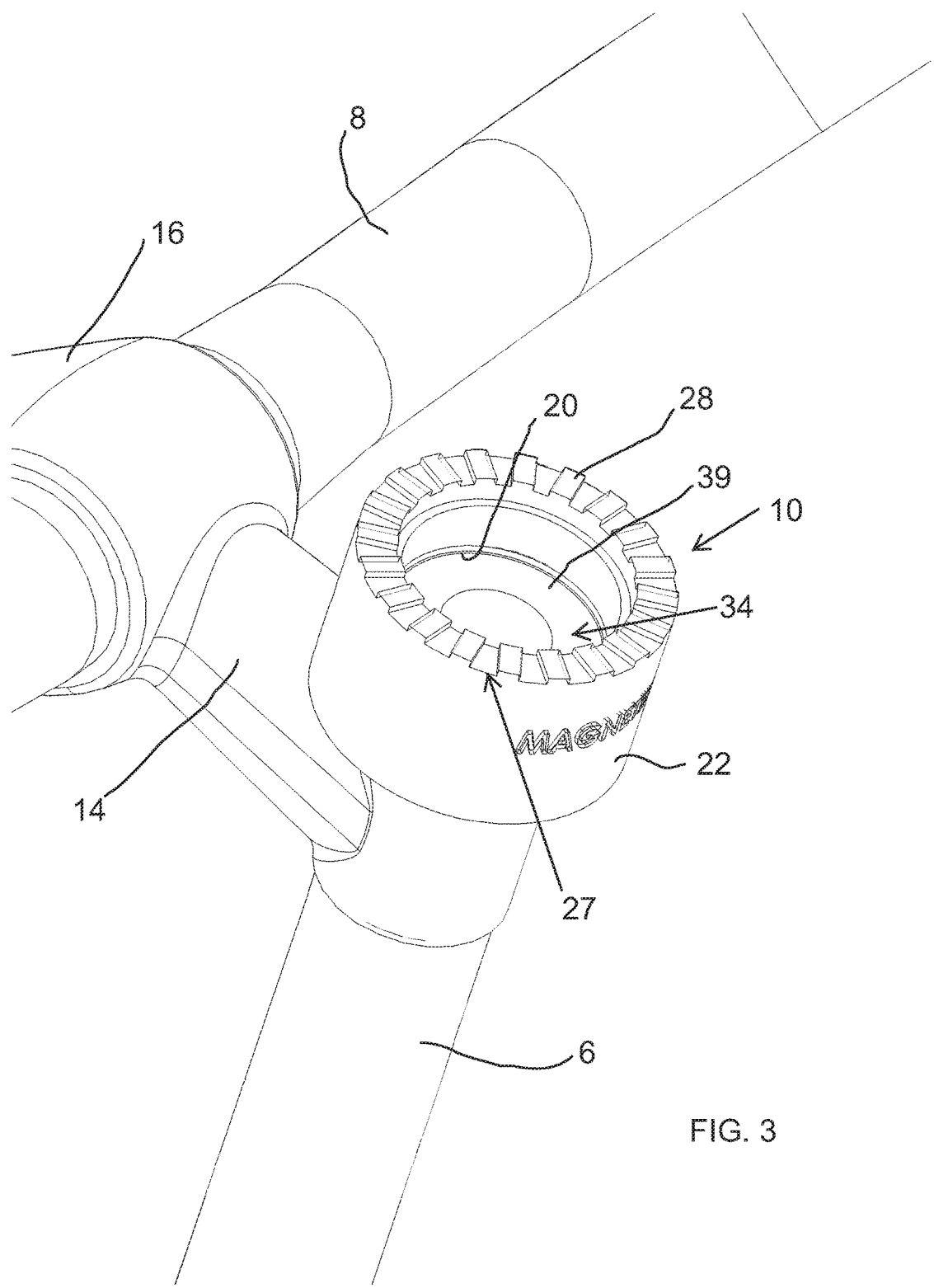
FIG. 3 is an enlarged perspective view of the mount of the present invention shown in FIGS. 1a and 2a wherein the smartphone has been removed from the mount.

FIG. 3 is an enlarged perspective view of the mount 10 on the steering column 6 of the bicycle 5 shown in FIGS. 1 and 2, wherein the smartphone 12 and lid 18 have been removed. An upper rim 39 of the cylindrical insert 34 is shown located within the circular base 20, and the cylindrical shell 22 is located around and over the circular base 20. A first magnet or base magnet 40 (FIG. 6a) is to be located within the cylindrical shell 22, and the base magnet 40 attracts and secures the cylindrical shell 22, which is constructed of a magnetic metal, to the circular base 20. The teeth 28 on the top 27 of the cylindrical shell 22 are further illustrated in FIG. 3.

Figure 3A:
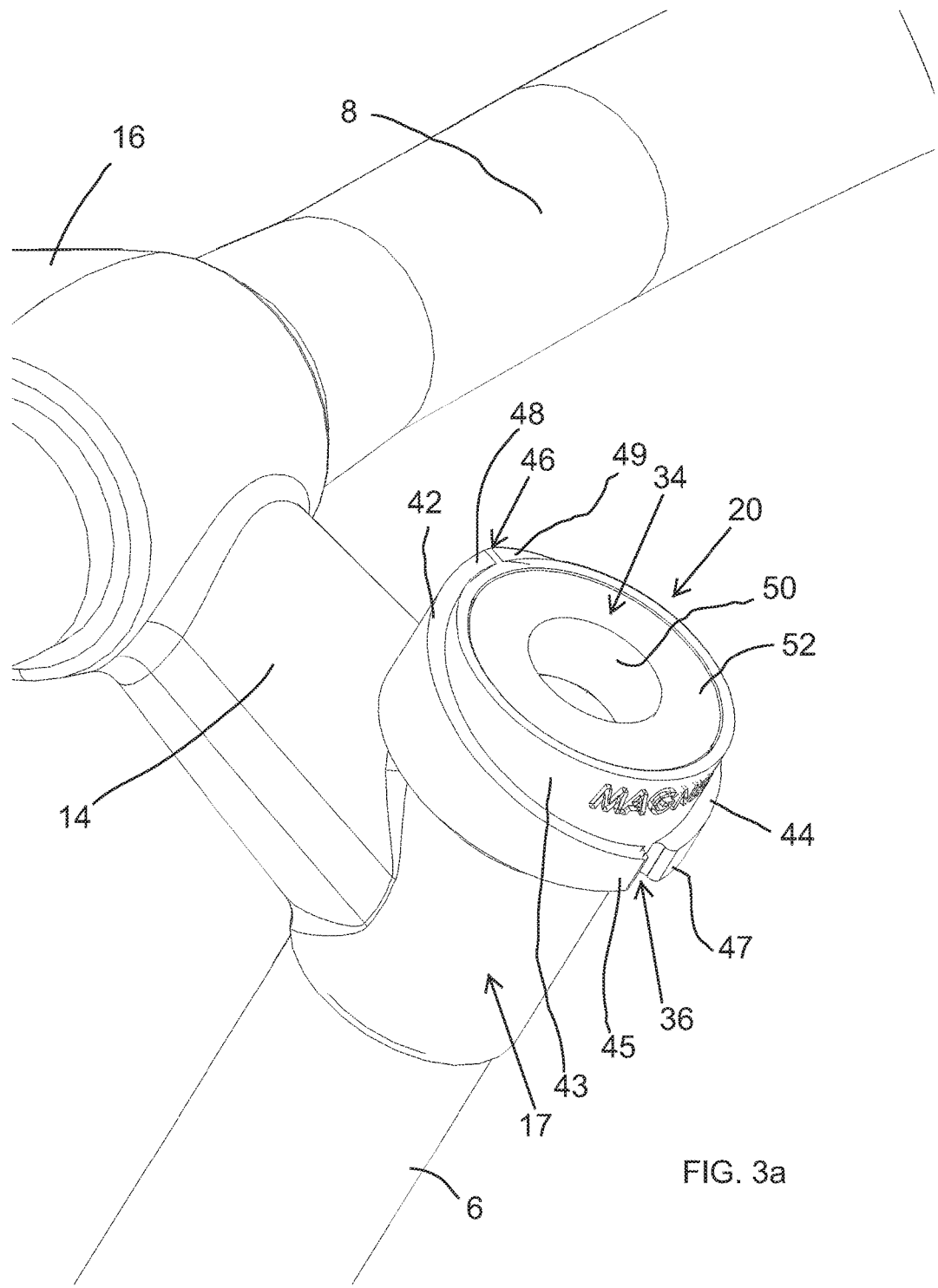
FIG. 3a is an enlarged view of the steering column of the bicycle and the mount shown is FIGS. 1a, 2a and 3, wherein the smartphone and a cylindrical shell of the mount have been removed exposing a circular base of the mount.

FIG. 3a is an enlarged perspective view of the handlebars 8 and the circular base 20 of the mount 10, wherein the cylindrical shell 22 has been removed to more clearly illustrate the circular base 20. Also illustrated are the clamping bracket 16, stem 14, and steering column 6.

In accordance with the present invention, the circular base 20 includes opposing sloping edges 42, 44 on the outer wall 43 of the circular base 20. A notch 36 is formed between the bottoms 45,47 of the opposing sloping edges 42,44. A plateau 46 is formed between the tops 48,49 of the opposing sloping edges 42,44. The circular base 20 is preferably constructed of non-magnetic metal or plastic. A cylindrical insert 34 is located within the circular base 20. The cylindrical insert 34 includes a cylindrical body 50 having an upper outer rim 52 on the outer surface of the cylindrical body 50.

Figure 3B:
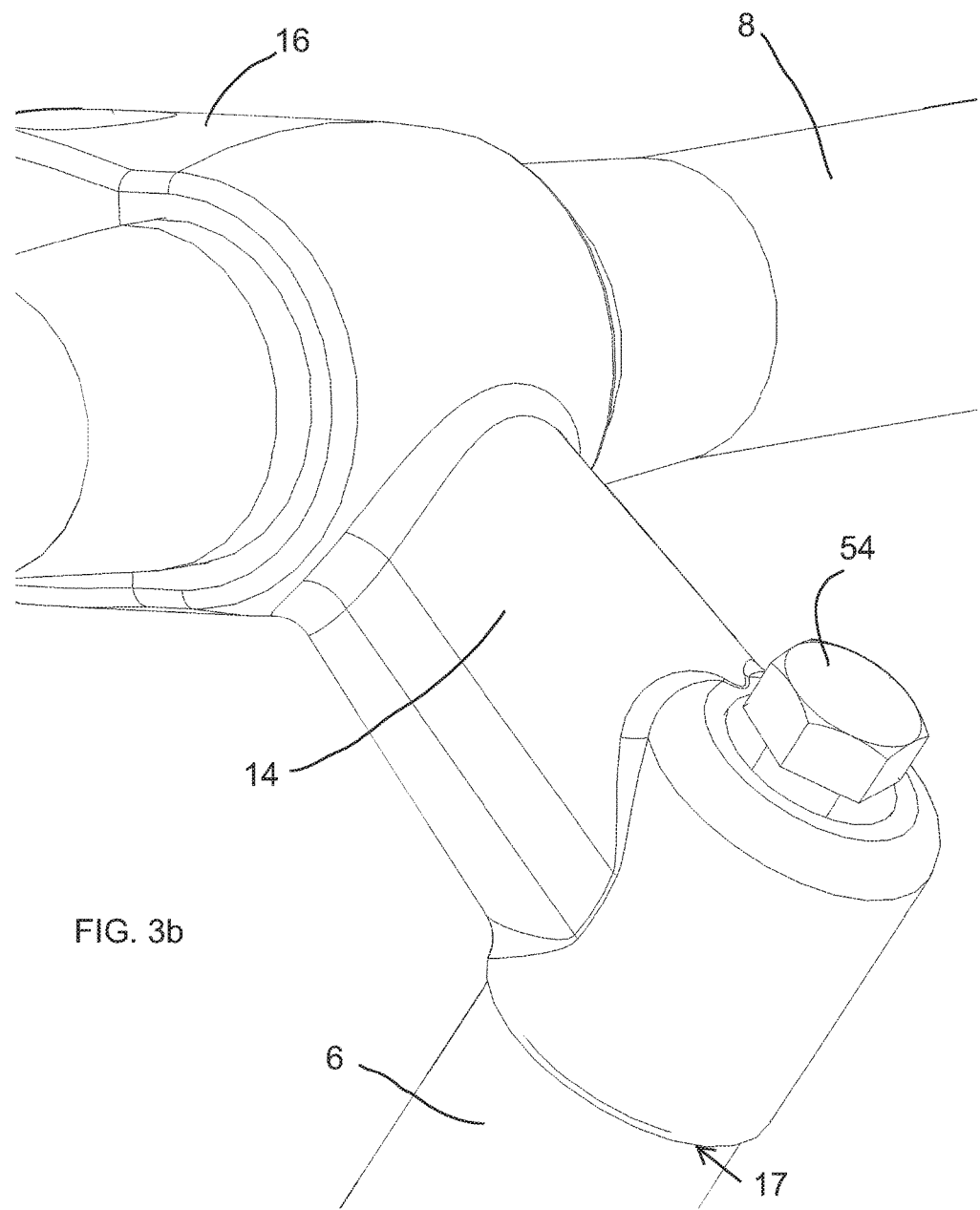
FIG. 3b is another view of the steering column of bicycle shown in FIG. 3a, wherein the mount has been removed, exposing a bolt in the bicycle for tightening components of the steering column, and that bolt is utilized by present invention to secure the circular base to the top of the steering column.

FIG. 3b is an enlarged perspective view of the handlebars 8 and steering column 6 shown in FIG. 3a, wherein components of the mount 10 have been removed, exposing the bolt 54 for tightening the bicycle components of the steering column 6. In accordance with the present invention, the bolt 54 fits through the aperture 33 of the cylindrical insert 34 to secure the circular base 20 to the top 17 of the steering column 6. Most, if not all, bikes have a very long bolt such as bolt 54 that hold the entire structure of the steering column 6 of a bicycle together. This bolt generally has plenty of extra thread to allow it to be unscrewed and have an object, like our Magnetik™ base mount 10 of the present invention, to be inserted onto and screwed back down so everything is held together as if nothing changed other than there is now a circular base as a permanent interface to removably mount a phone or other desired item.

Figure 4A:
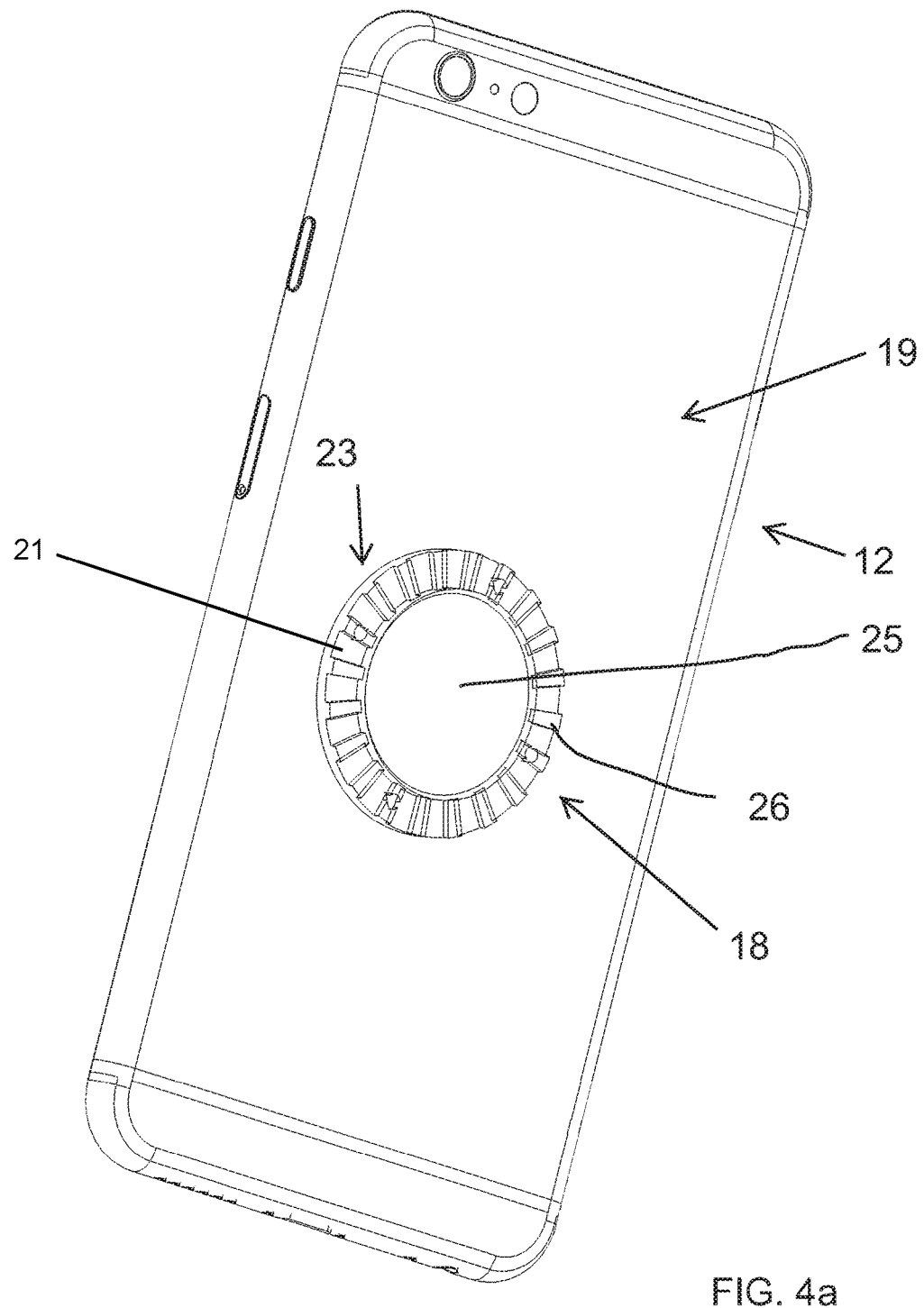
FIG. 4a is an enlarged perspective view of the smartphone shown in FIGS. 1 and 1a after removal from the mount of the present invention shown in FIGS. 1-3, and a lid from the mount can be seen attached to the back of the smartphone.
Figure 4B:
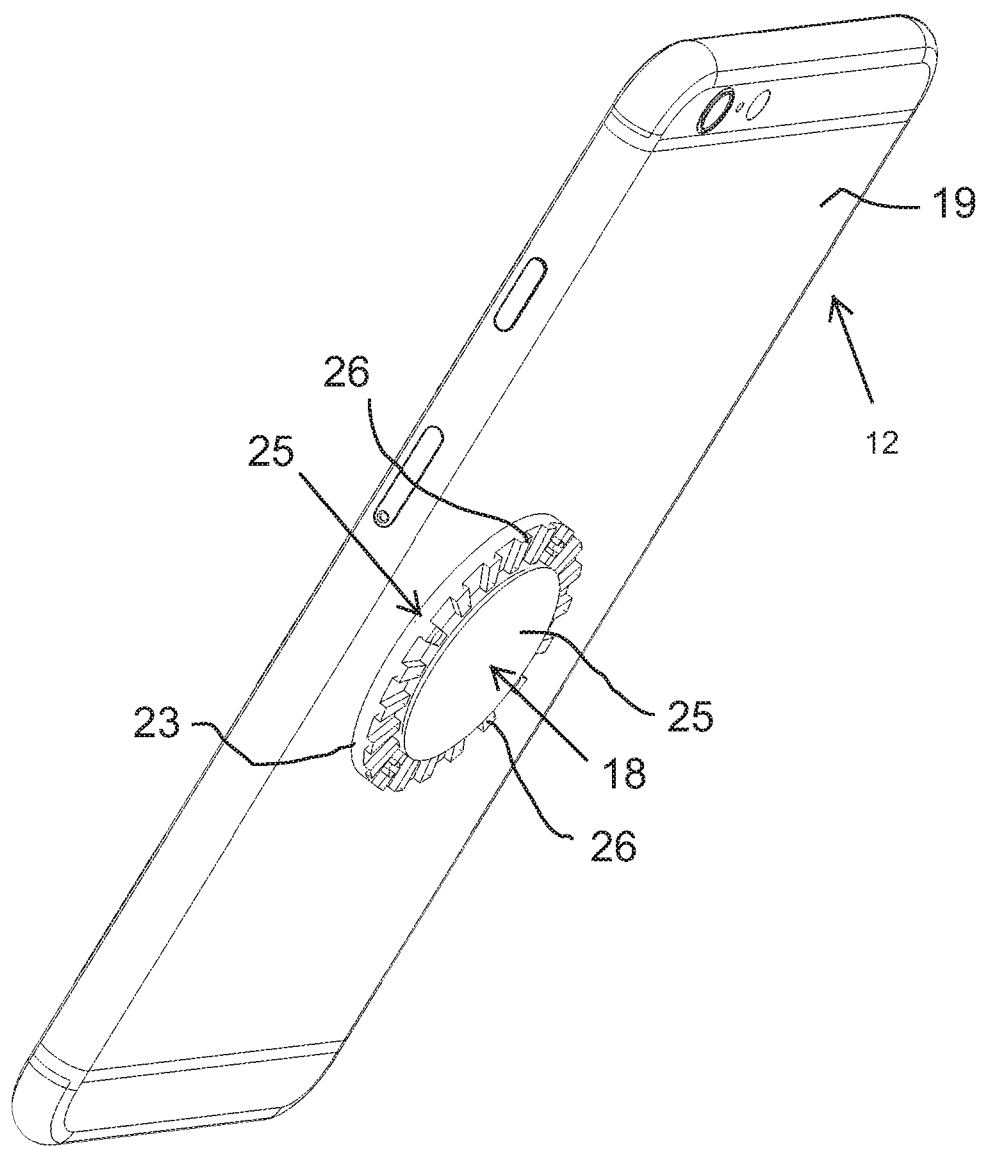
FIG. 4b is a perspective view of the smartphone shown in FIG. 4a from a different angle.

FIG. 4a is a perspective view of the back 19 of the smartphone 12 shown in FIGS. 1a and 2a. The top cover 23 of lid 18 is shown affixed to the back 19 of the smartphone 12, preferably by adhesive. The teeth 26 on the bottom 21 of the bottom cover 25 of the lid 18 are further illustrated. FIG. 4b is a perspective view of the back 19 of the smartphone 12, similar to FIG. 4a, but shown from a different angle. Illustrated again is the lid 18 preferably glued to the back 19 of the smartphone 12. The teeth 26 on the bottom cover 25 of the lid 18 also are visible.

Figure 4C:
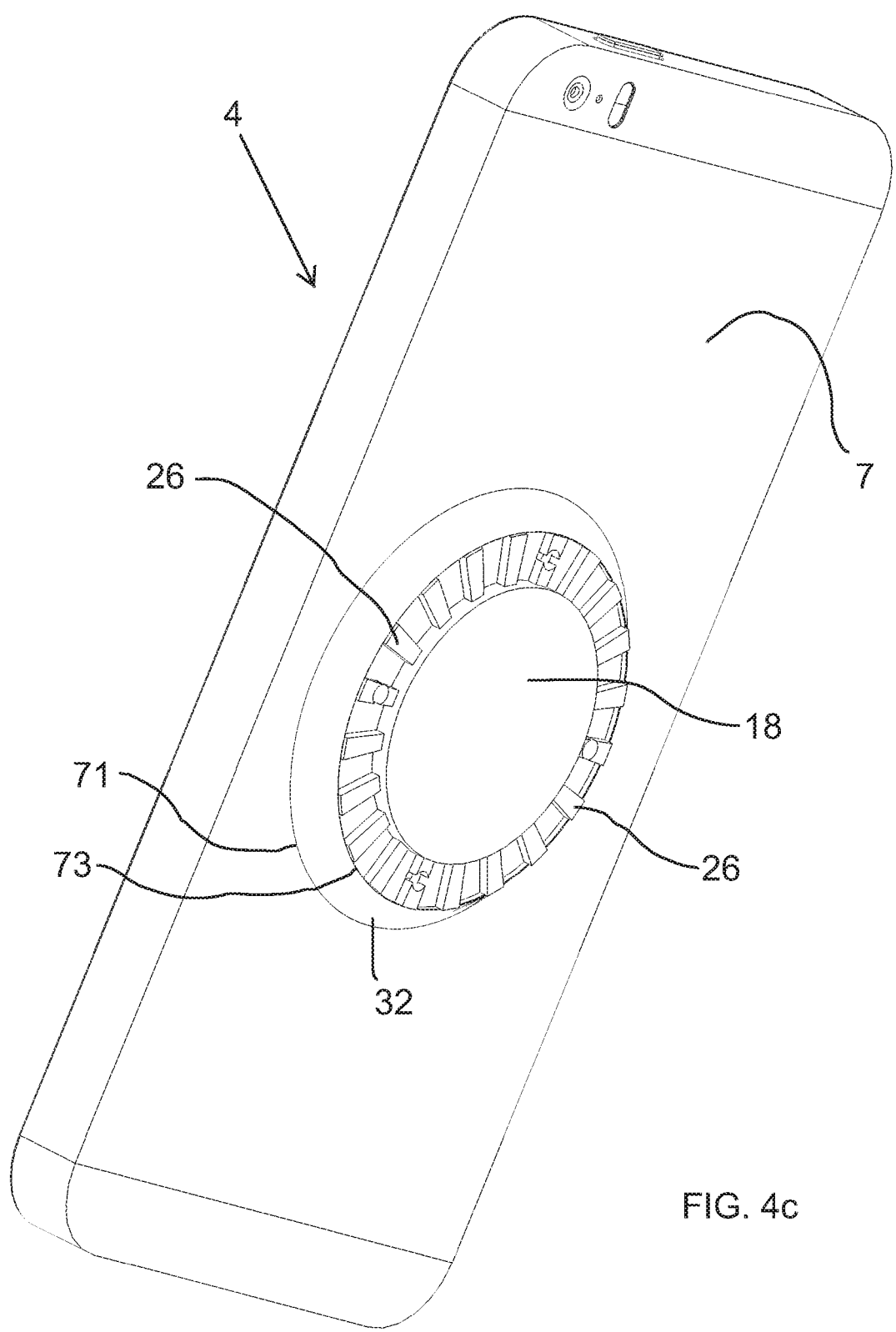
FIG. 4c is an enlarged perspective view of the smartphone shown in FIG. 1b including an anti-snag guide on the lid of the mount of the present invention.

FIG. 4c is an enlarged perspective view of the smartphone 4 and lid 18 including the anti-snag guide 32 shown in FIG. 1b. The anti-snag guide 32 surrounds the periphery of the lid 18. The anti-snag guide 32 slopes outward towards the back 7 of the smartphone 4. The bottom 71 of the anti-snag guide is secured to the back 7 of the smartphone 4, preferably by gluing, and the top 73 of the anti-snag guide 32 extends to at least the top of the teeth 26 of the lid 18. The anti-snag guide 32 preferably is constructed of an elastic plastic that stretch around the periphery of the lid 18.

Figure 5A:
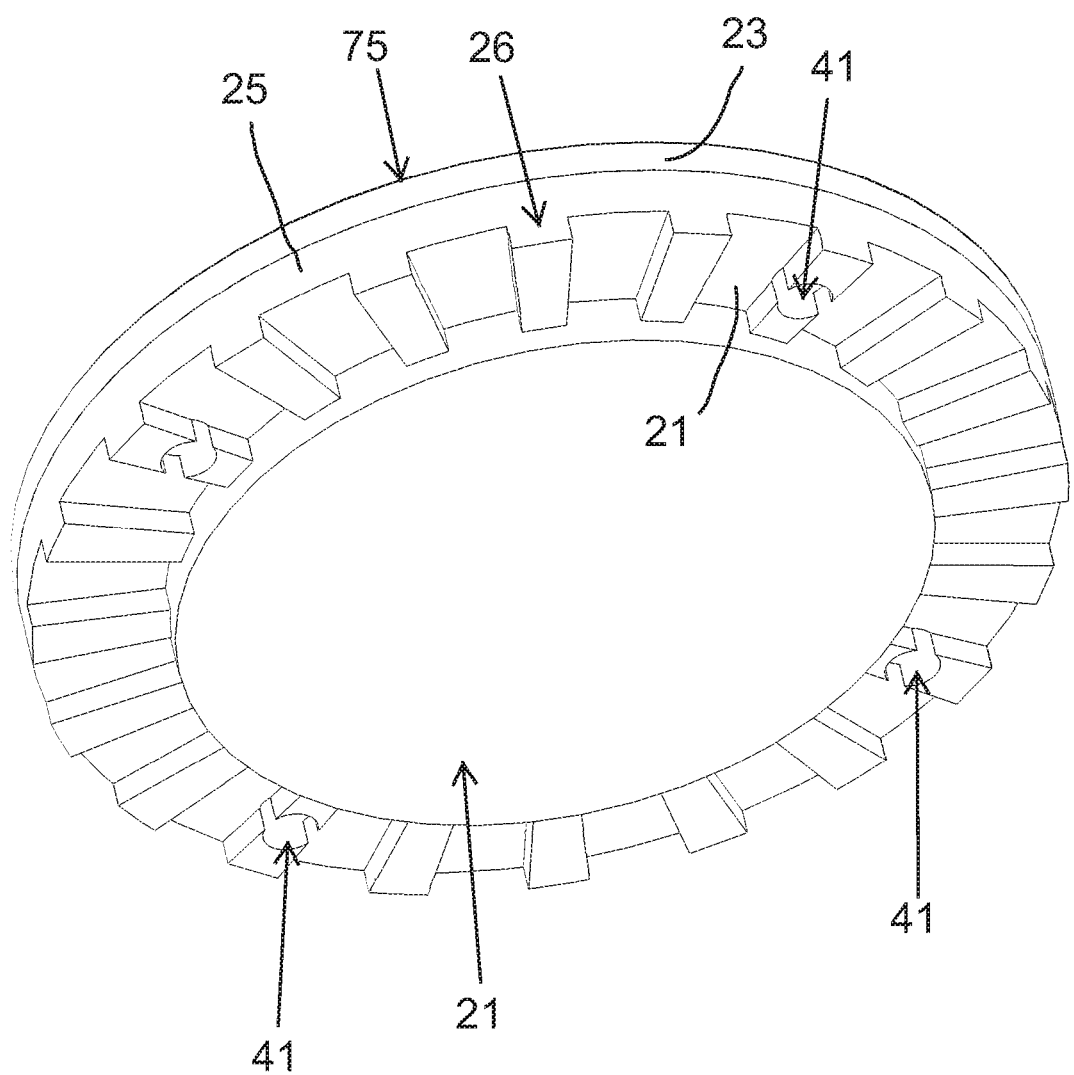
FIG. 5a is a perspective view of the bottom of the lid of the mount shown in FIGS. 4a and 4b removed from the smartphone.

FIG. 5a is a perspective view of the lid 18 including the top cover 23 and the bottom cover 25. An enlarged view of the teeth 26 on the periphery of the bottom 21 of the bottom cover 25 are further illustrated. Apertures 41 are included in the bottom cover 25 to facilitate alignment of the lid 18. The apertures 41 are located at 90 degrees from one another to enable a user to more accurately align the lid 18 at the desired location and desired orientation.

Figure 5B:
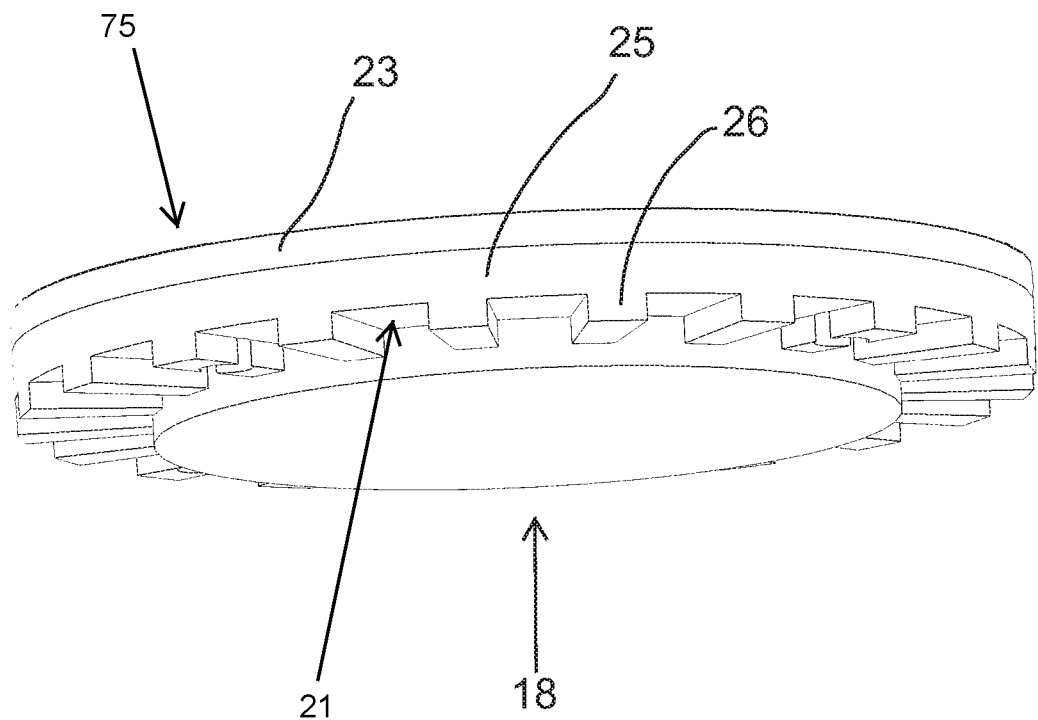
FIG. 5b is a perspective view of the lid shown in FIG. 5b from a different angle.

FIG. 5b is a perspective view of the side of the top cover 23 and bottom cover 25 of the lid 18 shown in FIG. 5a. The teeth 26 on the bottom or bottom face 21 of the bottom cover 25 of the lid 18 are clearly illustrated. The top 75 of the top cover 23 preferably includes an adhesive, such as 3M VHB adhesive, for securing the top 75 to a desired location, such as the back of a smartphone or other device.

FIG. 5c is a perspective view of the top surface 51 of the bottom cover 25 of the lid 18. The teeth 26 and apertures 41 can be seen. Also illustrated is the second magnet or lid magnet 56 located in a cavity 55 within the bottom cover 25 of the lid 18. The second magnet 56 is magnetically attracted to the first magnet 40 in the circular base 20 when the lid 18, attached to a smartphone or other device, is placed on top of the cylindrical shell 22, thus holding the lid 18 on the cylindrical shell 22.

The lid 18 preferably is milled out of aluminum or extruded with ABS plastic, which then has a 7-pound magnet mounted inside the cavity 55 using epoxy. The north and south poles on the magnet 40 are fixed in order to be attracted to the magnet 56 within the cylindrical shell 22 (FIG. 6a).

Figure 5D:
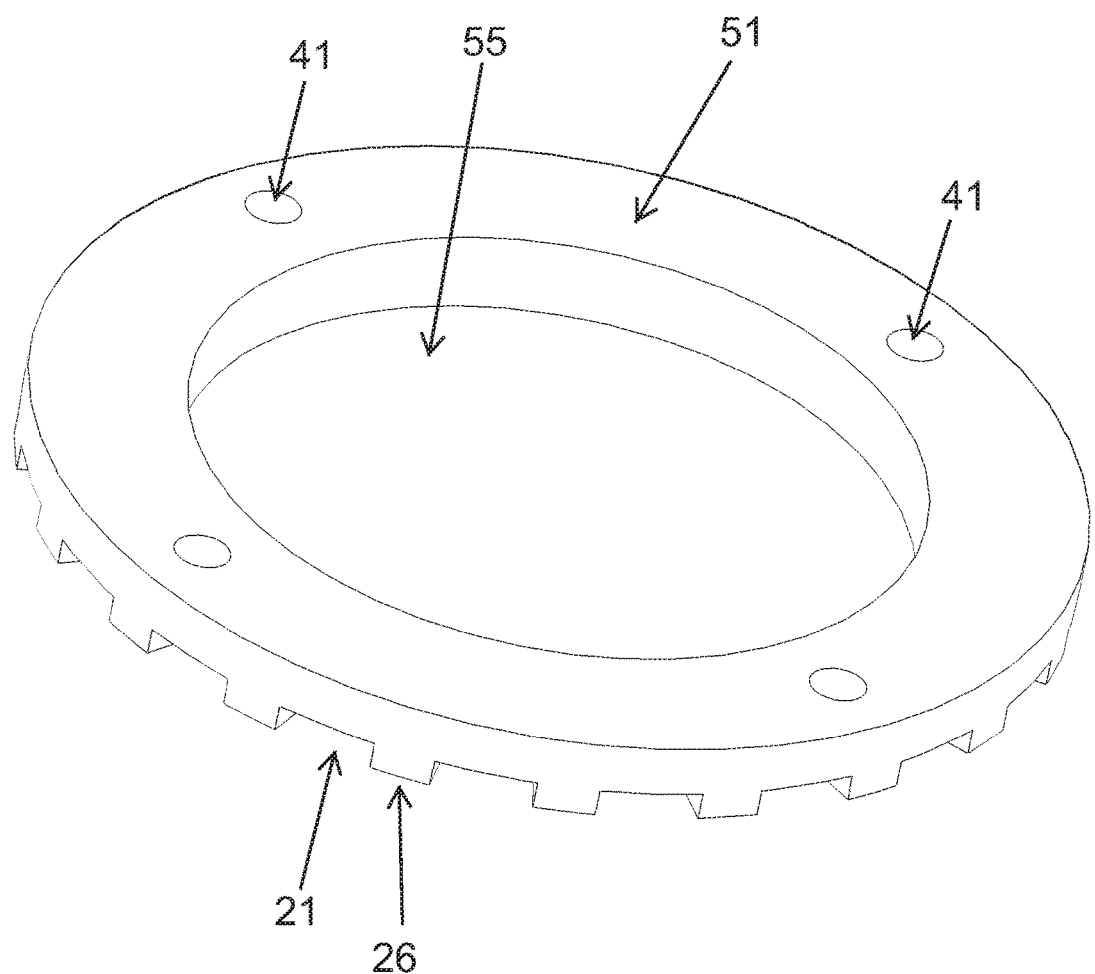
FIG. 5d is a perspective view of the top of the lid shown in FIGS. 5a-5c wherein the lid magnet has been removed.

FIG. 5d is a perspective view of the top surface 51 of the bottom cover 25 of the lid 18 shown in FIG. 5c, except the lid magnet 56 has been removed to more clearly see the cavity 55 for storing the magnet 56. The apertures 41 and the teeth 26 on the bottom surface or face 21 of the bottom cover 25 of the lid 18 also are illustrated.

Figure 6A:
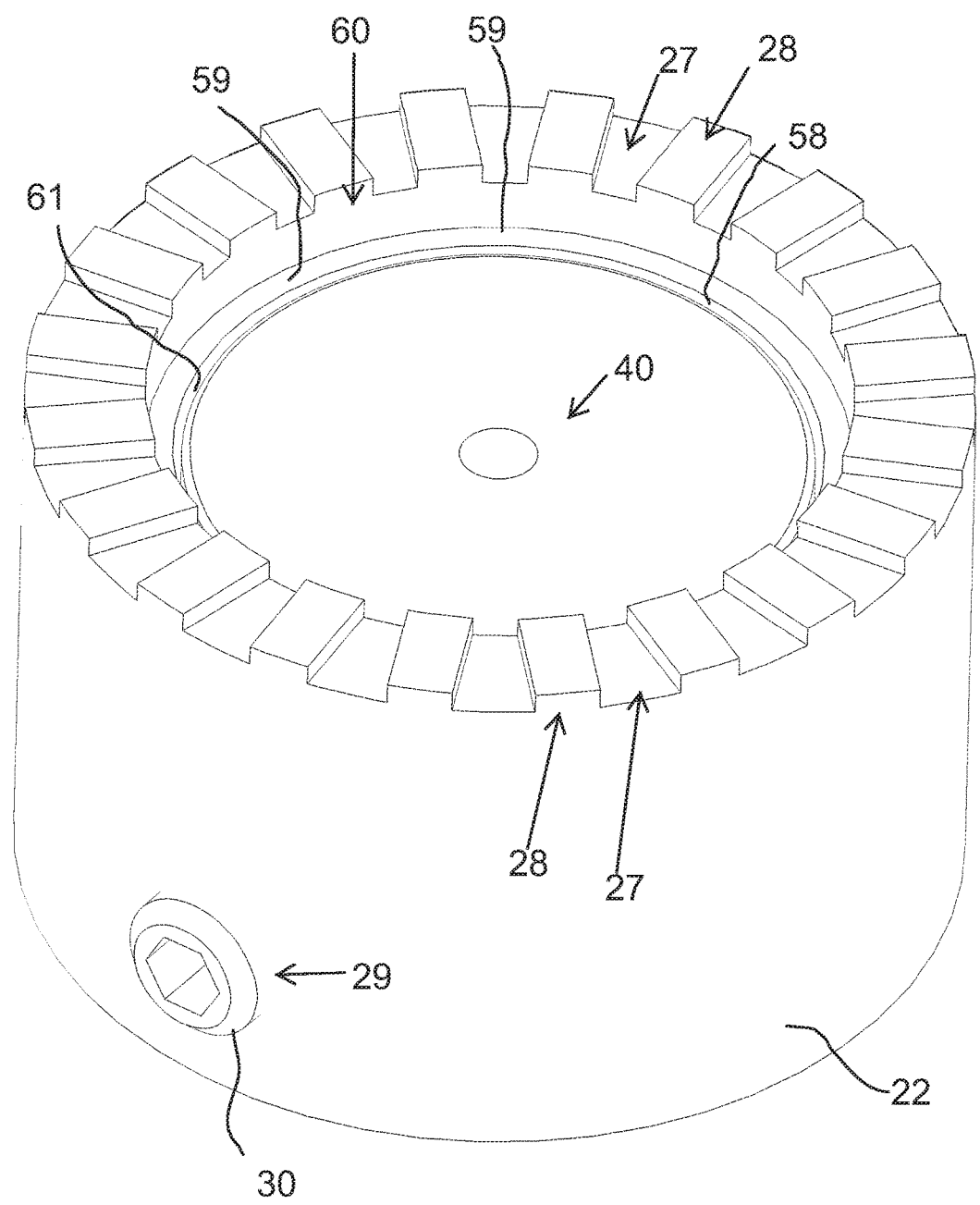
FIG. 6a is a perspective view of the top of a cylindrical shell of the mount shown in FIG. 3 including a base magnet and configured in accordance with the present invention.

FIG. 6a is a perspective view of the top 27 of the cylindrical shell 22 showing the teeth 28 on the top or top surface 27 of the cylindrical shell 22. The locking bolt or locking screw or bolt 30 is located within the threaded aperture 29. The base magnet 40 is shown located within a cavity 58 in the upper portion of the cylindrical shell 22. A ledge 59 is formed between the upper inner wall 60 of the cylindrical shell 22 and the side wall 61 of the cavity 58. The cylindrical shell 22 preferably is milled out of 6061-t6 aluminum or extruded ABS plastic. The base magnet 40 preferably is a 19-pound magnet mounted inside the cavity 58 using epoxy. The base magnet 40 is mounted to have a fixed north and south pole in order to attract to the second or lid magnet 56 within the lid 18.

FIG. 6b is a perspective view of the side of the cylindrical shell 22 shown in FIG. 6a. The teeth 28, top surface 27, and upper inner wall 60 of the cylindrical shell are illustrated. The lock bolt 30 also is illustrated.

Figure 6C:
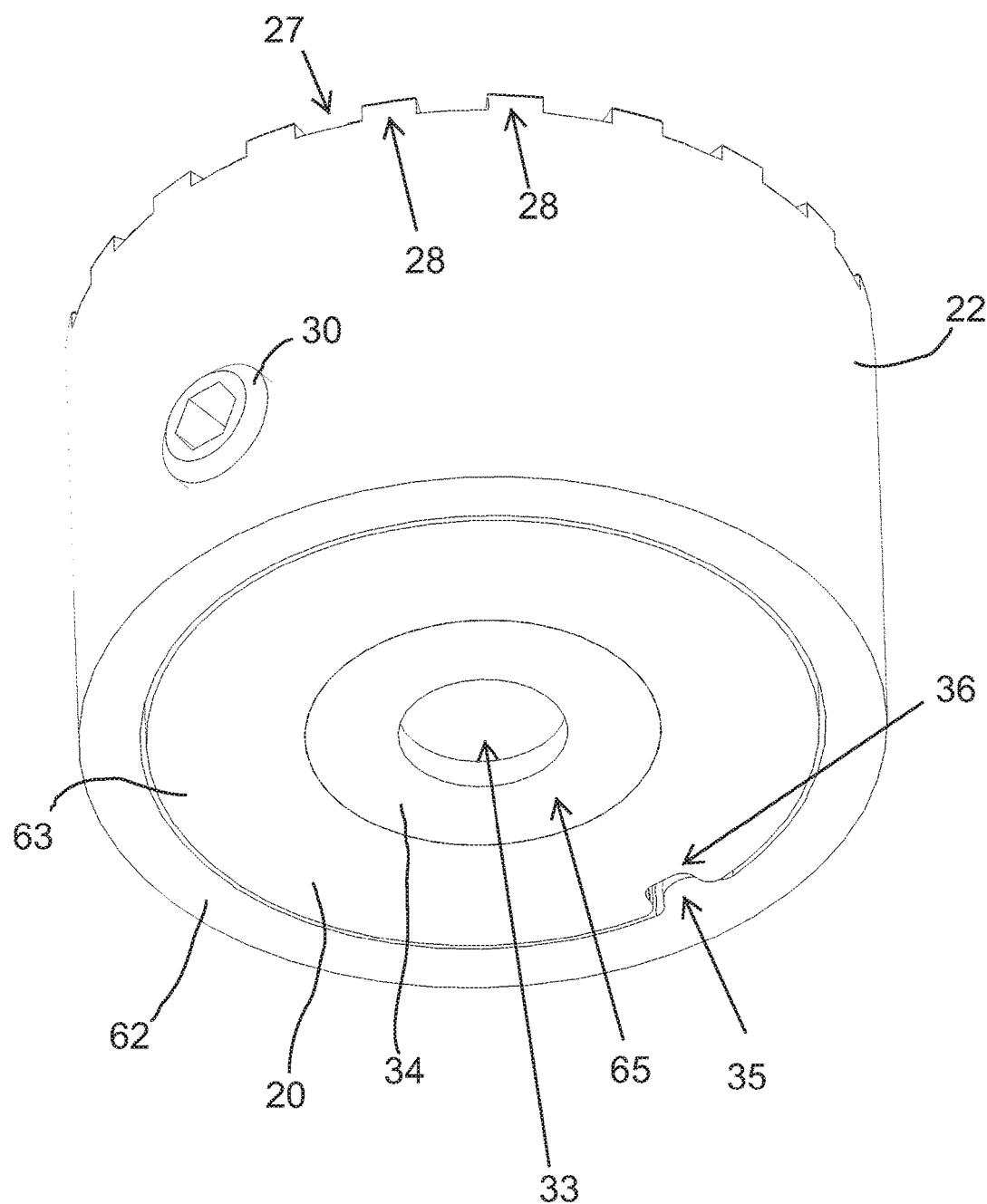
FIG. 6c is a perspective view of the bottom of the cylindrical shell shown in FIGS. 6a and 6b from a different angle.

FIG. 6c is a perspective view of the bottom 62 of the cylindrical shell 22 shown in FIGS. 6a and 6b. Similar to FIGS. 6a and 6b, the teeth 28 and locking bolt 30 are illustrated. FIG. 6c further illustrates the bottom 63 of the circular base 20 and the bottom and lower inner rim 65 of the cylindrical insert 34. The notch 36 on the circular base 20 can be seen as well as the tab 35 of the cylindrical shell 22 located within the notch 36.

Figure 7A:
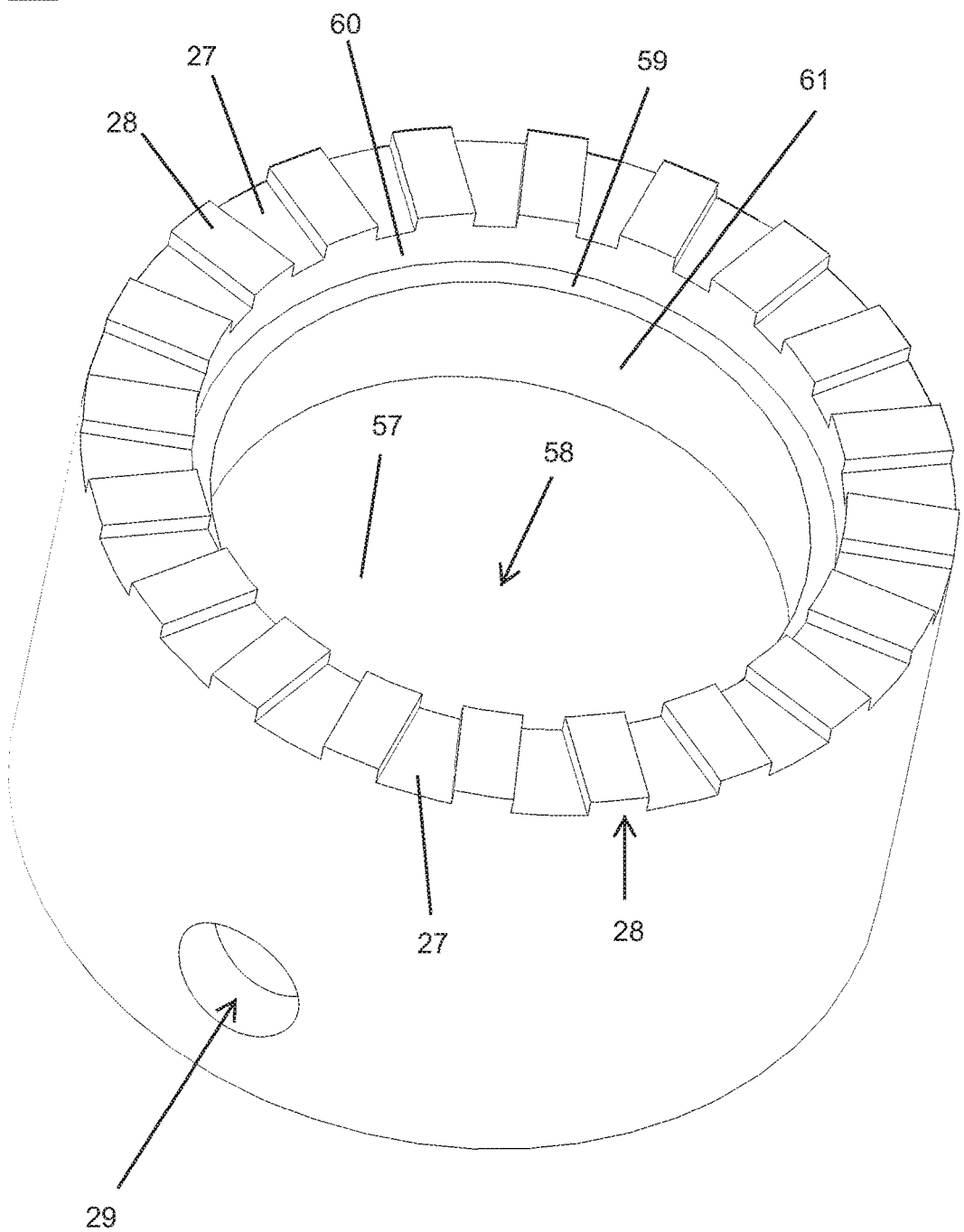
FIG. 7a is a perspective view of the top of the cylindrical shell shown in FIGS. 6a-6c wherein a base magnet, a circular base, locking bolt, and cylindrical insert have been removed from the cylindrical shell.

FIG. 7a is a perspective view of the top 27 of the cylindrical shell 22 shown in FIGS. 6a-6c wherein the second magnet 40, the lock bolt 30, the circular base 20, and the cylindrical insert 34 have been removed. The teeth 28 and the threaded aperture 29 are shown, as well as the upper inner wall 60 of the cylindrical shell 22 and the side wall 61 of the cavity 58. The ledge 59 is shown between the upper inner wall 60 and the side wall 61. The top of the floor 57 of the cavity 58 can be seen with the base magnet 40 removed. FIG. 7b is a perspective side view of the cylindrical shell 22 shown in FIG. 7a.

FIG. 7c is a perspective view of the bottom 62 of the cylindrical shell 22 shown in FIGS. 7a and 7b. The full length of the tab 35 on the lower inner wall 64 of the cylindrical shell 22 can be seen with circular base 20 and the cylindrical insert 34 removed. The bottom of the floor 57 of the cavity 58 can also be seen with the circular base 20 and the cylindrical insert 34 removed.

FIG. 8a is a perspective view of the top of the circular base 20 and the cylindrical insert 34 properly positioned within the circular base 20. The upper outer rim 52 of the cylindrical insert 34 is located within the circular base 20, and below or level with the top rim or surface 66 of the circular base 20. The inner wall of the cylindrical body 50 of the cylindrical insert 34 extends all the way through the circular base 20, wherein the lower inner rim 65 of the cylindrical insert 34 becomes flush with the bottom surface of the circular base 20, as shown in FIG. 8f.

The opposing sloped edges 42, 44 are located on the outer wall 43 of the circular base 20. The tab 46 is located between the upper ends 48,49 of the opposing sloped edges 42,44. An aperture 68 is located in the side of the opposing sloped edges 42,44 below the plateau or tab 46. The aperture 68 is preferably threaded and receives and secures the locking bolt 30 to secure the cylindrical shell 22 over the circular base 20.

Figure 8B:
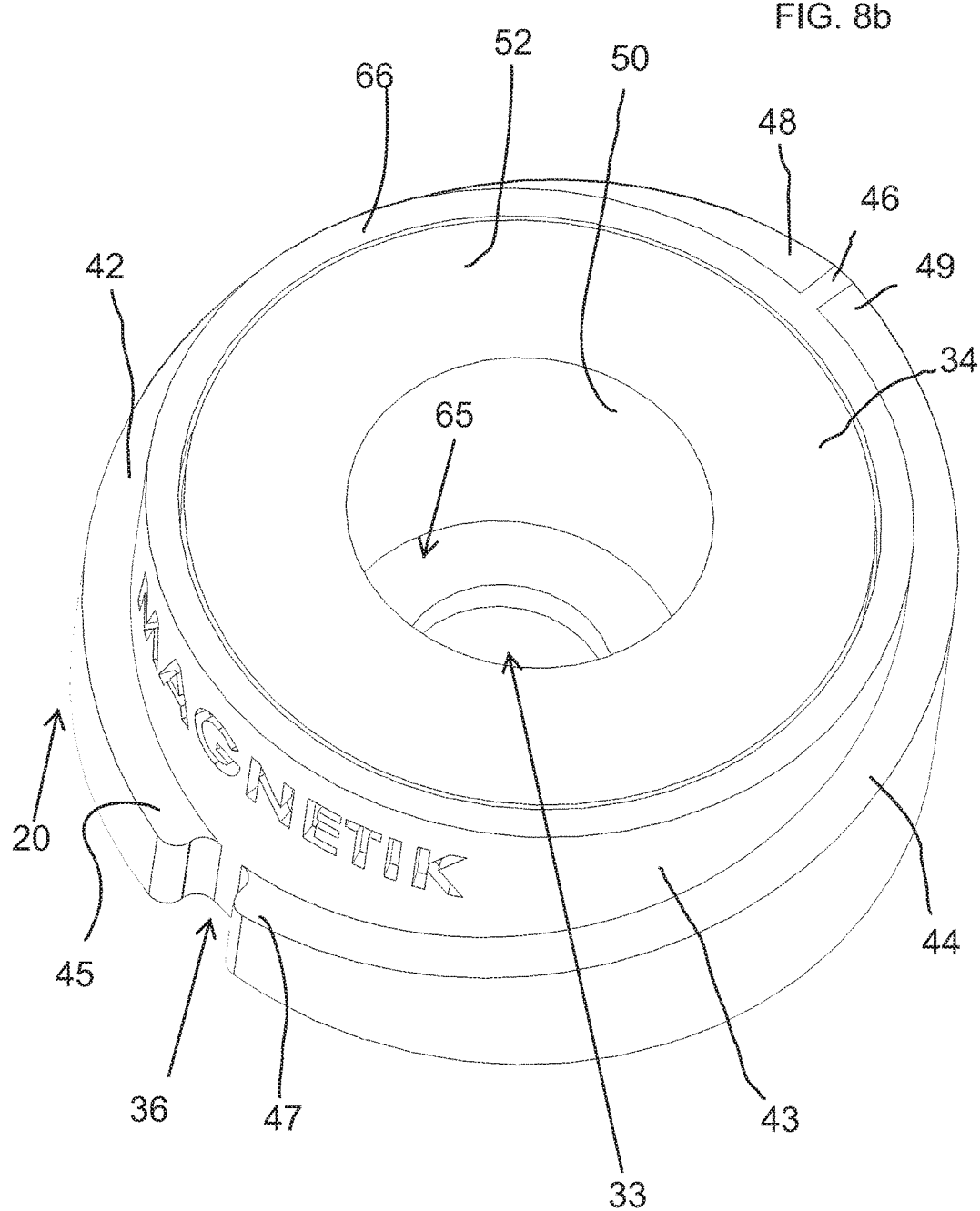
FIG. 8b is a perspective view of the top of the circular base and the cylindrical insert shown in FIG. 8a from a different angle.
Figure 9A:
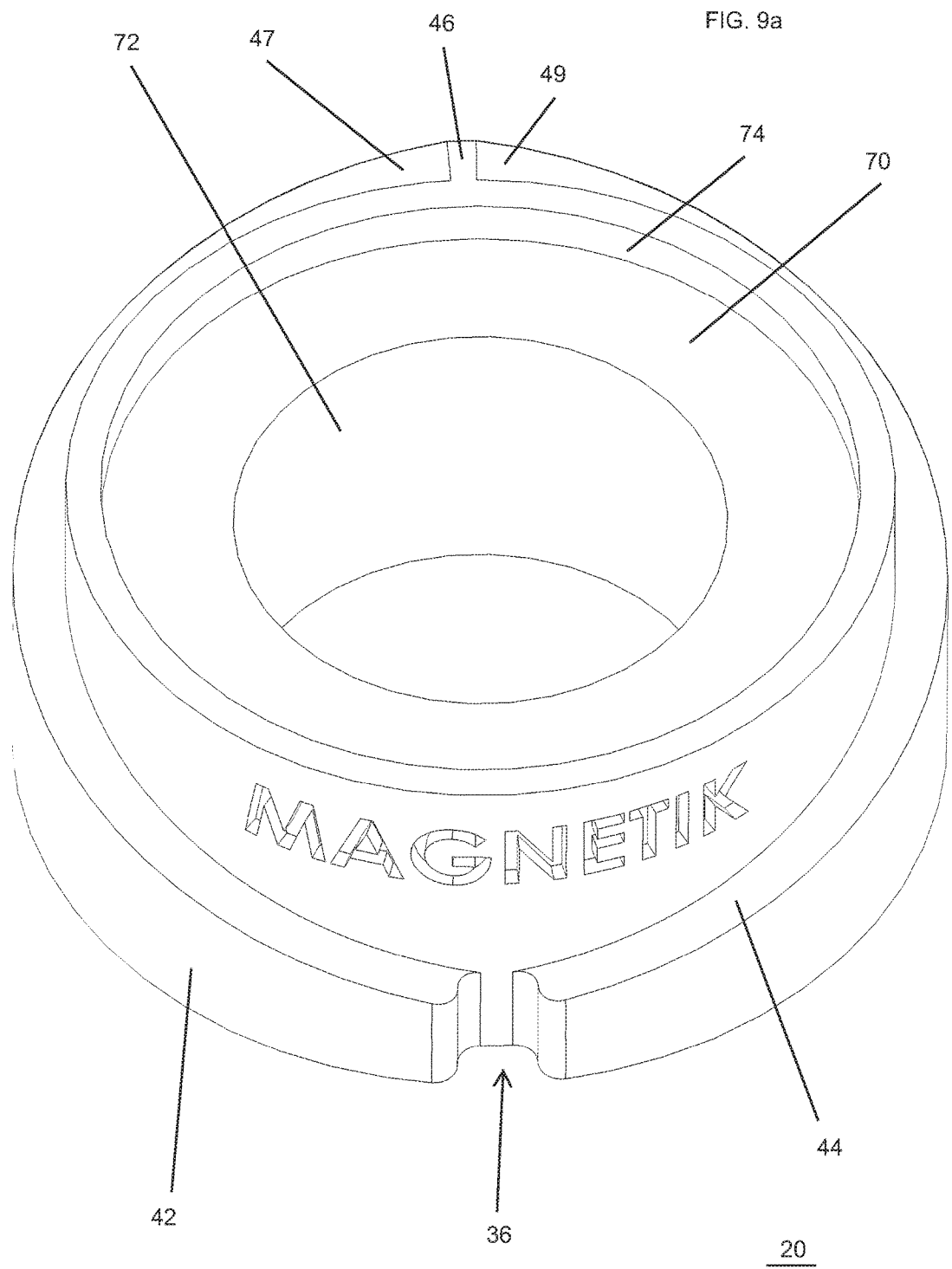
FIG. 9a is a perspective view of the top of the circular base without the cylindrical insert shown in FIGS. 8a-8f.
Figure 9D:
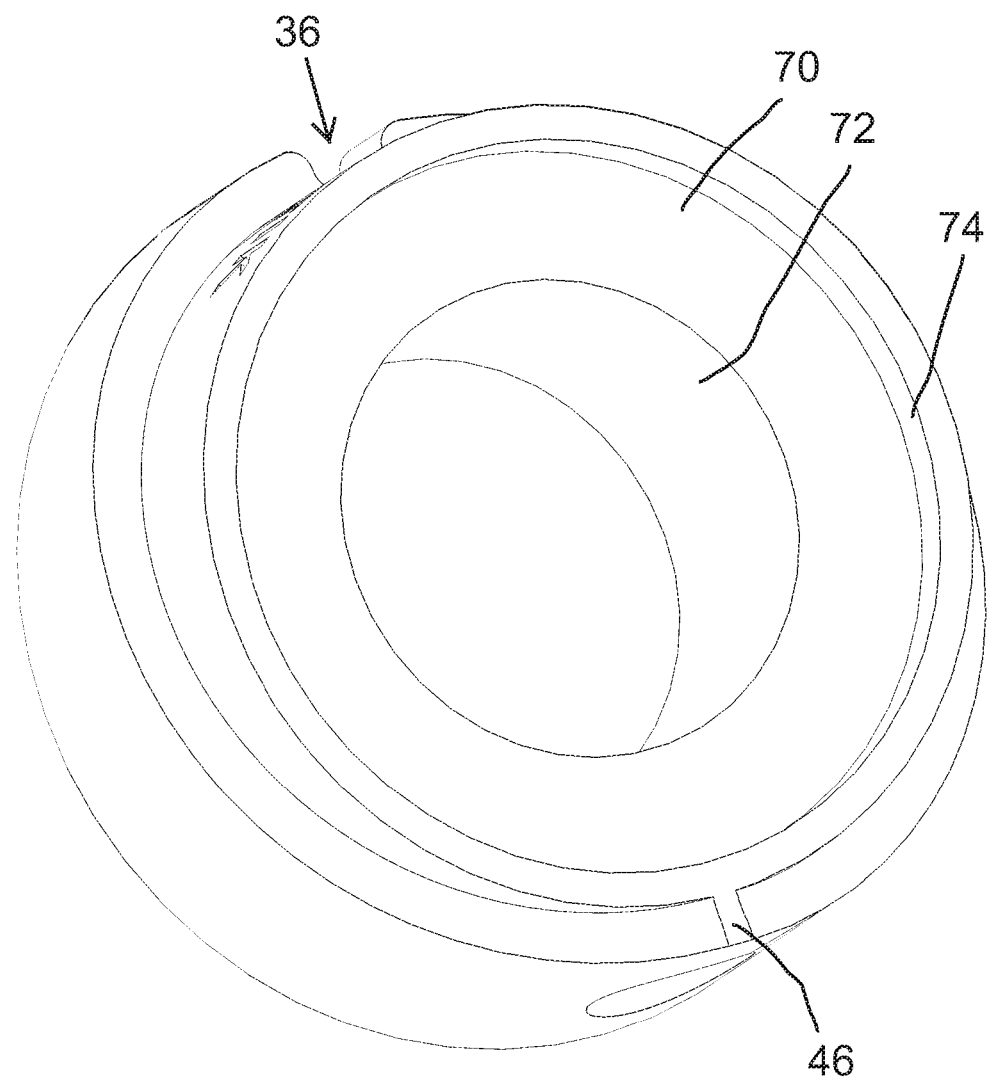
FIG. 9d is a perspective view of the top of the circular base shown in FIGS. 9a-9c from a different angle.

FIG. 8b is a perspective view of the top of the circular base 20 and cylindrical insert 34 shown in FIG. 8a from a different angle. The notch 36 is shown between the bottoms 45,47 of the opposing sloping edges 42,44. Also shown is the top of the inner lower rim 65 of the cylindrical insert 34. The aperture 33 is located in the lower inner rim 65 for received the steering column bolt 54 to secure the cylindrical insert 34 and the circular base 20 to the top 17 of a steering column 6 of a bicycle. Of course, other bolts or screws can be located within the aperture 33 to secure the cylindrical insert 34 and circular base 20 to any desired location, such as a vertical wall, cabinet, etc. The upper outer rim 52 of the cylindrical insert 34 secures the circular base 20 in place by being placed firmly against the plateau 70 (FIG. 9a) of the circular base 20 when the cylindrical insert 34 is secured by a bolt or screw via the aperture 33. In an alternative embodiment, the bottom of the circular base 20 and/or the lower inner rim 65 of the cylindrical insert 34 can include an adhesive for gluing the circular base 20 to a desired location.

Figure 8C:
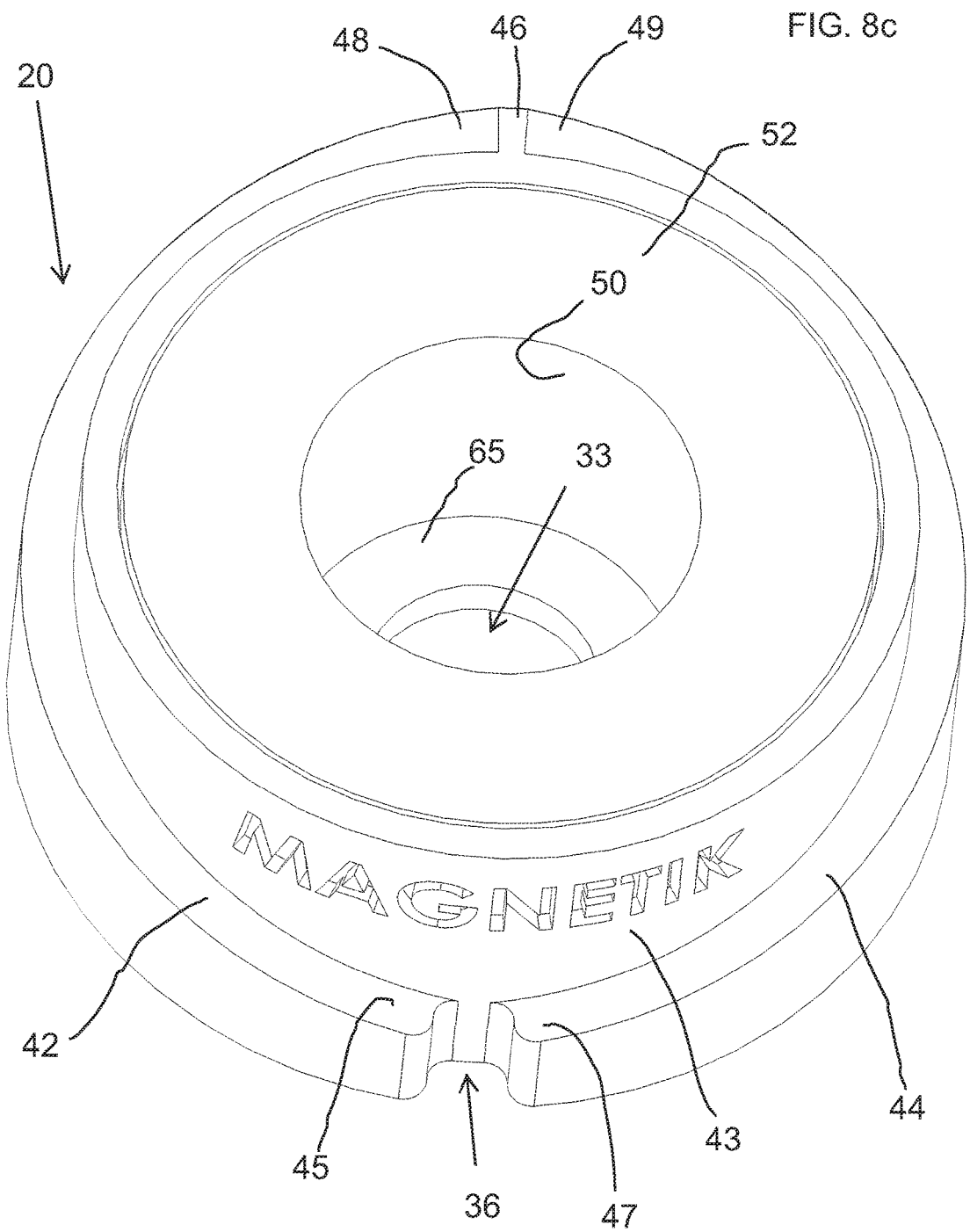
FIG. 8c is a perspective view of the top of the circular base and the cylindrical insert shown in FIGS. 8a and 8b.
Figure 8D:
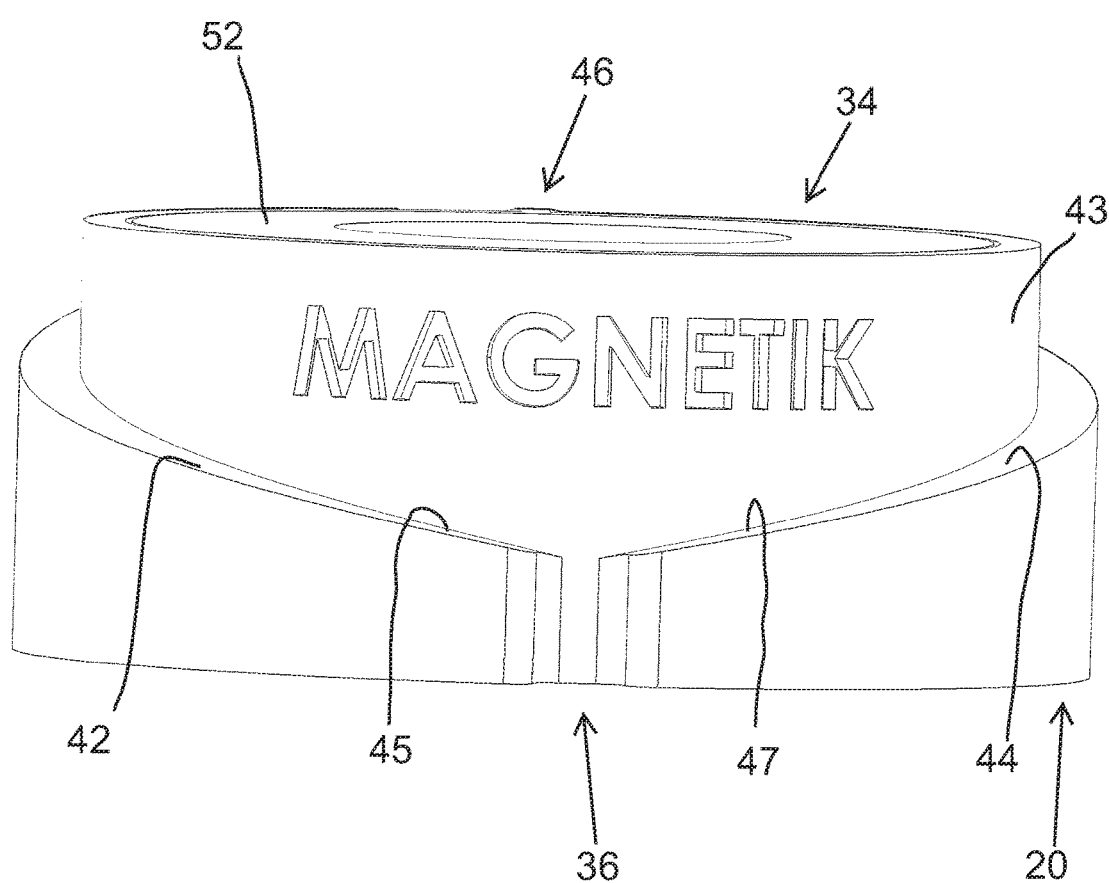
FIG. 8d is a perspective view of the front of the circular base and the cylindrical insert shown in FIGS. 8a-8c.
Figure 8E:
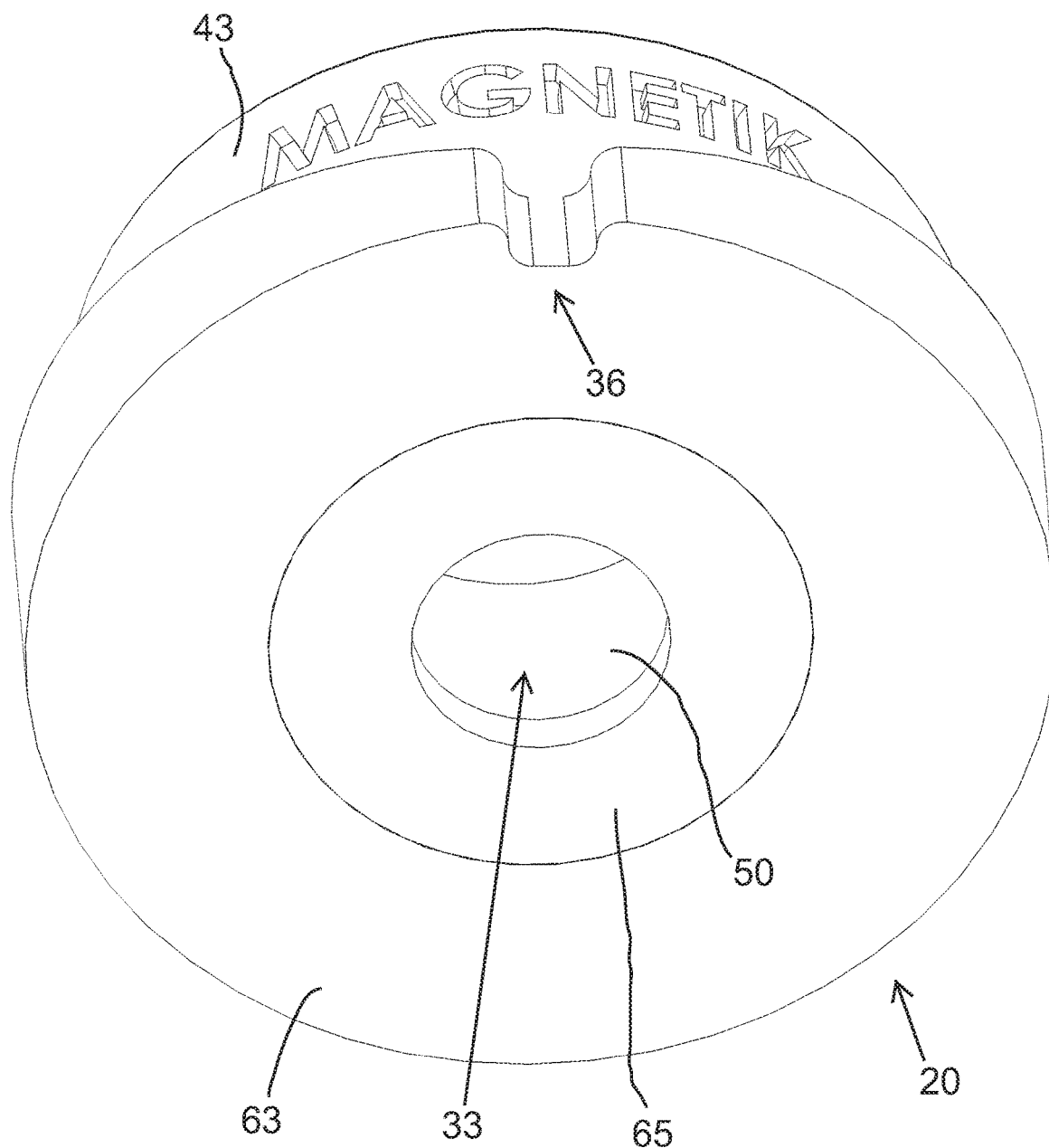
FIG. 8e is a perspective view of the bottom of the circular base and the cylindrical insert shown in FIGS. 8a-8d.
Figure 8F:
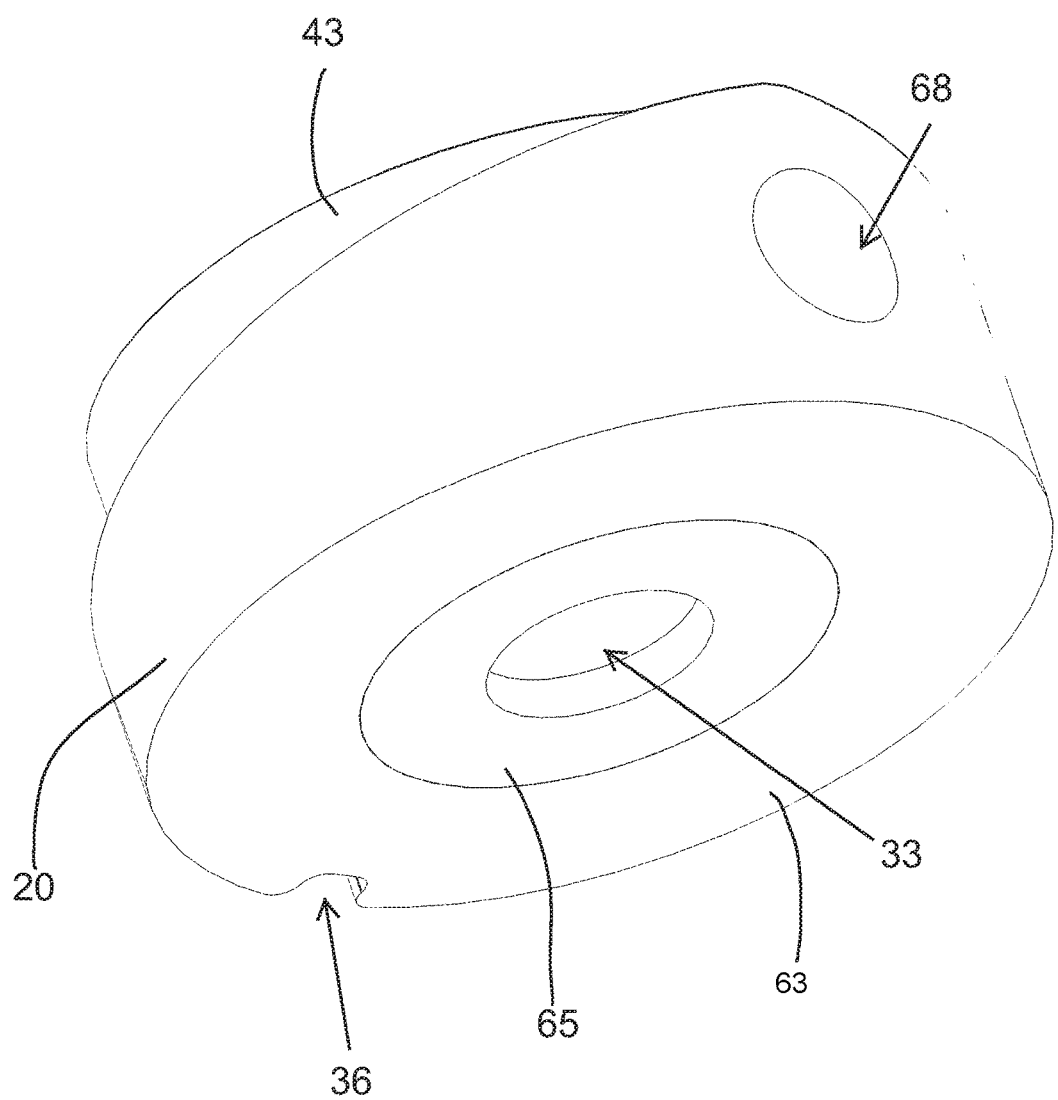
FIG. 8f is a perspective view of the bottom of the circular base and the cylindrical insert shown in FIGS. 8a-8e from a different angle.

FIG. 8c is a perspective view of the top of the circular base 20 and the cylindrical insert 34 shown in FIGS. 8a and 8b from another angle. FIG. 8d is a front perspective view of the circular base 20 and cylindrical insert 34. FIGS. 8e and 8f are perspective views of the bottom 63 of the circular base 20 and cylindrical insert 34 shown in FIGS. 8a-8d from different angles.

FIGS. 9a-9d are perspective views of the top of the circular base 20 shown in FIGS. 8a-8f, wherein the cylindrical insert 34 has been removed. The inner platform or plateau 70 located between the upper inner wall 74 of the circular base 20 and the lower inner wall 72 of the circular base 20. The upper outer rim 52 of the cylindrical insert 34, as shown in FIGS. 8a-8c, fits within the upper inner wall 74 and on top of the inner platform 70. The cylindrical body 50 of the cylindrical insert 34 is located within the lower inner wall 72 of the circular base 20.

Figure 9E:
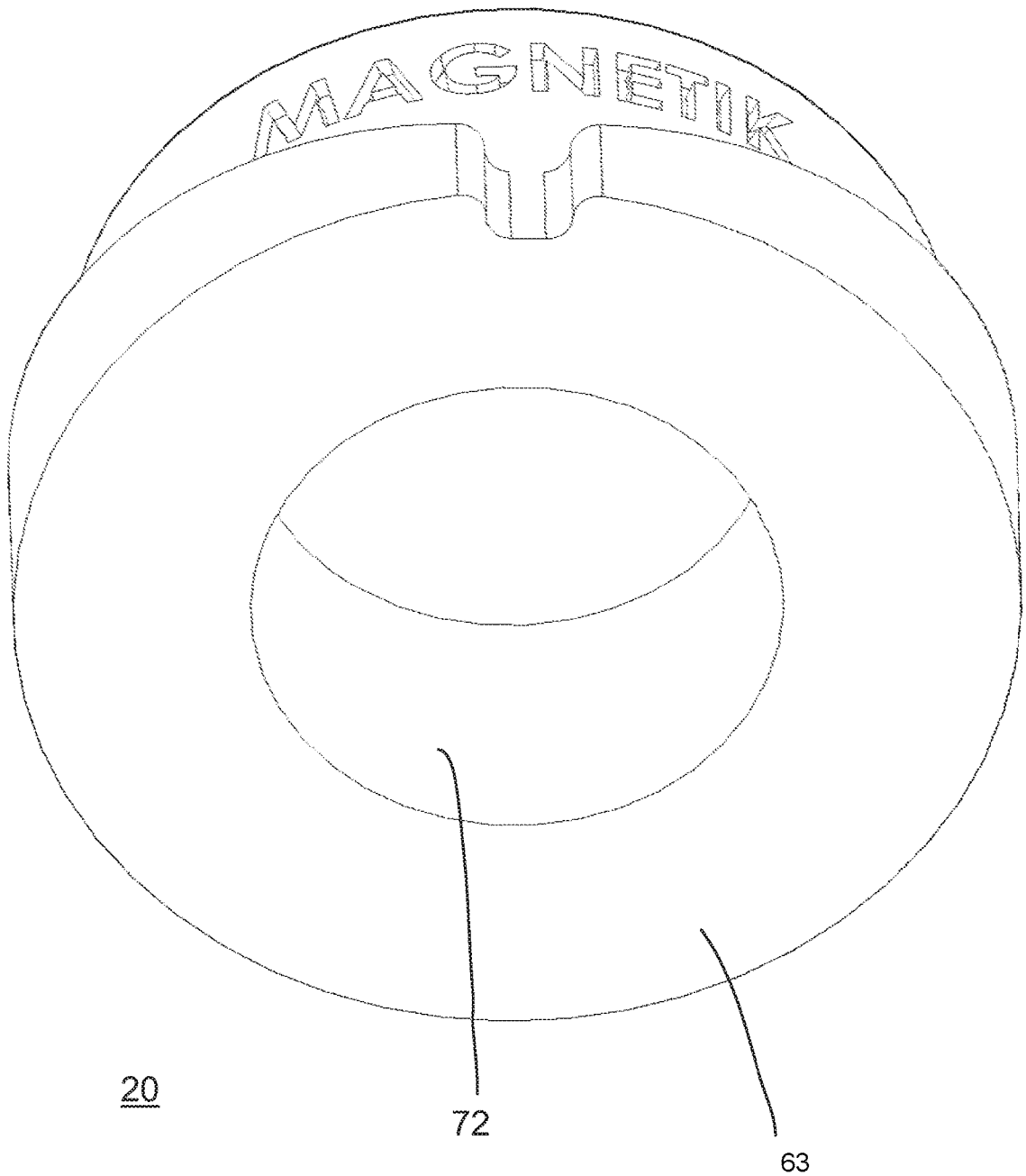
FIG. 9e is a perspective view of the bottom of the circular base shown in FIGS. 9a-9d from a different angle.

FIGS. 9e and 9f are perspective views of the bottom 63 of the circular base 20 shown in FIGS. 8e and 8f, wherein the cylindrical insert 34 has been removed. With the cylindrical insert 34 removed, the lower inner wall 72 of the circular base 20 is clearly visible. The circular base 20 preferably is milled out of 6061-t6 aluminum or extruded ABS plastic, which then has 1008 low carbon steel insert mounted inside the center of base 20 with epoxy within the lower inner wall 72. The steel is necessary to maintain the magnetic attraction to the cylindrical shell 22.

Figure 10B:
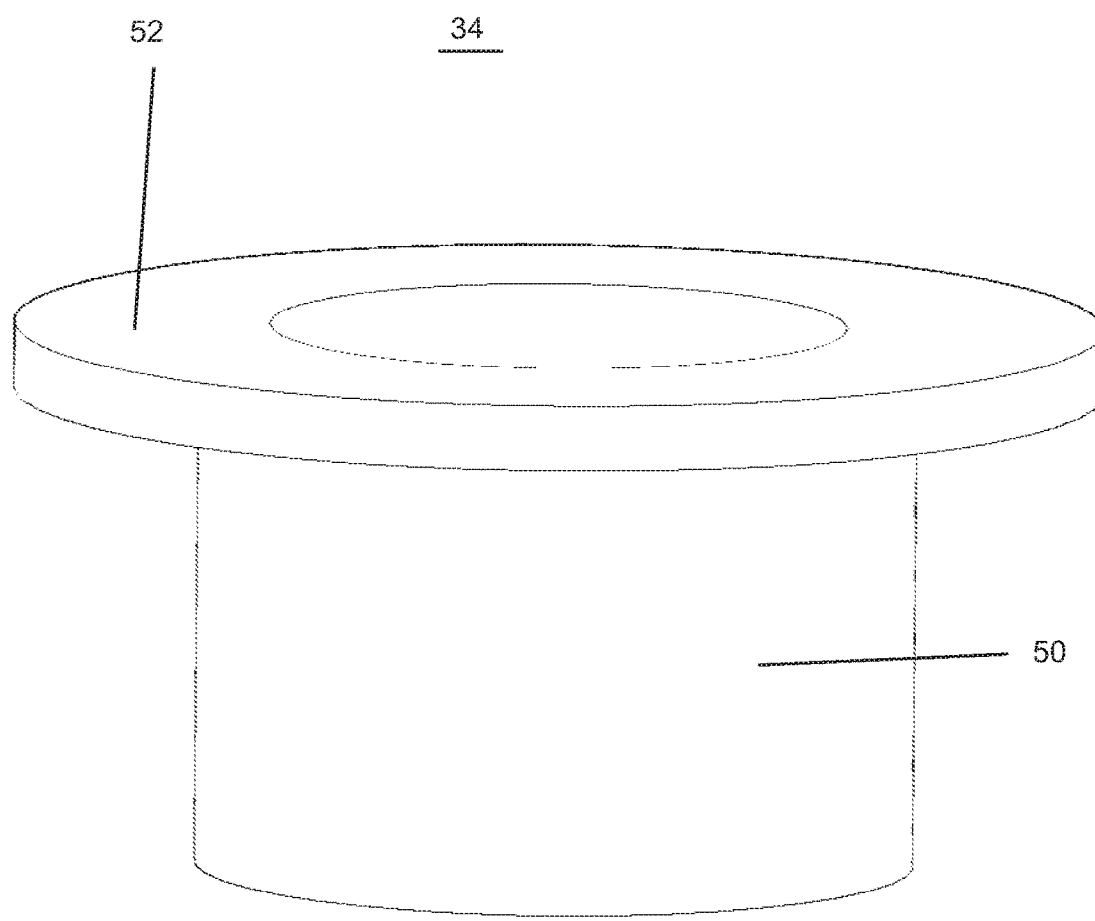
FIG. 10b is a perspective view of the cylindrical insert shown in FIG. 10a from a different angle.
Figure 10C:
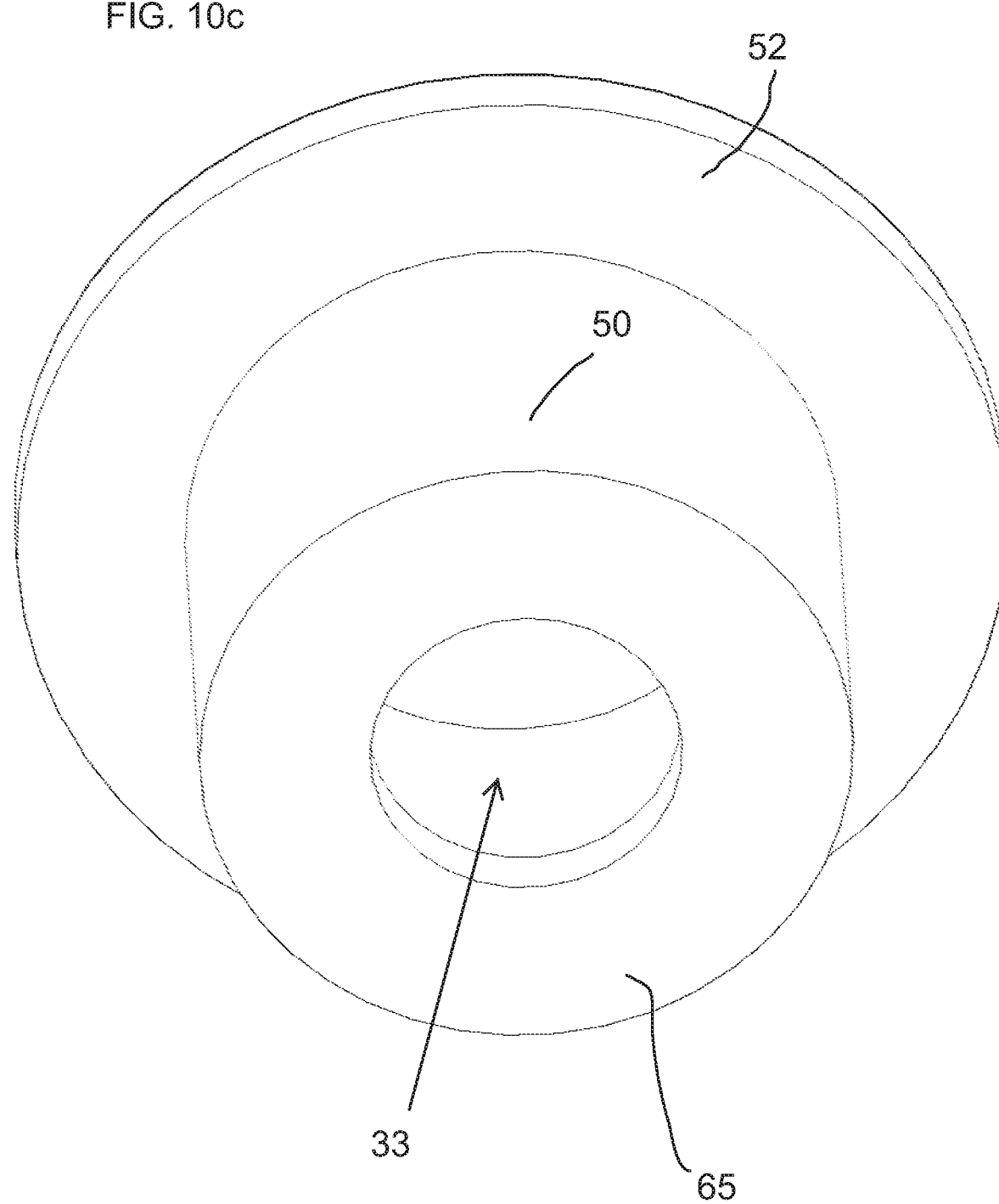
FIG. 10c is a perspective view of the bottom of the cylindrical insert shown in FIGS. 10a and 10b.

FIG. 10a is a perspective view of the top of the cylindrical insert 34 shown in FIGS. 8a-8f. The upper outer rim 52, cylindrical body 50, lower inner rim 65, and aperture 33 of the cylindrical insert 34 are clearly visible in FIG. 10a. FIG. 10b is a perspective view of the side of the cylindrical insert 34 shown in FIG. 10a showing the cylindrical body 50 and upper outer rim 52. FIG. 10c is a perspective view of the bottom of the cylindrical insert 34 shown in FIGS. 10a and 10b illustrating the upper outer rim 52, cylindrical body 50, lower inner rim 65, and aperture 33.

Figure 11A:
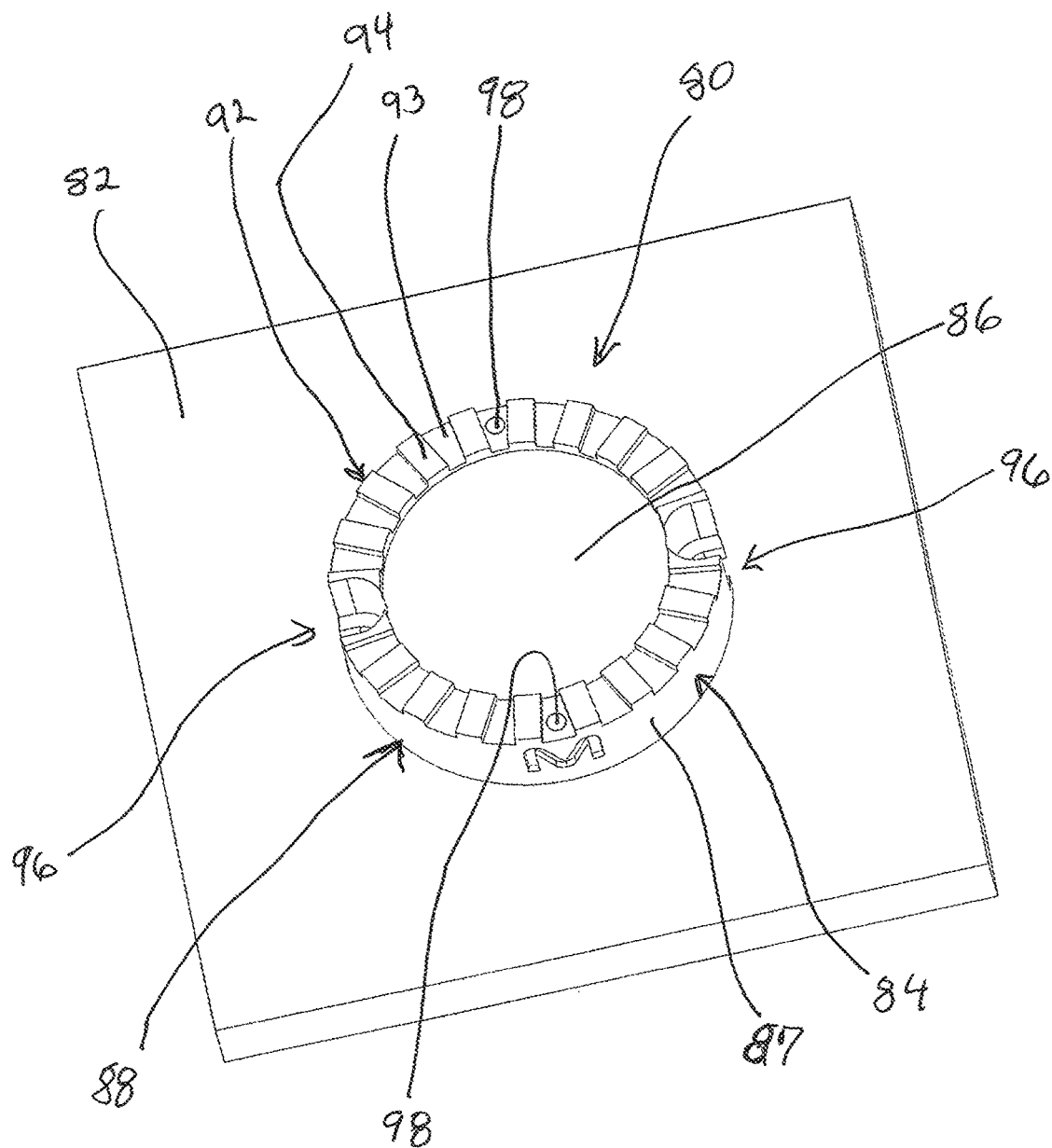
FIG. 11a is a perspective view of a surface mount configured in accordance with a further embodiment of the present invention.

FIG. 11a is a perspective view of a surface mount 80 on a wall or planer surface 82 configured in accordance with a further embodiment of the present invention. The surface mount 80 includes a circular base, shell, or circular housing 84 having a top surface 86 and a bottom surface 88. A ring 90 is located on the top surface 86 of the circular housing 84, and the ring 90 includes a teethed or geared upper surface 92. A circular housing magnet 95 (FIG. 11c) is located within an inner chamber 97 (FIG. 11c) of the circular housing 84.

The circular housing 84 preferably is constructed of plastic and formed into a unitary piece. The teeth 94 and the slots or spaces 93 between the teeth 94 are located on the teethed or geared upper surface 92 of the ring 90. The ring 90 preferably is formed as a unitary piece with the circular housing 84, and located on the top surface 86 and outer circumference of the top surface 86, and adjacent to the side wall 87 of the circular housing 84.

The circular housing 84 includes mounting apertures or slots 96 for securing the circular housing 84 to a wall or planar surface 82 by screws, bolts, nails, or similar mounting device. The mounting apertures 96 also function as positioning reference points or markers to properly position and orient the surface mount 80 onto a desired surface. Similarly, positioning markers or positioning apertures 98 are included in the ring 90 for properly positioning and orienting the circular housing 84 of the surface mount 80 onto a surface or wall 82.

Figure 11B:
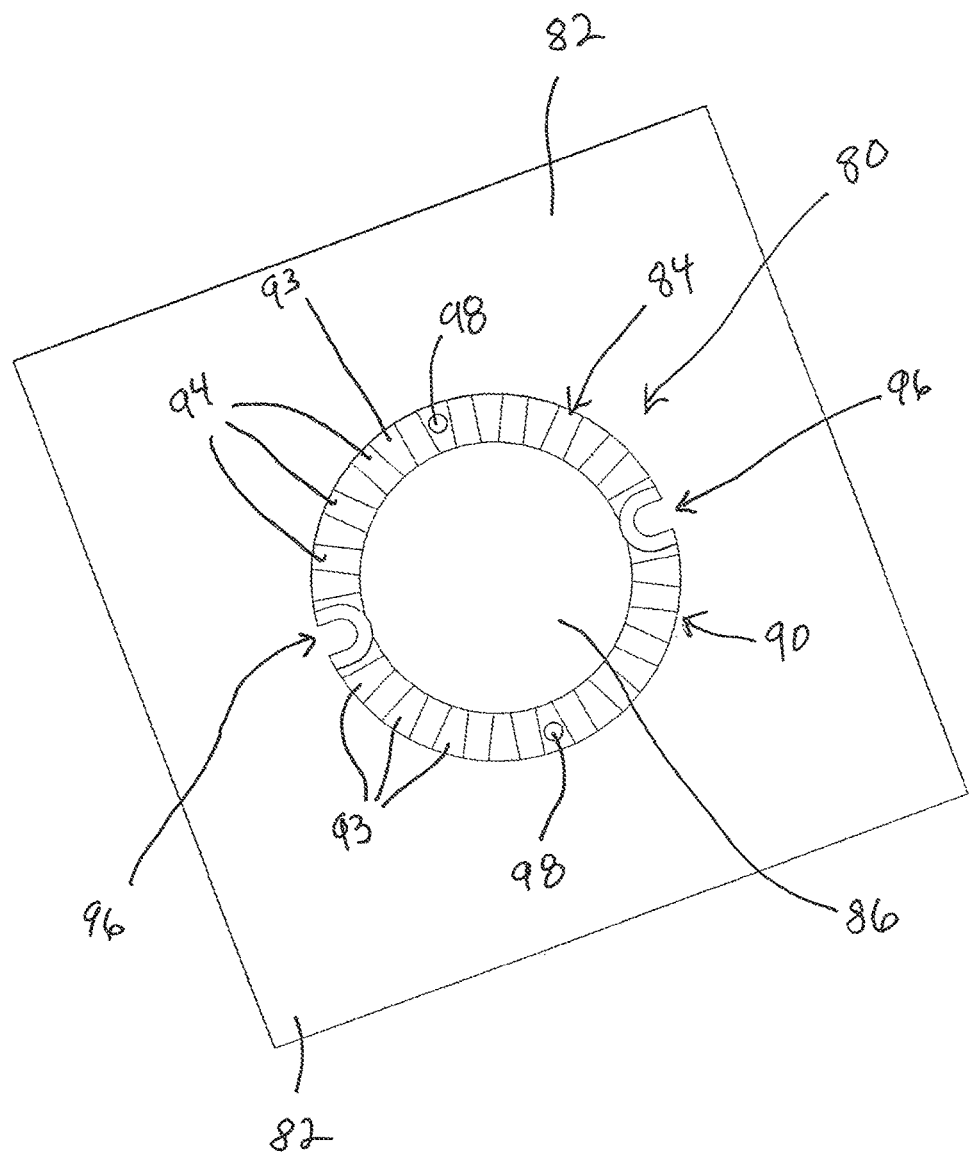

FIG. 11b is a front view of the surface mount 80 on a wall or planar surface 82 shown in FIG. 11a. The ring 90, teeth 93, and slots 94 are clearly illustrated. The mounting apertures 96 and positioning apertures 98 also are clearly shown.

Figure 11C:
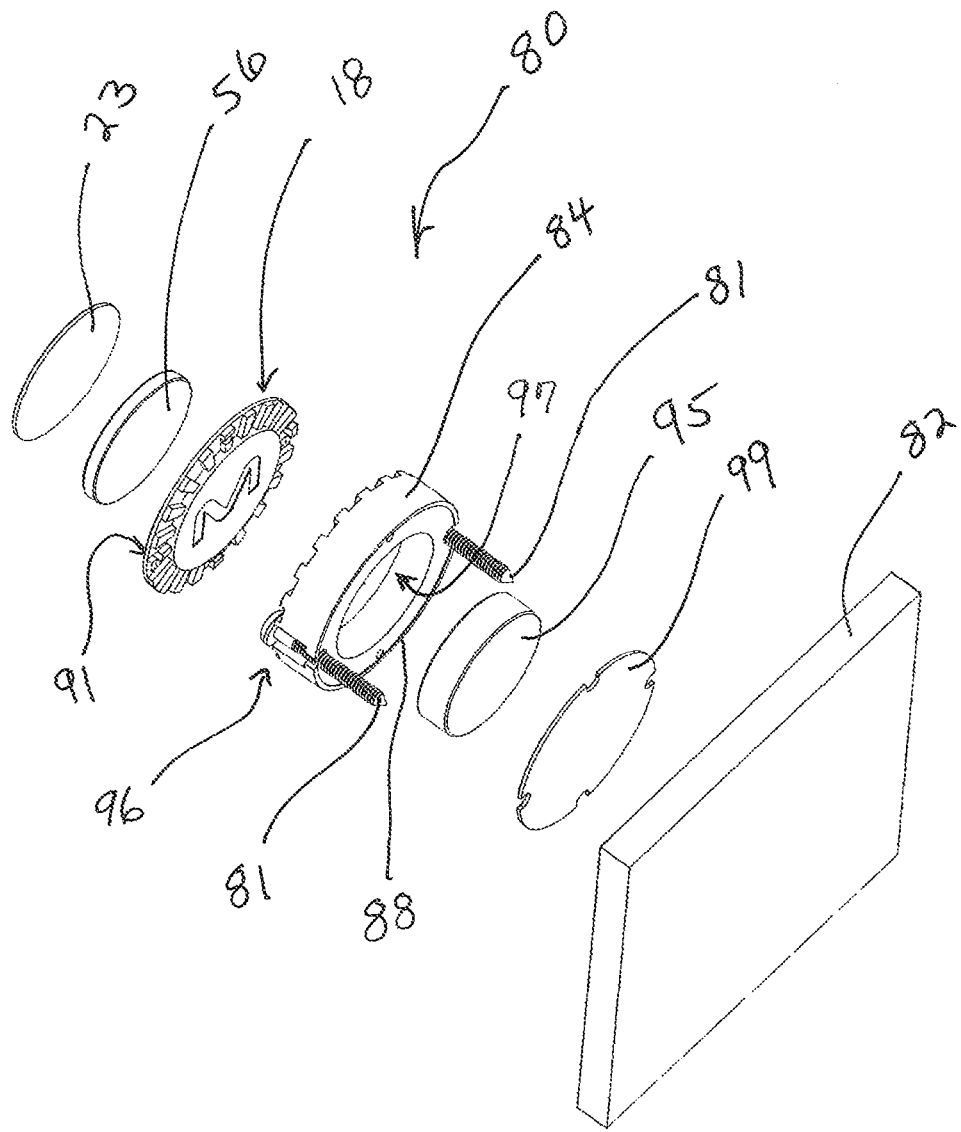
FIG. 11c is an exploded view of the surface mount shown in FIGS. 11a and 11b.

FIG. 11c is an exploded view of the surface mount 80 and mounting surface 82 shown in FIGS. 11a and 11b. Also shown is the lid or link 18 configured to fit into the ring 90 of the surface mount 80. The top 23 and the lid magnet or link magnet 56 of the lid or link 18 is shown in exploded view. The top 23 of the link 18 preferably is an adhesive pad for securing the bottom cover 51 or back 91 of the lid or link 18 to a device to be mounted, such as a smartphone 12.

Further illustrated in the exploded view of FIG. 11c is the inner chamber 97 of the circular housing 84 of the surface mount 84 for receiving and housing the circular housing magnet 95. A surface mount adhesive pad 99 is shown for securing the bottom 88 of the circular housing 84 to the mounting surface 82, such as a wall. Screws 81 are shown located within the mounting apertures 96 for securing the surface mount 80 to the mounting surface 82.

Figure 12A:
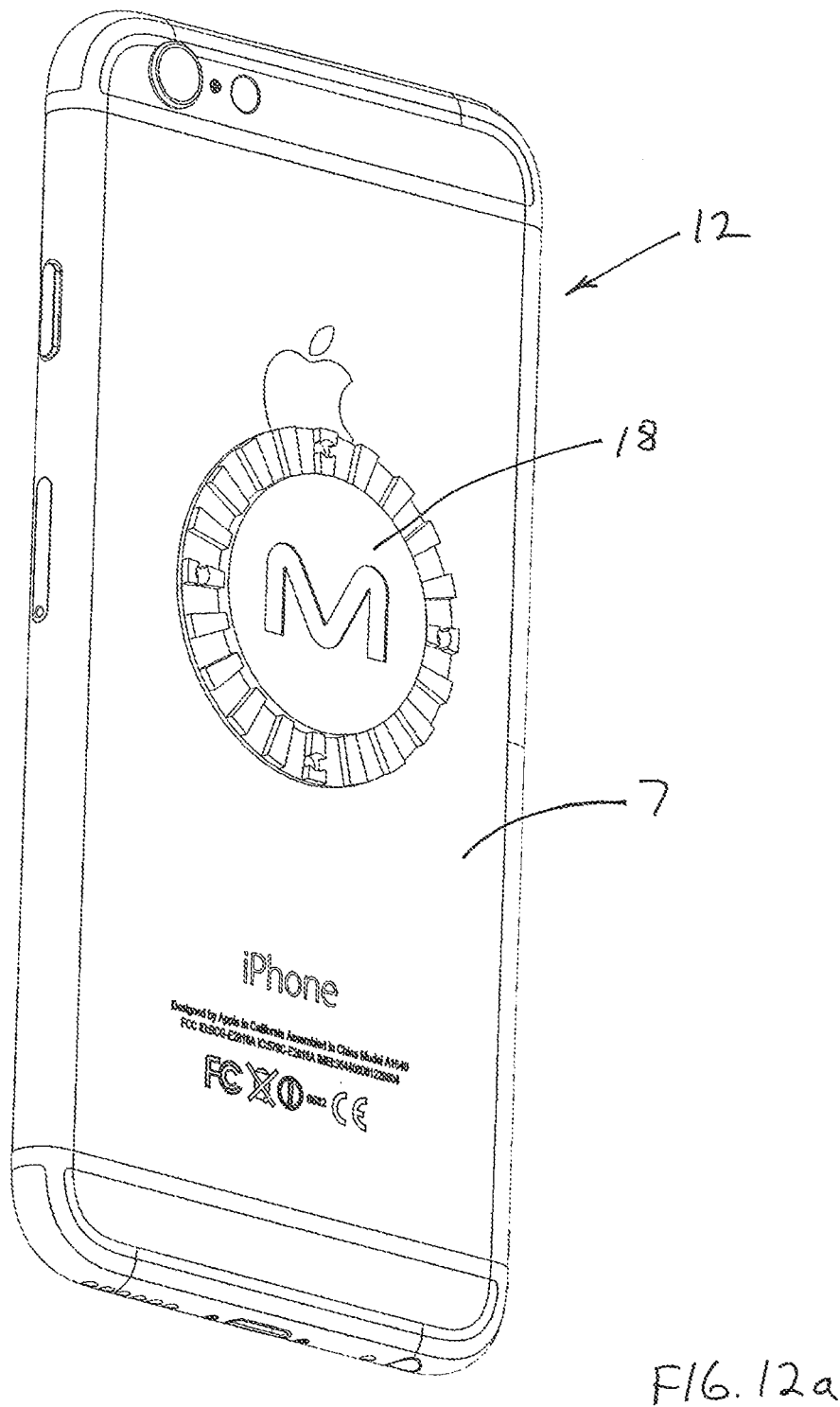
FIG. 12a is a perspective view of a link configured in accordance with the present invention and attached to the back of an iPhone®.
Figure 12B:
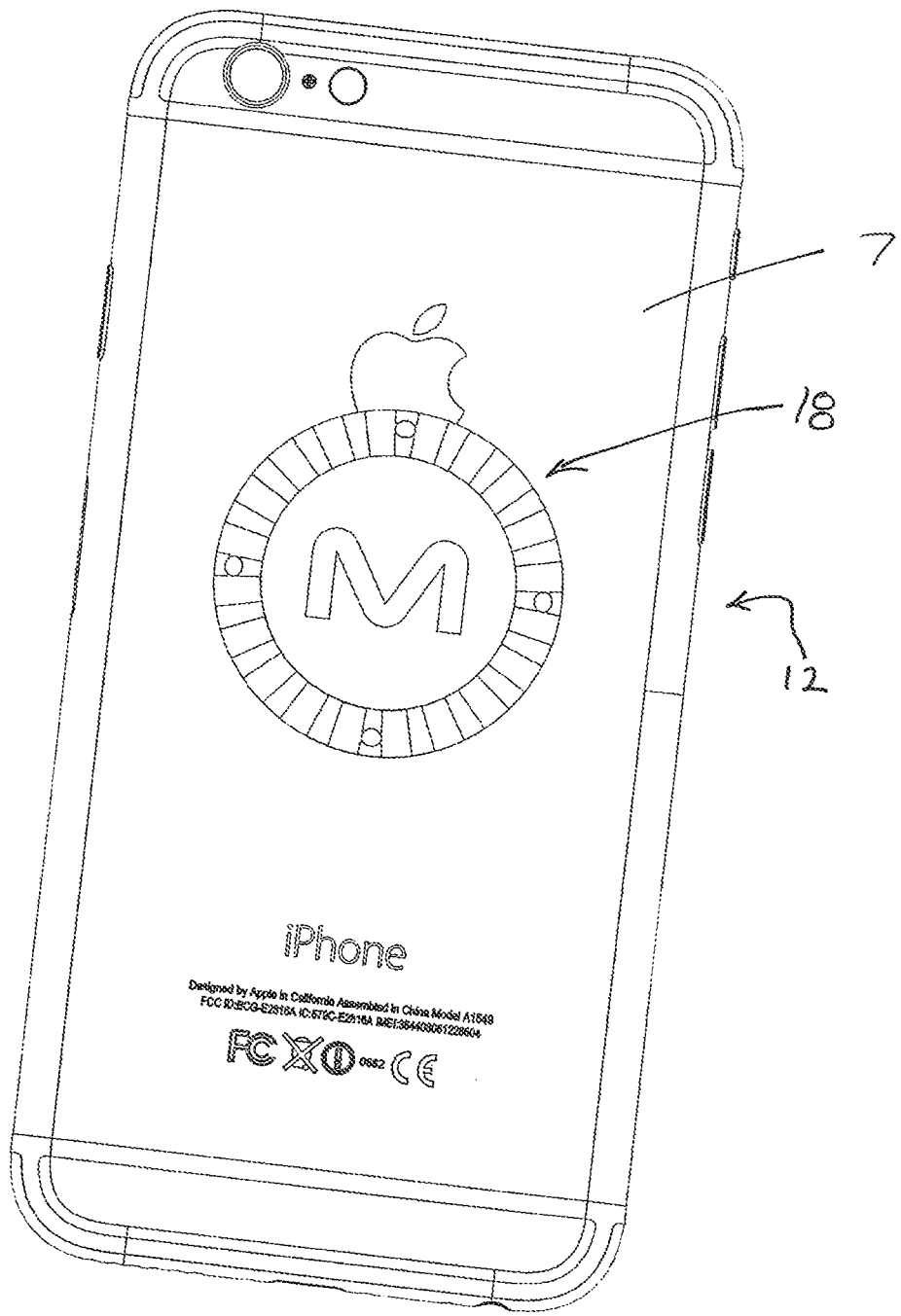
FIG. 12b is a front view of the link shown in FIG. 12a secured to the back of an iPhone®.

FIG. 12a is a perspective view of the link 18 mounted to the back 7 of a smartphone 12. In the illustrated example of FIG. 12a, the smartphone is an iPhone® manufactured by Apple®, Inc. FIG. 12b is back view of the link 18 on a smartphone 12 as shown in FIG. 12a.

Figure 13A:
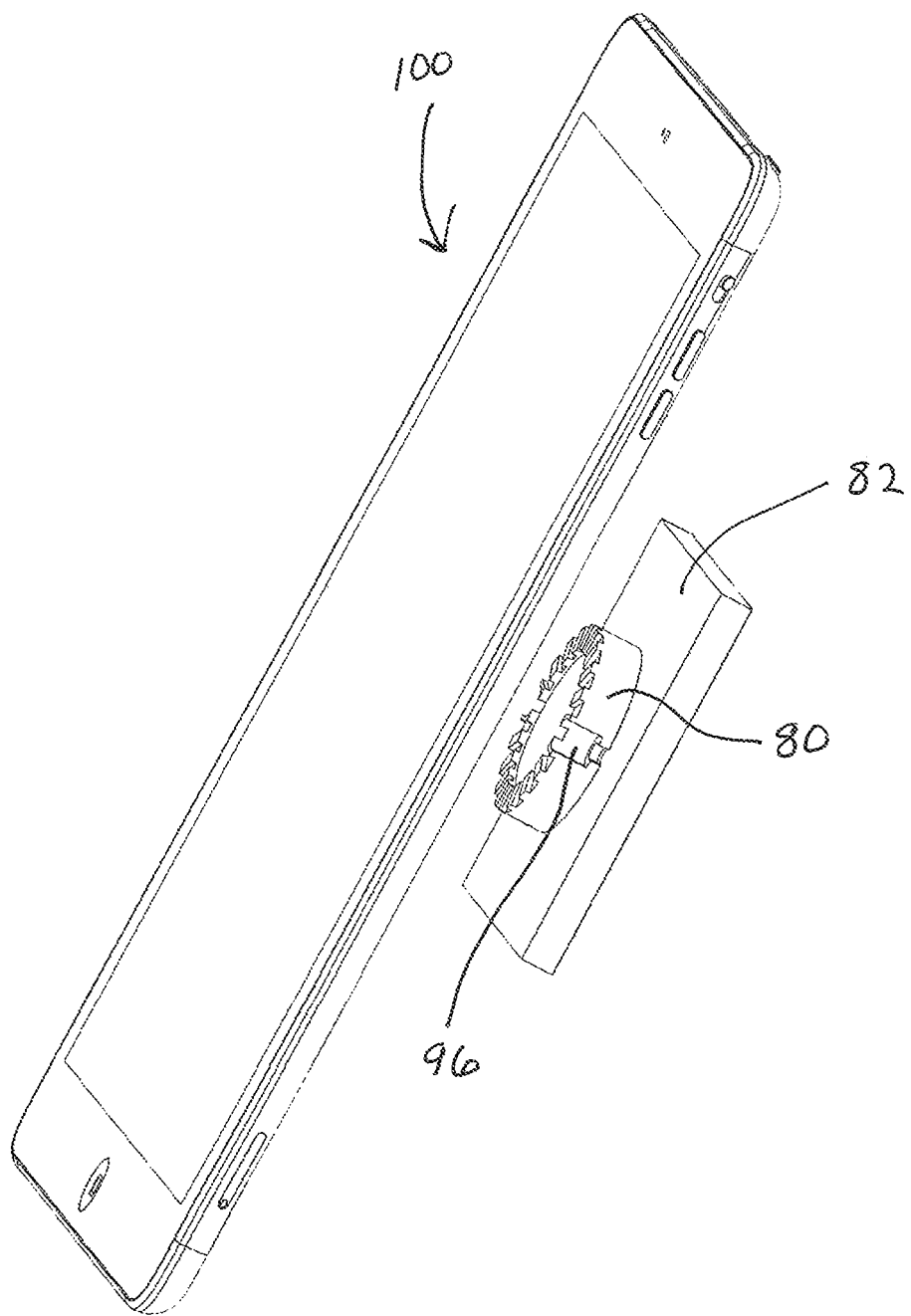
FIG. 13a is a perspective view of the surface mount shown in FIGS. 11a-11d being used to secure an iPad®.
Figure 13B:
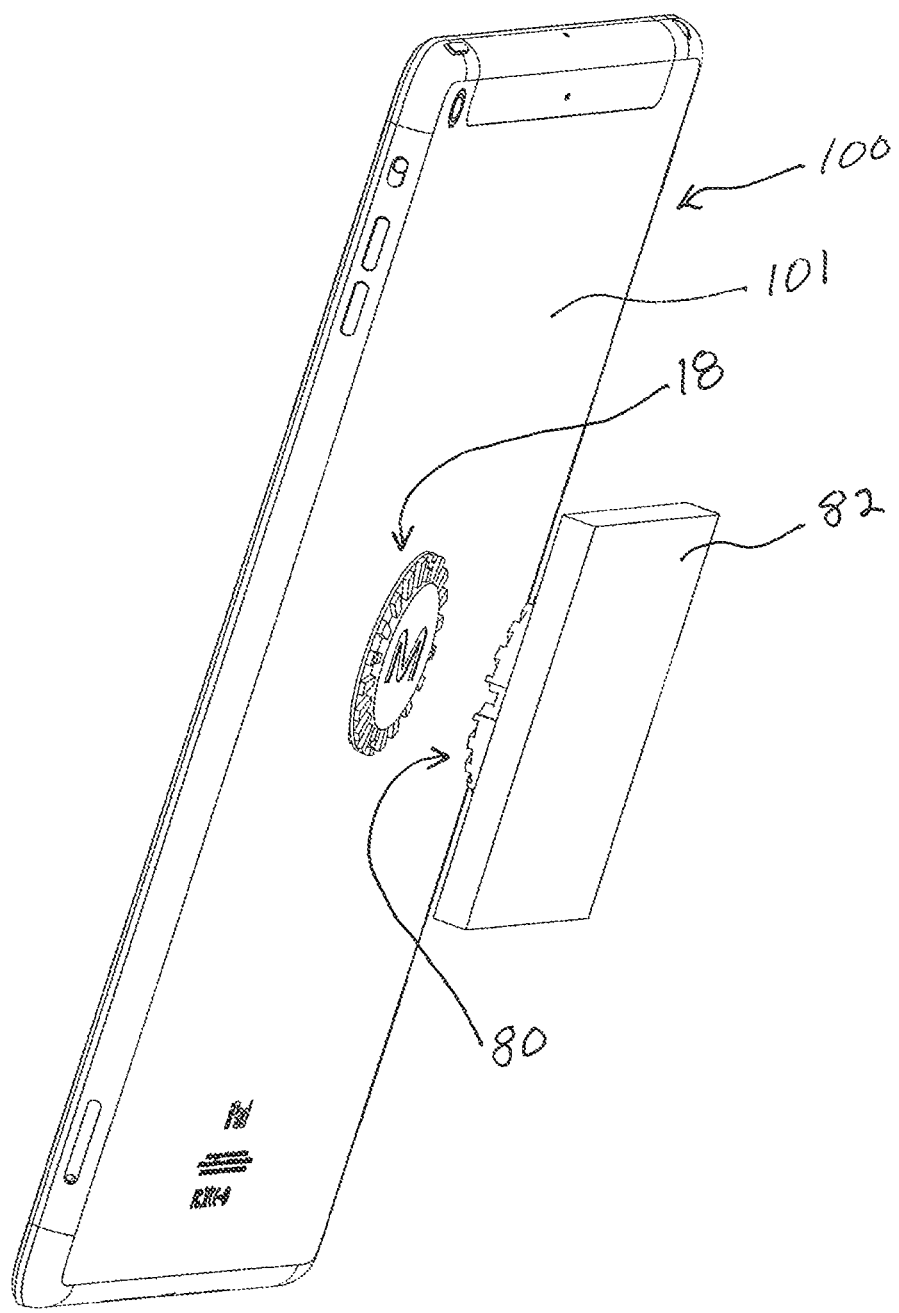

FIG. 13a is a perspective view of the surface mount 80 mounting a larger electronic device, such as an iPad® 100, to a surface 82. FIG. 13b is a perspective view of the back side 101 of the iPad® 100 shown in FIG. 13a. A link 18 is mounted to the back side 101 of the iPad® 100. The link 18 enables the iPad 100 is be magnetically and securely mounted to the surface 82 by fitting the link 18 into the ring 90 of the surface mount 80.

In accordance with the present invention, the teeth 94 of the surface mount 80 and the teeth 26 of the link 18 interlock and are uniform is size, thereby enabling the link 18 to fit into the ring 90 of the surface mount 80 and any angle or desired rotation. This enables an apparatus, such as a smartphone 12, to be rotated and secured to a mounting surface 82 at any desired rotational angle using the link 18 and surface mount 80.

Figure 13C:
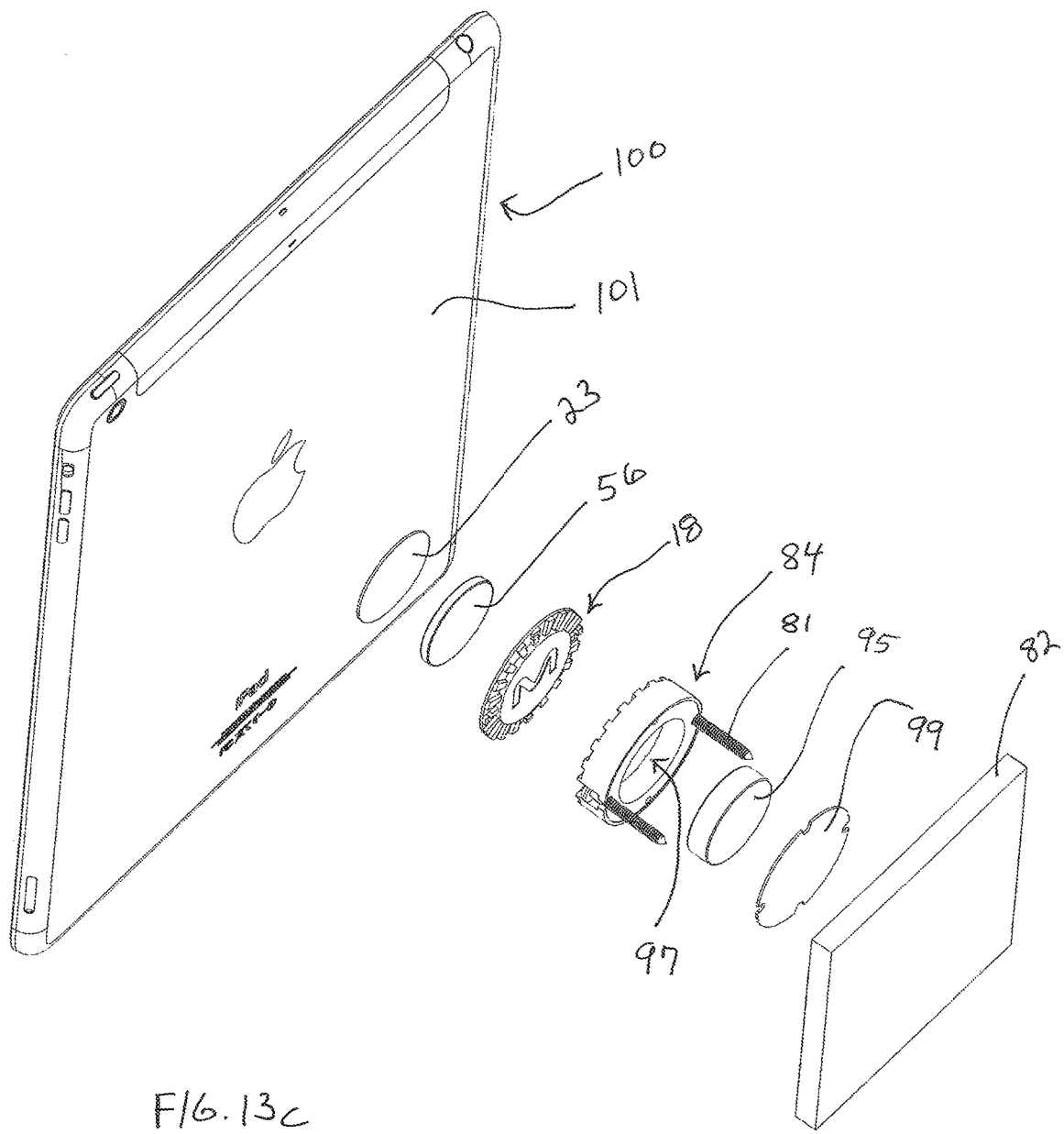
FIG. 13c is an exploded view of the surface mount and iPad shown in FIGS. 13a and 13b.

FIG. 13c is an exploded view of the iPad® 100 mounted to a surface 82 using the link 18 and surface mount 80 shown in FIGS. 13a and 13b. FIG. 13c more clearly illustrates the lid or adhesive pad 23 and the link magnet 56 of the link 18. Also illustrated are the circular housing 84, mounting screws 91, inner chamber 97, circular housing magnet 95, and adhesive pad 99.

FIG. 14a illustrates a suction cup mount 110 configured in accordance with the present invention. The suction cup mount 110 includes a suction cup 111 for fastening the suction cup mount 110 to a planar surface. A fastening lever 113 is included for activating the suction cup 111 to secure the suction cup mount 110 to a planar surface. An arm 112, configured in accordance with the present invention, is attached to the suction cup mount 110 for receiving and holding the surface mount 80 of the present invention. The surface mount 80 is secured to the end 115 of the arm 112 using a threaded screw mount 114 attached to a boss cap 116.

FIG. 14b is a perspective view of the surface mount 80 secured to the suction cup mount 110 from a different angle of that shown in FIG. 14.

FIG. 14c is a perspective view of the surface mount 80 attached to a suction cup mount 110 from a difference angle than the views shown in FIGS. 14a and 14b. The boss cap 116 and threaded screw mount 114 are more clearly illustrated in FIG. 14c. The threaded screw mount 114 of the boss cap 116 preferably screws into a threaded aperture in the end 115 of the arm 112 of the suction cup mount 110. The boss cap 116 and the threaded screw mount 114 preferably are a unitary piece formed out of plastic. The boss cap 116 preferably is secured to the bottom 88 of the circular housing 84 using screws 117, but an adhesive or glue can also be used.

Figure 15A:
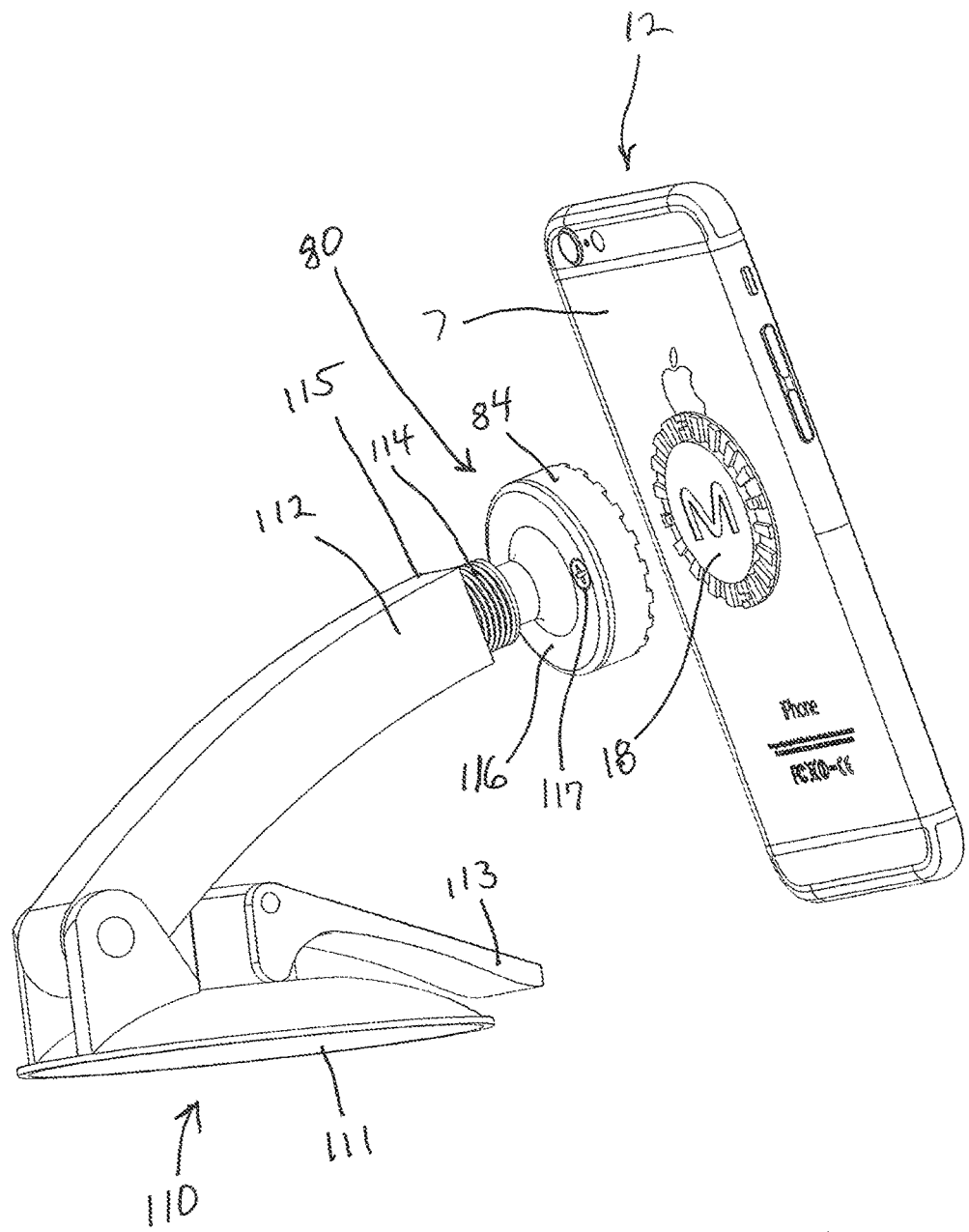
FIG. 15a is a perspective view of the surface mount secured to a suction mount shown in FIGS. 14a-14d being utilized to mount an iPhone.

FIG. 15a illustrates the suction cup mount 110, threaded screw mount 114 and boss cap 116, surface mount 80, and link 18 all being utilized to adjustably mount as smartphone 17, such as an iPhone®.

Figure 15B:
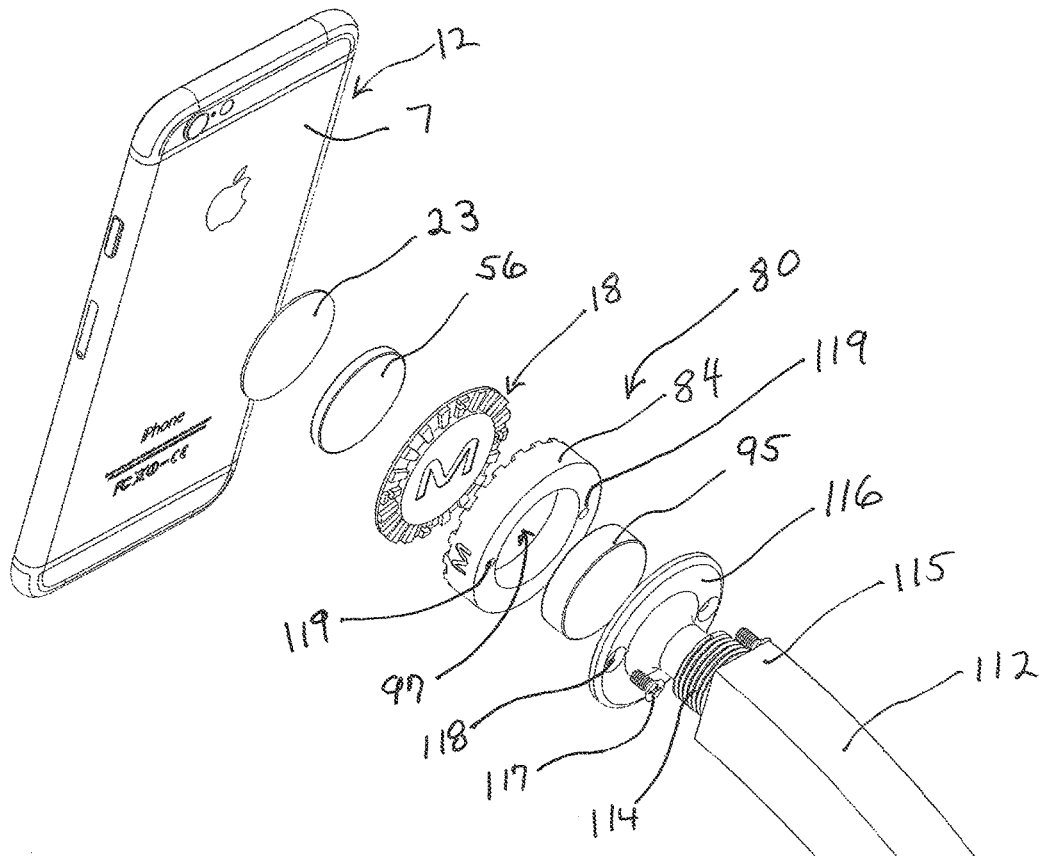
FIG. 15b is an exploded view of the surface mount shown in FIG. 15b.

FIG. 15b is an exploded view of the suction cup mount 110, boss cap 116, surface mount 80, link 18, and the smartphone 12. FIG. 15b illustrates the smartphone 17, adhesive pad 23, and link magnet 56 of link 18. Also shown are the circular housing 84 and circular housing magnet 96 of the surface mount 80. Screw holes 119 are included in the bottom 88 of the circular housing 84 for receiving screws or bolts 117 to secure the boss cap 116 to the bottom 88 of the circular housing 84. Apertures 118 are included in the boss cap 118 for receiving bolts 117 to secure the boss cap 116 to the bottom 88 of the circular housing 84. The threaded screw mount 114 of the boss cap 116 preferably screws into an aperture in the end 115 of the adjustable or rotatable arm 112 of the suction cup mount 110.

Figure 16A:
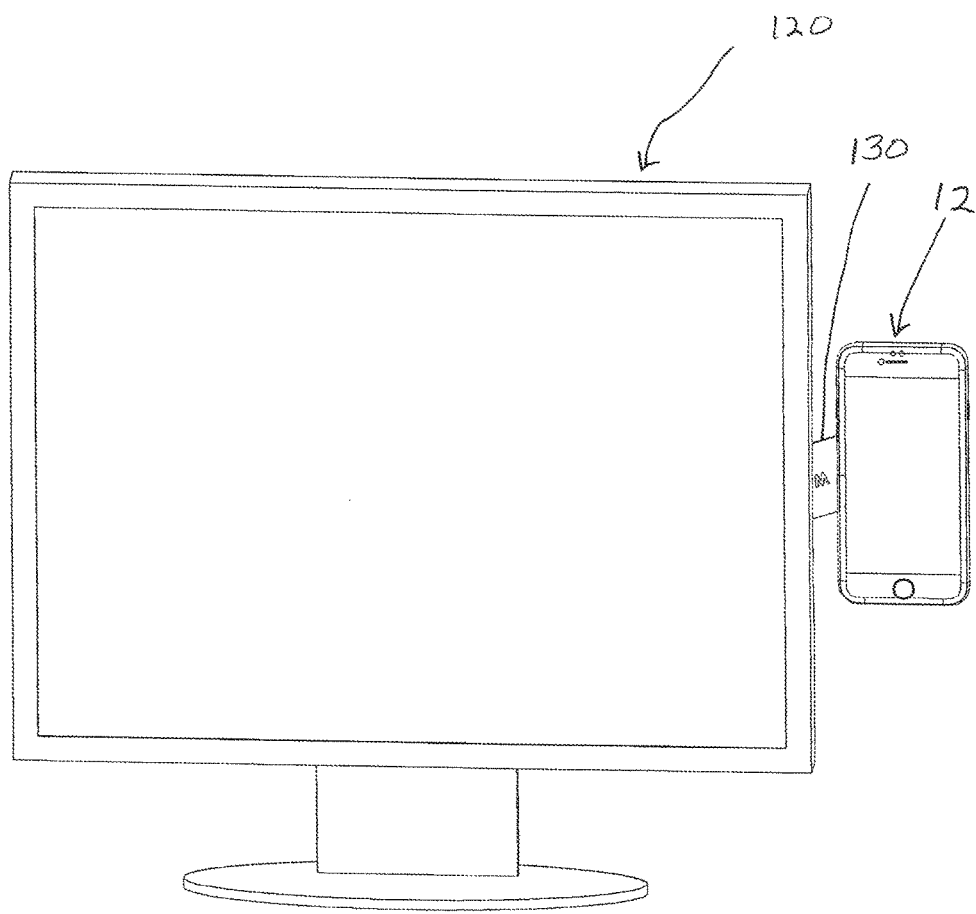
FIG. 16a is a front view of two surface mounts on a crossbar being used to secure an iPhone to the back on a computer monitor.
Figure 16B:
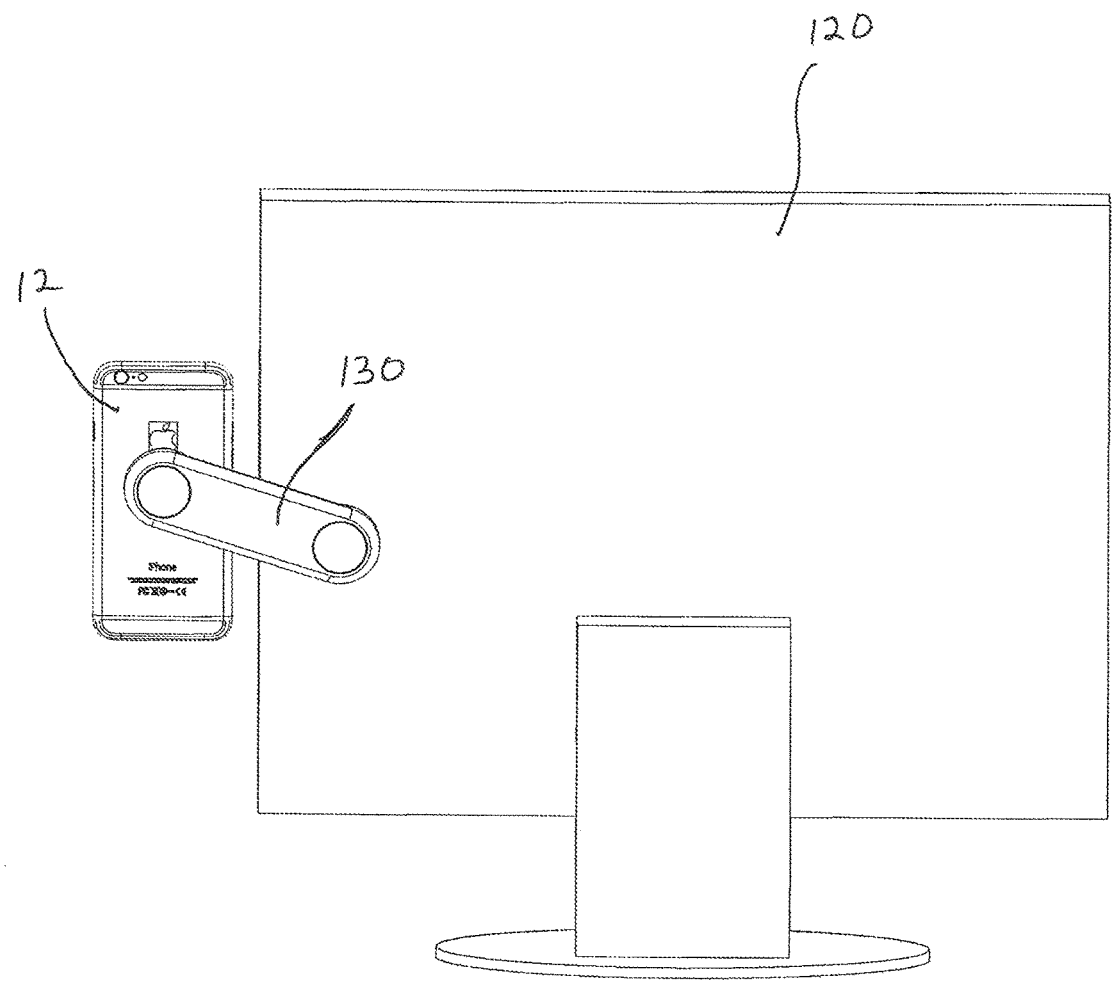
Figure 16C:
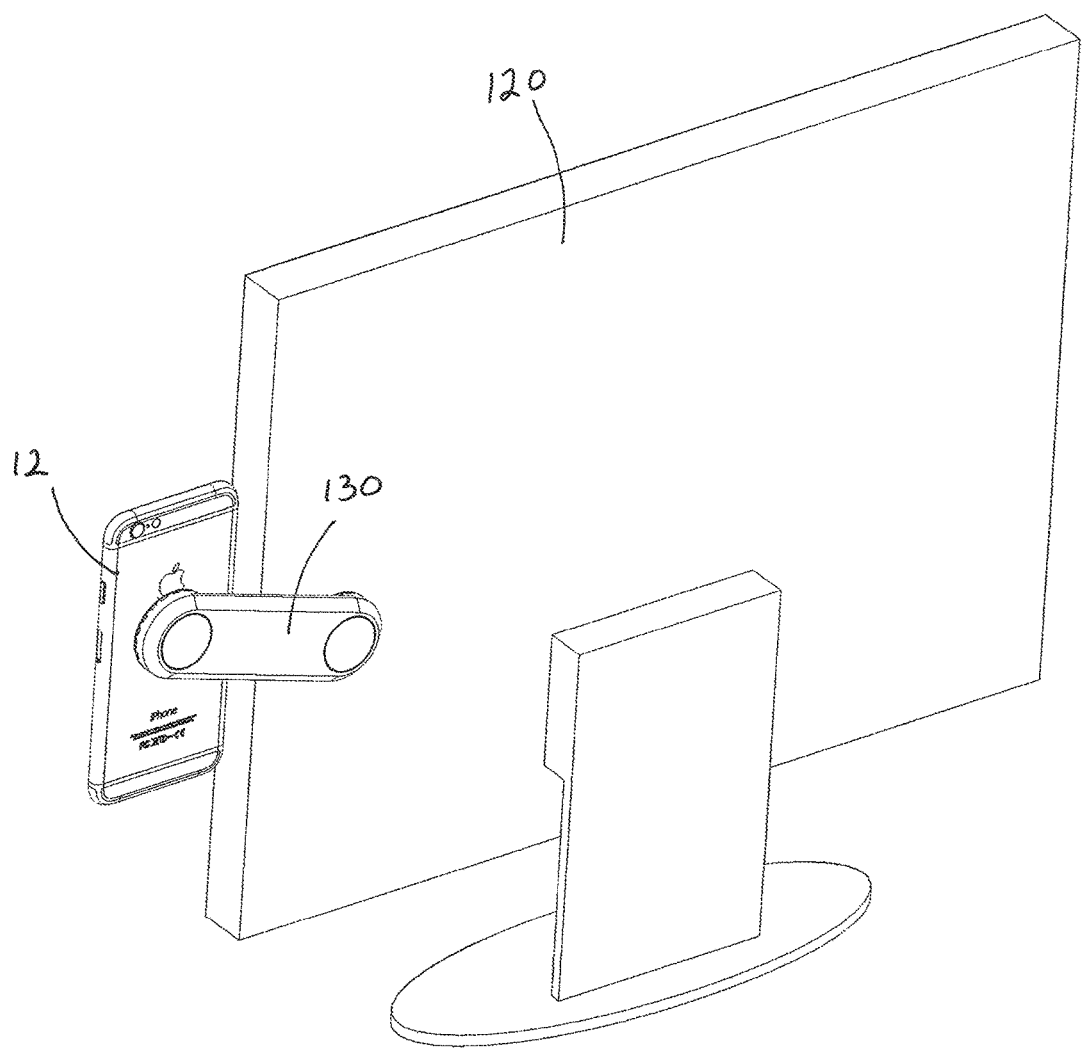
FIG. 16c is a perspective view of the rear view shown in FIG. 16b.

FIG. 16*a* is a front view of a bracket or crossbar mount 130 configured in accordance with the present invention being used to adjustably mount a smartphone 12 to a computer monitor 120 for the convenience of a user. FIG. 16*b* is a rear view of the computer monitor 120, smartphone 12, and crossbar mount 130 shown in FIG. 16*a*. FIG. 16*c* is a perspective view of the rear view shown in FIG. 16*b*.

Figure 16D:
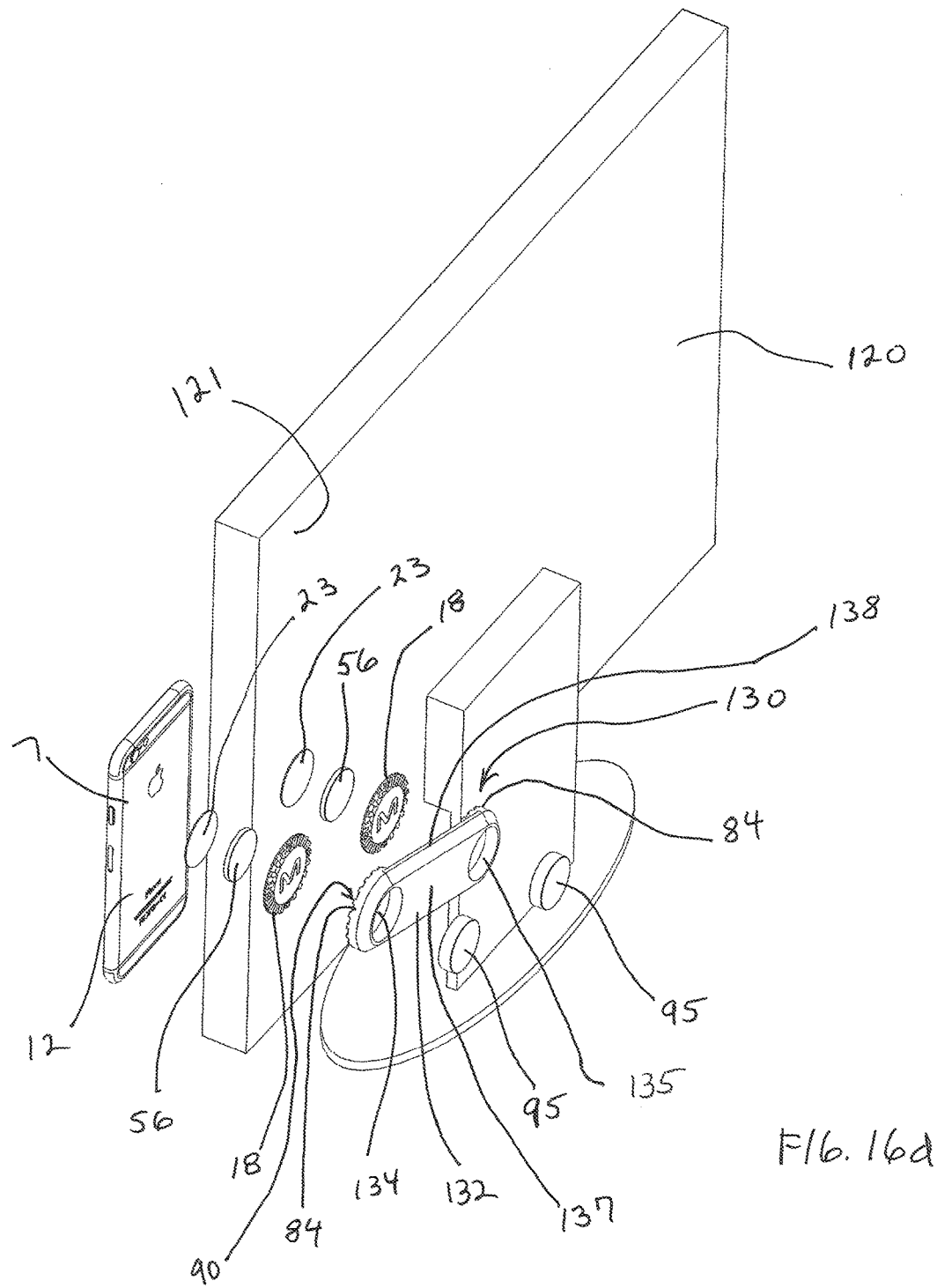
FIG. 16d is an exploded view of the rear view shown in FIG. 16c.
Figure 16E:
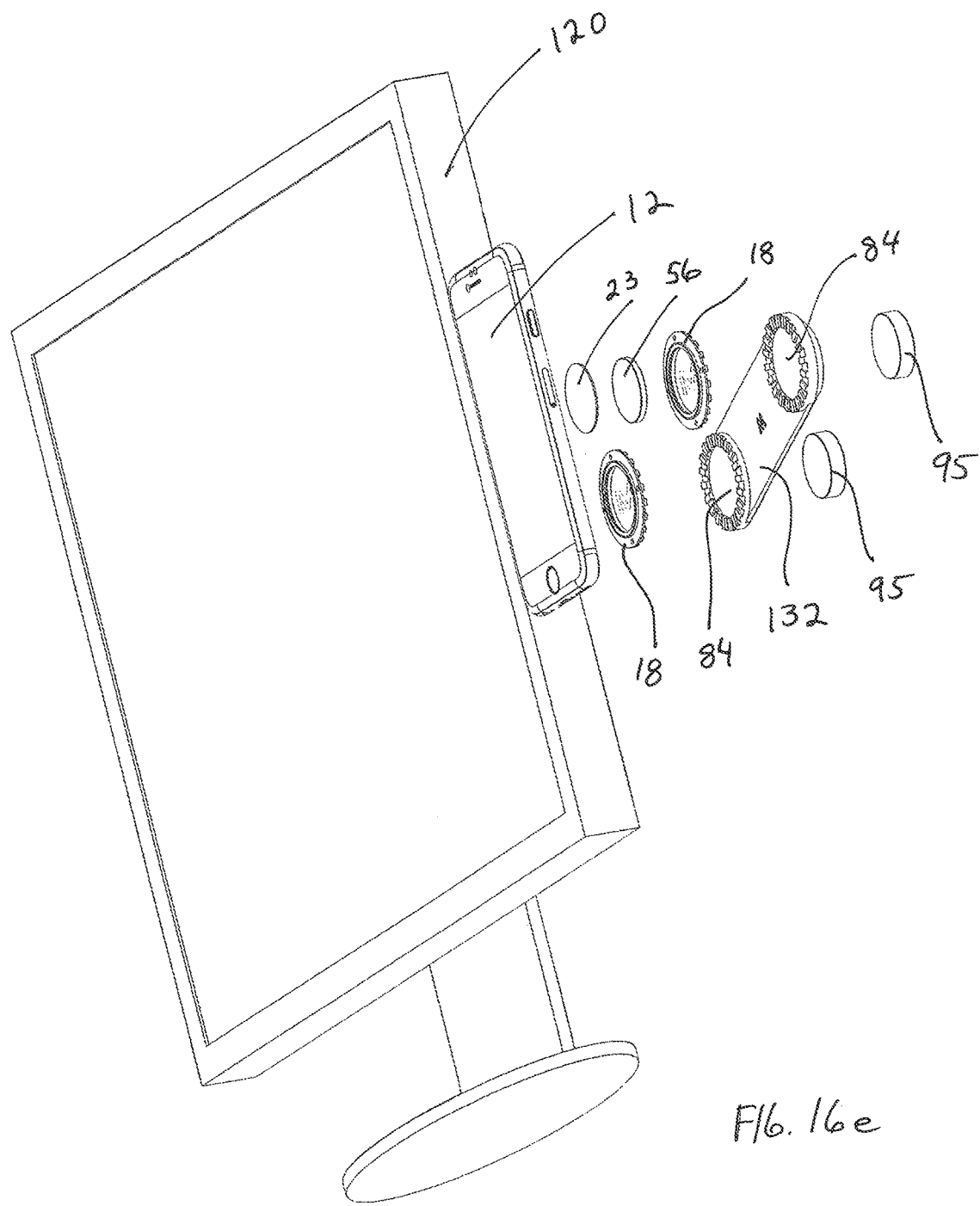

FIGS. 16*d* and 16*e* are exploded views of the crossbar mount 130 shown in FIGS. 16*a*-16*c*. Illustrated are the computer monitor 120 and smartphone 12. Illustrated elements of the bracket mount or crossbar mount 130 include a crossbar, extension, bar, or arm 132 having a first aperture 134 and a second aperture 135 for receiving circular housing magnets 95 through the back of the crossbar 132. Circular housings 84 are secured to the front 138 of the cross bar 132 over the apertures 134,135. It should be noted the circular housing magnets 95 can be contained within the inner chambers 97 of the circular housings 84, thus eliminating the need for apertures 134, 135 in the crossbar 132 for receiving the circular housing magnets 95.

In accordance with the present invention, a link 18 is secured to the back 7 of the smartphone 12 and the back 121 of the computer monitor. The circular housings 84 are magnetically secured to the links 18 on the smartphone 12 and the computer monitor 120. The teeth 26 of the link 18 and the teeth 94 of the circular housing are the same size, thus enabling a user to position the smartphone at any angle the user desires relative to the computer monitor 120.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. An adjustable mount, comprising:
    a circular housing having a top surface and a bottom surface, and an inner chamber;
    a ring on the top surface of the circular housing having a teethed upper surface;
    a housing magnet located within the inner chamber of the circular housing;
    a lid having a top surface and a bottom surface, the lid to be located on the top surface of the circular housing; and
    wherein an outer perimeter of the top surface of the lid is teethed, and the teethed outer perimeter of the top surface of the lid and the teethed upper surface of the ring interlock when the lid is positioned on top surface of the circular housing.

2. The adjustable mount of claim 1, wherein spacing between the teethed outer perimeter of the top surface of the lid is equally spaced, thereby enabling the lid to be rotated to a desired location on the teethed upper surface of the ring.

3. The adjustable mount of claim 1, wherein spacing between the teethed upper surface of the ring equally spaced, thereby enabling the lid to be rotated to a desired location on the teethed upper surface of the ring.

4. The adjustable mount of claim 1, wherein the housing magnet is circular and includes a flat surface.

5. The adjustable mount of claim 1, wherein the upper surface of the ring includes positioning apertures.

6. The adjustable mount of claim 1, wherein ring includes mounting apertures.

7. The adjustable mount of claim 1, further comprising:
    an adhesive pad on the bottom surface of the circular housing for securing the circular housing to a mounting surface.

8. The adjustable mount of claim 1, further comprising;
    an adhesive pad on the bottom surface of the lid for securing the lid to an apparatus.

9. The adjustable mount of claim 8, further comprising:
    a smartphone, wherein the bottom surface of the lid is affixed to a back of the smartphone by the adhesive on the bottom surface of the lid.

10. The adjustable mount of claim 9, further comprising:
    an anti-snag guide surrounding the perimeter of the lid, wherein an inner wall of the anti-snag guide extends at least to the top surface of the lid, and an outer perimeter of the anti-snag guide slopes outward towards the back of the smartphone.

11. The adjustable mount of claim 1, wherein the teethed upper surface of the ring and the teethed outer perimeter of the top surface of the lid are uniform in size and spacing, thereby enabling the lid to be rotated and repositioned relative the circular housing.

12. The adjustable mount of claim 1, further comprising:
    a base cap having a planer top and a threaded base; and
    the planar top secured to the bottom surface of the circular housing.

13. The adjustable mount of claim 12, further comprising:
    a suction cup mount having an adjustable arm; and
    the threaded base secured to the adjustable arm of the suction cup mount.

14. The adjustable mount of claim 1, further comprising:
    said lid including a cavity; and
    a lid magnet material located within the cavity of the lid, wherein the lid magnet is magnetically attracted to the housing magnet when the lid is positioned on top surface of the circular housing.

15. The adjustable mount of claim 1, further comprising:
    a lid magnet located within the lid, wherein the lid magnet is magnetically attracted to the housing magnet when the lid is positioned on top surface of the circular housing.

16. The adjustable mount of claim 1, further comprising:
    metal located within the lid, thereby enabling the lid to be magnetically attracted to the housing magnet when the lid is positioned on top surface of the circular housing.

17. The adjustable mount of claim 1, further comprising:
    an electronic device, wherein the bottom surface of the lid is attached to a back of the electronic device.

18. An adjustable mount, comprising:
    a crossbar:
    first and second circular housings each having a top surface and a bottom surface and an inner chamber, the first and second circular housings at opposing ends of the crossbar;
    first and second rings on the top surface of the first and second circular housing, respectively, the first and second rings each having a teethed upper surface; and
    first and second housing magnets located within the inner chambers of the first and second circular housing, respectively.

19. An adjustable mount comprising:
a circular housing having a top surface and a bottom surface;
a ring on the top surface of the circular housing having a teethed upper surface;
a lid having a top surface and a bottom surface, the lid to be located on the top surface of the circular housing;
a lid magnet located within the lid;
metal located within the circular housing, thereby enabling the lid magnet to be magnetically attracted to the housing magnet when the lid is positioned on top surface of the circular housing.
wherein an outer perimeter of the top surface of the lid is teethed, and the teethed outer perimeter of the top surface of the lid and the teethed upper surface of the ring interlock when the lid is positioned on top surface of the circular housing .

20. The adjustable mount of claim 19, wherein the metal located within the circular housing includes a housing magnet that is attracted to the lid magnet.

* * * * *